US009873508B2

(12) United States Patent
Apkarian

(10) Patent No.: US 9,873,508 B2
(45) Date of Patent: Jan. 23, 2018

(54) HYBRID MULTICOPTER AND FIXED WING AERIAL VEHICLE

(71) Applicant: Coriolis Games Corporation, Toronto (CA)

(72) Inventor: Jacob Apkarian, Toronto (CA)

(73) Assignee: Coriolis Games Corporation, Toronto (CA)

( * ) Notice: Subject to any disclaimer, the term of this patent is extended or adjusted under 35 U.S.C. 154(b) by 0 days.

(21) Appl. No.: 15/585,743

(22) Filed: May 3, 2017

(65) Prior Publication Data

US 2017/0233069 A1    Aug. 17, 2017

Related U.S. Application Data

(63) Continuation-in-part of application No. PCT/CA2016/051438, filed on Dec. 8, 2016.
(Continued)

(51) Int. Cl.
*B64C 29/00* (2006.01)
*B64C 39/02* (2006.01)
*B64F 5/10* (2017.01)

(52) U.S. Cl.
CPC ........ *B64C 29/0033* (2013.01); *B64C 39/024* (2013.01); *B64F 5/10* (2017.01); *B64C 2201/146* (2013.01)

(58) Field of Classification Search
CPC ........ B64C 27/52; B64C 11/46; B64C 27/28; B64C 2201/027; B64C 2201/024; B64C 2201/108; B64C 2201/165
See application file for complete search history.

(56) References Cited

U.S. PATENT DOCUMENTS 3,335,977 A    8/1967    Meditz
8,602,348 B2    12/2013    Bryant
(Continued)

FOREIGN PATENT DOCUMENTS

CA    2342431 A1    9/2002
DE    102008025607 A1    12/2009
(Continued)

OTHER PUBLICATIONS

Andy Janetzko, Wingcopter Fixed-Wing-Airplane/Quadcopter Fusion VTOL UAV, Dec. 7, 2012, http://diydrones.com/forum/topics/wingcopter-fixed-wing-airplane-quadcopter-fusion-vtol-uav.
(Continued)

*Primary Examiner* — Brian M O'Hara
(74) *Attorney, Agent, or Firm* — Bereskin & Parr LLP/S.E.N.C.R.L., s.r.l.

(57) ABSTRACT

An aerial vehicle is includes a wing, first and second rotors, and a movement sensor. The first and second multicopter rotors are rotatably coupled to the wing, the first multicopter rotor is rotatable relative to the wing about a first lateral axis, and the second multicopter rotor is rotatable relative to the wing about a second lateral axis. Each multicopter rotor is coupled to each other multicopter rotor, wherein the multicopter rotors are restricted to collective synchronous rotation relative to the wing between a multicopter configuration and a fixed-wing configuration. The movement sensor is coupled to the multicopter rotors, wherein the movement sensor is positioned to rotate relative to the wing when the multicopter rotors rotate relative to the wing between the multicopter and fixed-wing configurations.

22 Claims, 50 Drawing Sheets

Related U.S. Application Data

(60) Provisional application No. 62/378,948, filed on Aug. 24, 2016, provisional application No. 62/301,216, filed on Feb. 29, 2016, provisional application No. 62/266,195, filed on Dec. 11, 2015.

(56) References Cited

U.S. PATENT DOCUMENTS

| | | |
|---|---|---|
| 9,561,849 B2* | 2/2017 | Welsh ............... B64C 11/46 |
| 2003/0062442 A1 | 4/2003 | Milde, Jr. |
| 2003/0080242 A1 | 5/2003 | Kawai |
| 2006/0016930 A1 | 1/2006 | Pak |
| 2007/0018035 A1 | 1/2007 | Saiz |
| 2009/0084890 A1 | 4/2009 | Reinhardt |
| 2009/0261209 A1 | 10/2009 | Mioduchevski |
| 2011/0001001 A1 | 1/2011 | Bryant |
| 2011/0042508 A1 | 2/2011 | Bevirt |
| 2011/0042509 A1 | 2/2011 | Bevirt et al. |
| 2014/0014764 A1 | 1/2014 | Lundgren |

FOREIGN PATENT DOCUMENTS

| | | |
|---|---|---|
| DE | 202014004877 U1 | 8/2014 |
| EP | 2247500 B1 | 4/2012 |
| EP | 2551190 A1 | 1/2013 |
| WO | 2007098634 A1 | 9/2007 |
| WO | 2015019255 A1 | 2/2015 |
| WO | 2015124556 A1 | 8/2015 |

OTHER PUBLICATIONS

Ben Coxworth, SkyProwler combines a quadcopter and a fixed-wing airplane in one device, Feb. 18, 2015, http://www.gizmag.com/skyprowler-fixed-wing-quadcopter/36154/, pp. 1-7.
Ben Coxworth, Vertex hybrid drone combines hovering and fixed-wing flight, Apr. 23, 2015, http://www.gizmag.com/vertex-hybrid-drone/37159/, pp. 1-7.
David Szondy, Krossblade's SkyCruiser merges airplane, quadcopter and car, Oct. 25, 2014, http://gizmag.com/krossblade-skycruiser-flying-car/34392, pp. 1-10.
Wcolby Youtube Channel, Norio pilots the Bixler tilt rotor flying around nasa, Aug. 19, 2013, https://www.youtube.com/watch?v=e7QNbU71lsA.
XPLUSONE—Hybrid fixed wing drone goes at speeds of up to 100 kph (VIDEO), Jan. 2, 2015, https://www.rt.com/news/219395-vtol-drone-hover-kickstarter/.
International Search Report and Written Opinion related to PCT Application No. PCT/CA2016/051438, dated Feb. 6, 2017.
VTOL Technologies. "VTOL Flying Wing with BVLOS capability." VTOL Technologies .com. http://www.vtol-technologies.com (accessed Jun. 23, 2017).

* cited by examiner

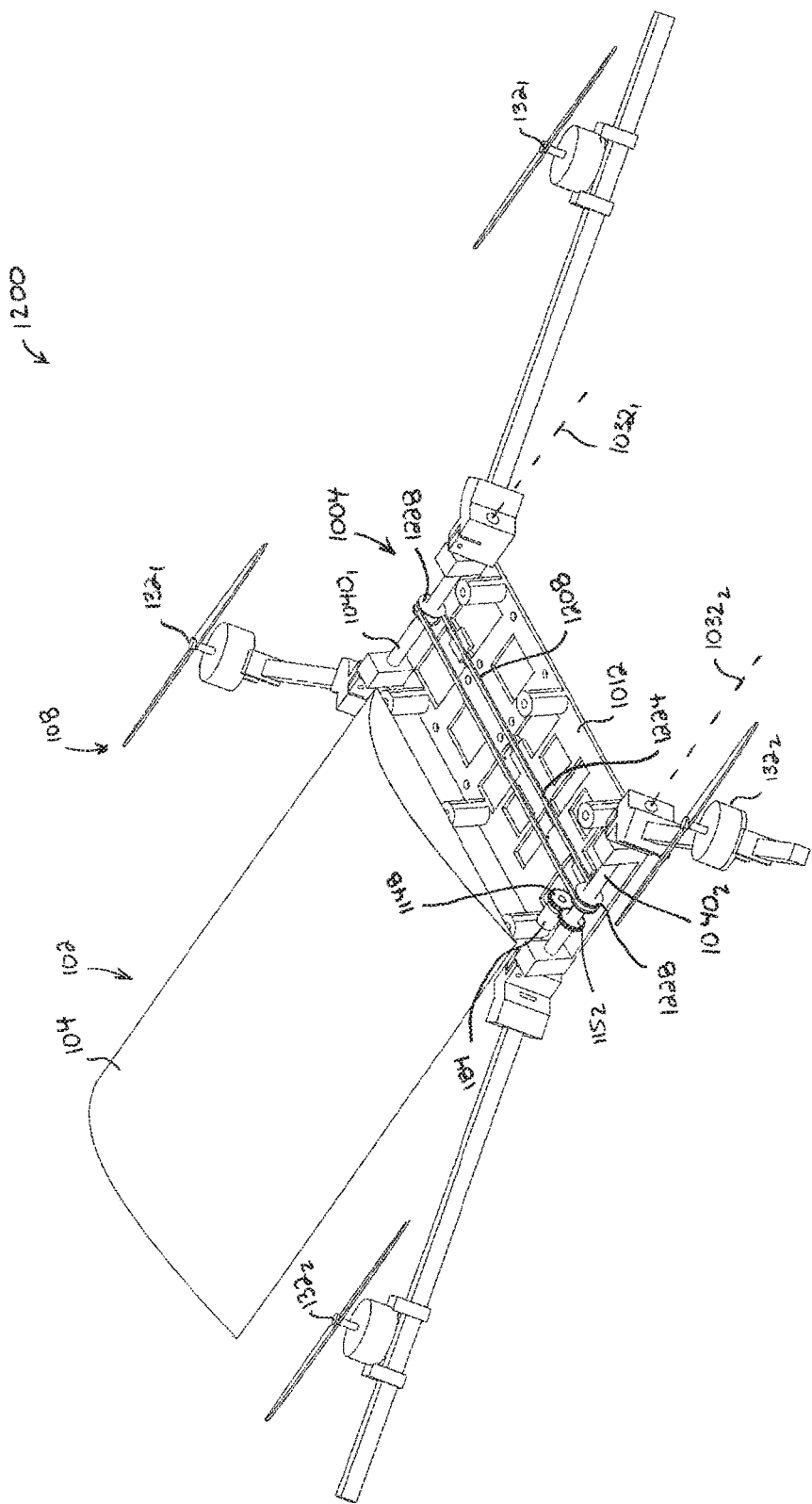

HYBRID MULTICOPTER AND FIXED WING AERIAL VEHICLE

FIELD

This disclosure relates to the field of hybrid multicopter and fixed wing aerial vehicles.

INTRODUCTION

A multicopter based aerial vehicle includes a plurality of rotors which provide thrust for lift and horizontal movement. Steering and control is provided by modulating the relative magnitude of thrust from each rotor so that the aerial vehicle will pitch, roll, or yaw as desired. Multicopter based aerial vehicles may permit vertical takeoff and landings.

A fixed wing aerial vehicle includes shaped wings which develop lift in response to forward thrust. Forward thrust may be provided by one or more thrust devices (e.g. rotors, or jet engines). Fixed wing aerial vehicles may provide relatively long range between takeoff and landing.

SUMMARY

In one aspect, an aerial vehicle is provided which may include a body and a multicopter. The body may have at least one wing. The multicopter may be rotatably mounted to the body about a multicopter axis. The multicopter may include a plurality of rotors positioned and controllable to rotate the multicopter about the multicopter axis.

In another aspect, an aerial vehicle kit is provided. The kit may include a multicopter linkage having a wing mount, a first rotor mount rotatably coupled to the wing mount to rotate about a first lateral axis, and a second rotor mount rotatably coupled to the wing mount to rotate about a second lateral axis longitudinally spaced apart from the first lateral axis. The first and second rotor mounts may be restricted to collective synchronous rotation relative to the wing mount between a multicopter configuration and a fixed-wing configuration.

In another aspect, an aerial vehicle is provided, which may include a wing, first and second rotors, and a movement sensor. The first and second multicopter rotors may be rotatably coupled to the wing, the first multicopter rotor may be rotatable relative to the wing about a first lateral axis, and the second multicopter rotor may be rotatable relative to the wing about a second lateral axis. Each multicopter rotor may be coupled to each other multicopter rotor, wherein the multicopter rotors are restricted to collective synchronous rotation relative to the wing between a multicopter configuration and a fixed-wing configuration. The movement sensor may be coupled to the multicopter rotors, wherein the movement sensor is positioned to rotate relative to the wing when the multicopter rotors rotate relative to the wing between the multicopter and fixed-wing configurations.

In another aspect, a method of making an aerial vehicle is provided. The method may include providing a multicopter linkage having a wing mount, a first rotor mount rotatably coupled to the wing mount to rotate about a first lateral axis, and a second rotor mount rotatably coupled to the wing mount to rotate about a second lateral axis longitudinally spaced apart from the first lateral axis, wherein the first and second rotor mounts are restricted to collective synchronous rotation relative to the wing mount between a multicopter configuration and a fixed-wing configuration; mounting a wing to the wing mount; and mounting a multicopter rotor to each of the rotor mounts.

DRAWINGS

FIG. 46 is a perspective view of an aerial vehicle in accordance with another embodiment;

FIG. 47 is a perspective view of an aerial vehicle in accordance with another embodiment;

DESCRIPTION OF VARIOUS EMBODIMENTS

Numerous embodiments are described in this application, and are presented for illustrative purposes only. The described embodiments are not intended to be limiting in any sense. The invention is widely applicable to numerous embodiments, as is readily apparent from the disclosure herein. Those skilled in the art will recognize that the present invention may be practiced with modification and alteration without departing from the teachings disclosed herein. Although particular features of the present invention may be described with reference to one or more particular embodiments or figures, it should be understood that such features are not limited to usage in the one or more particular embodiments or figures with reference to which they are described.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

As used herein and in the claims, two or more parts are said to be "coupled", "connected", "attached", or "fastened" where the parts are joined or operate together either directly or indirectly (i.e., through one or more intermediate parts), so long as a link occurs. As used herein and in the claims, two or more parts are said to be "directly coupled", "directly connected", "directly attached", or "directly fastened" where the parts are connected in physical contact with each other. As used herein, two or more parts are said to be "rigidly coupled", "rigidly connected", "rigidly attached", or "rigidly fastened" where the parts are coupled so as to move as one while maintaining a constant orientation relative to each other. None of the terms "coupled", "connected", "attached", and "fastened" distinguish the manner in which two or more parts are joined together.

Figure 1:
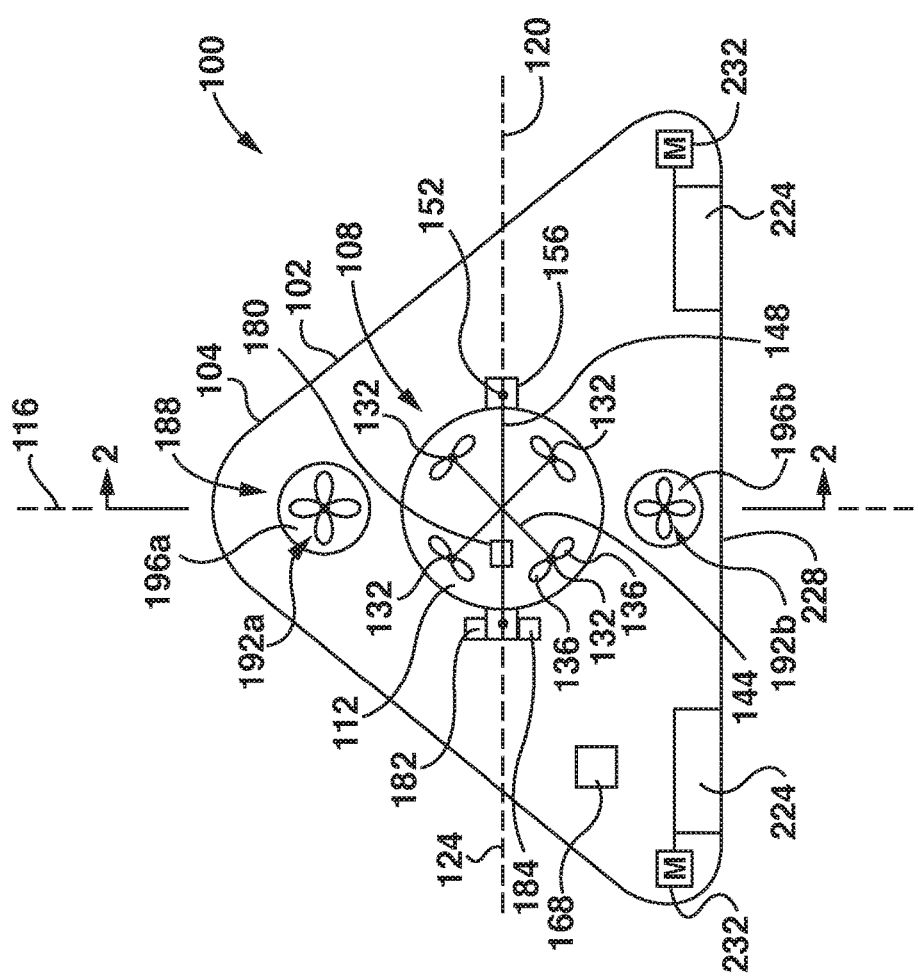
FIG. 1 is a top plan view schematic of an aerial vehicle in accordance with at least one embodiment.

Referring to FIG. 1, an aerial vehicle 100 is shown in accordance with at least one embodiment. Aerial vehicle 100 may be selectively operable in a multicopter configuration and/or a fixed wing configuration. In the multicopter configuration, lift may be provided predominantly by propelling air mass downwardly from the aerial vehicle 100. In the fixed wing configuration, lift may be provided predominantly by rearward air movement across or onto the wing(s) of the aerial vehicle 100. The multicopter configuration may conveniently permit vertical takeoffs and landings. The fixed wing configuration may provide enhanced flight efficiency for greater range between takeoff and landing.

Figure 3:
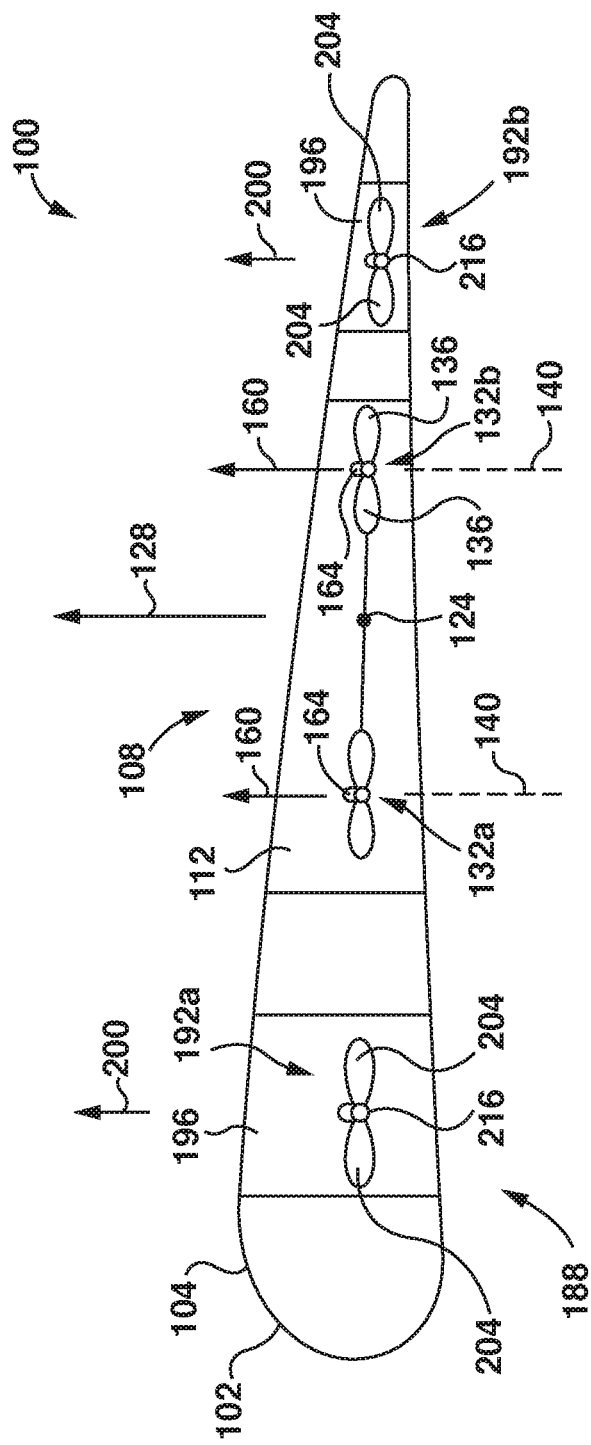
FIG. 3 is a cross-sectional view taken along line 2-2 in FIG. 1 showing the aerial vehicle in a multicopter configuration.

In the illustrated embodiment, aerial vehicle 100 includes a body 102 configured as a flying wing 104. That is, aerial vehicle 100 is absent a distinct fuselage or tail. As shown in FIG. 3, the cross-section of wing 104 may be shaped as an aerofoil for developing lift in the fixed wing configuration as described in more detail below. As used herein and in the claims, an aerofoil is any cross-sectional shape suitable for a wing to develop lift in response to forward relative movement of the wing through air. In other embodiments, wing 104 may be a flat wing that provides lift by its angle of attack.

Figure 15:
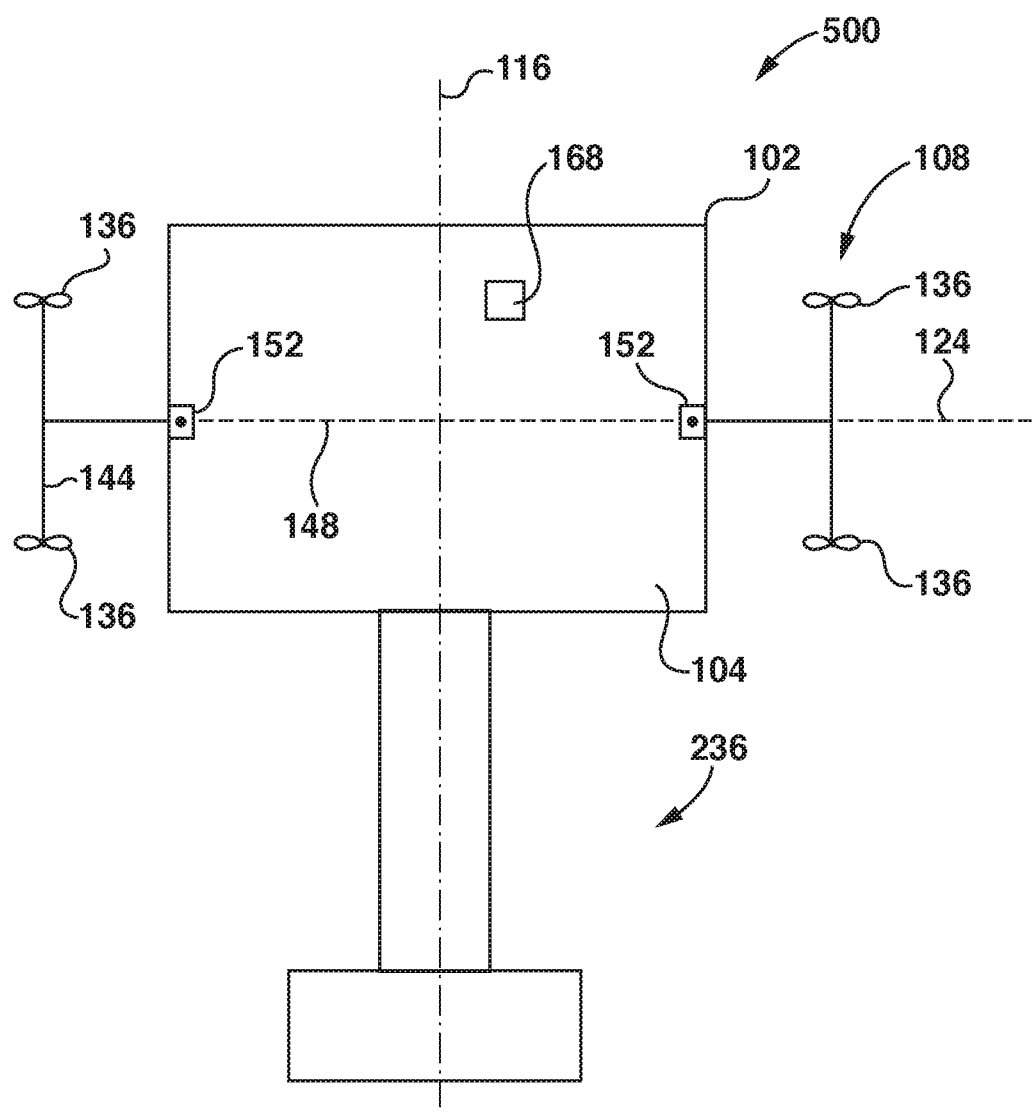
FIG. 15 is a top plan view schematic of an aerial vehicle in accordance with another embodiment.
Figure 20:
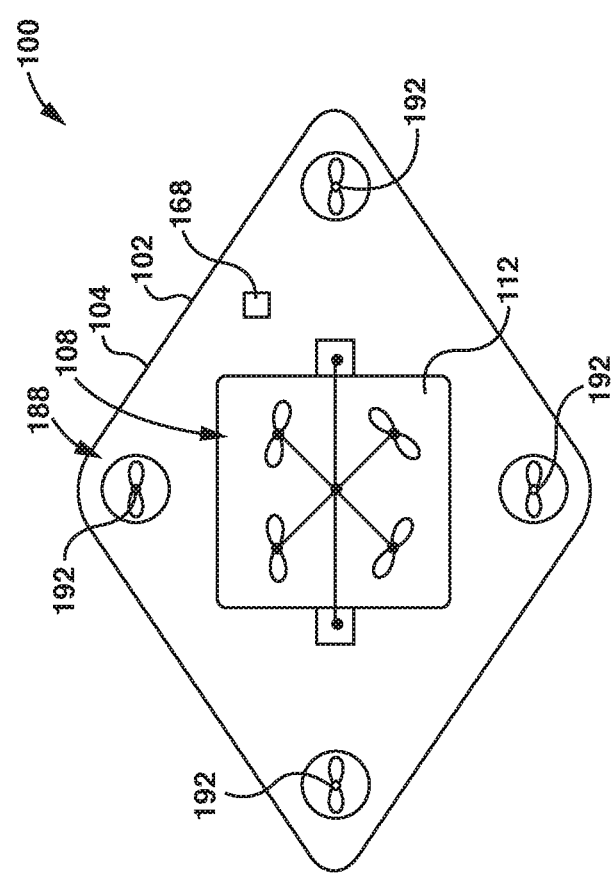
FIG. 20 is a top plan view schematic of an aerial vehicle in accordance with another embodiment.

Returning to FIG. 1, wing 104 may have any top view shape. In the illustrated example, wing 104 is substantially triangularly shaped. In other embodiments, the top view shape of wing 104 may be similar to another regular shape (e.g. circular, square, or other polygonal shape), or an irregular shape. FIG. 15 shows an embodiment 500 including a rectangular shaped wing 104. FIG. 20 shows another embodiment of aerial vehicle 100 including a diamond shaped wing 104.

With continuing reference to FIG. 1, aerial vehicle 100 may include a multicopter 108 mounted in a multicopter opening (i.e. aperture) 112 in wing 104. Multicopter 108 may be substantially centered along a longitudinal wing axis 116, and/or substantially centered along a lateral wing axis 120. Wing axes 116 and 120 each extend through the center of mass of aerial vehicle 100. In the illustrated example, multicopter 108 and multicopter opening 112 are substantially centered along both wing axes 116 and 120. This may improve the mass balance/symmetry of aerial vehicle 100, and may enhance the balance/symmetry of thrust developed by multicopter 108. In alternative embodiments, multicopter 108 may be positioned off-centered from both wing axes 116 and 120. FIG. 15 shows an embodiment 500 including a multicopter 108 mounted outside of wing 104.

Figure 24:
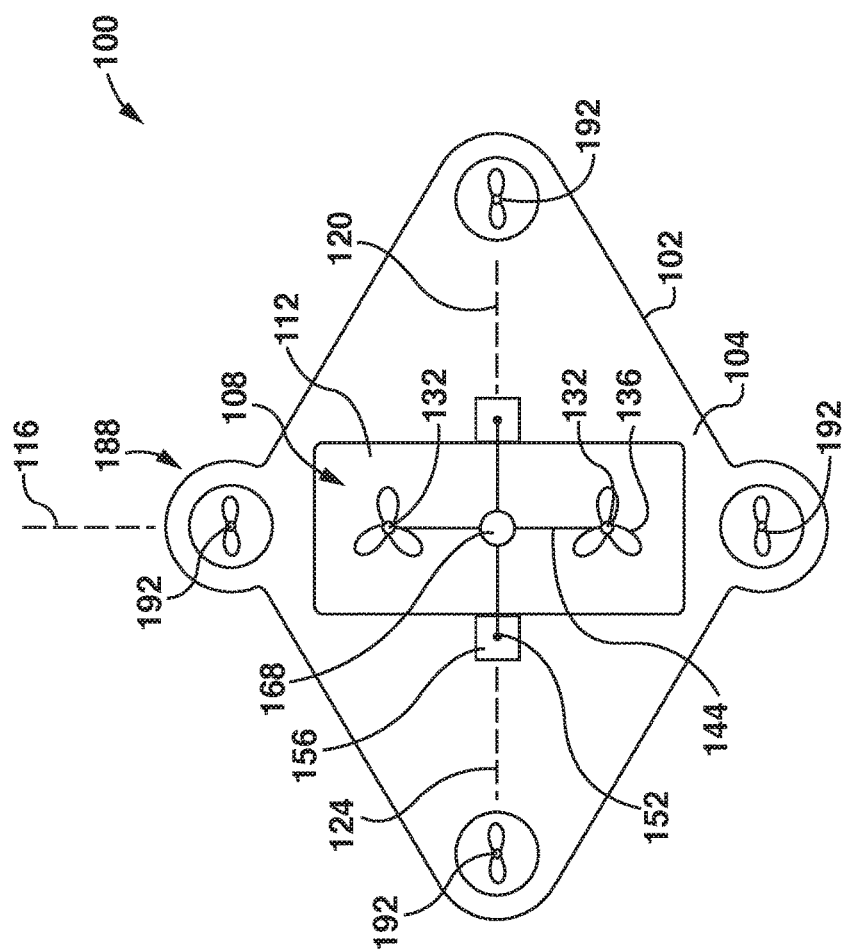
FIG. 24 is a top plan view schematic of an aerial vehicle in accordance with another embodiment.

Multicopter opening 112 may have any shape. In the illustrated example, multicopter opening 112 is circular. In alternative embodiments, multicopter opening may have another regular shape (e.g. triangular, rectangular, hexagonal, etc.), or an irregular shape. FIG. 24 shows another embodiment of aerial vehicle 100 including a multicopter opening 112 that is rectangular.

Still referring to FIG. 1, multicopter 108 may be mounted to wing 104 with free rotation about a multicopter axis 124. This may permit free relative rotation of multicopter 108 relative to wing 104 at least within a non-zero angular range of motion. The non-zero angular range of motion may be between 10-360 degrees, such as 10-180 degrees, 10-90 degrees, 10-60 degrees, at least 30 degrees, or 30-90 degrees for example. For example, multicopter 108 may be rotatable about multicopter axis 124 relative to wing 104 substantially without any transmission of torque between multicopter 108 and wing 104 (except perhaps insignificant friction at the rotational joint). In some embodiments, aerial vehicle 100 may be free of devices which transmit torque to rotate multicopter 108 about multicopter axis 124 relative to wing 104.

Figure 21:
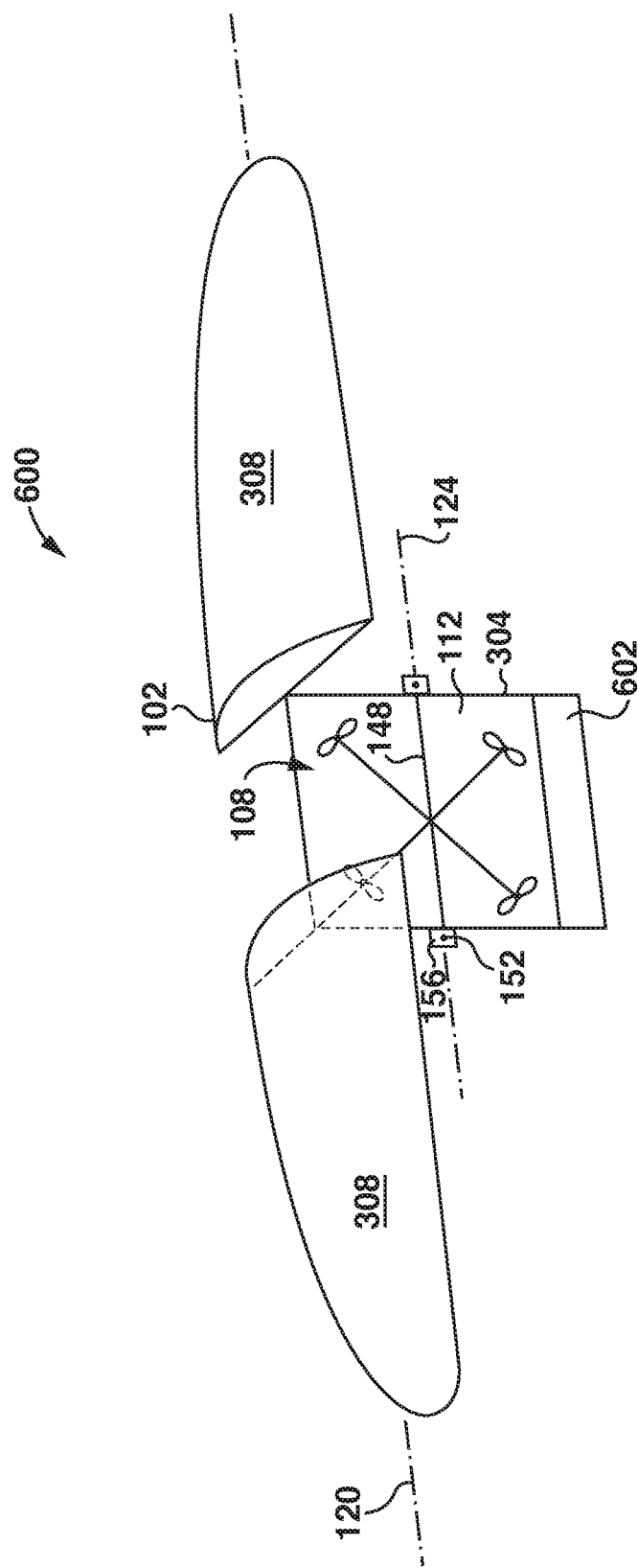
FIG. 21 is a perspective view of an aerial vehicle in accordance with another embodiment.

Multicopter axis 124 may extend in any direction relative to wing 104. In some embodiments, multicopter axis 124 may extend parallel to one of wing axes 116 and 120, or multicopter axis 124 may be coplanar with wing axes 116 and 120. For example, multicopter axis 124 may extend parallel to, or be collinear with, lateral wing axis 120 as shown. As exemplified in FIG. 4, this may permit multicopter 108 to rotate about multicopter axis 124 to change the direction 128 of thrust provided by multicopter 108 to aerial vehicle 100. FIG. 21 shows another embodiment where multicopter axis 124 is parallel and spaced apart from lateral wing axis 120. In the illustrated example, multicopter axis 124 is positioned below lateral wing axis 120.

Figure 4:
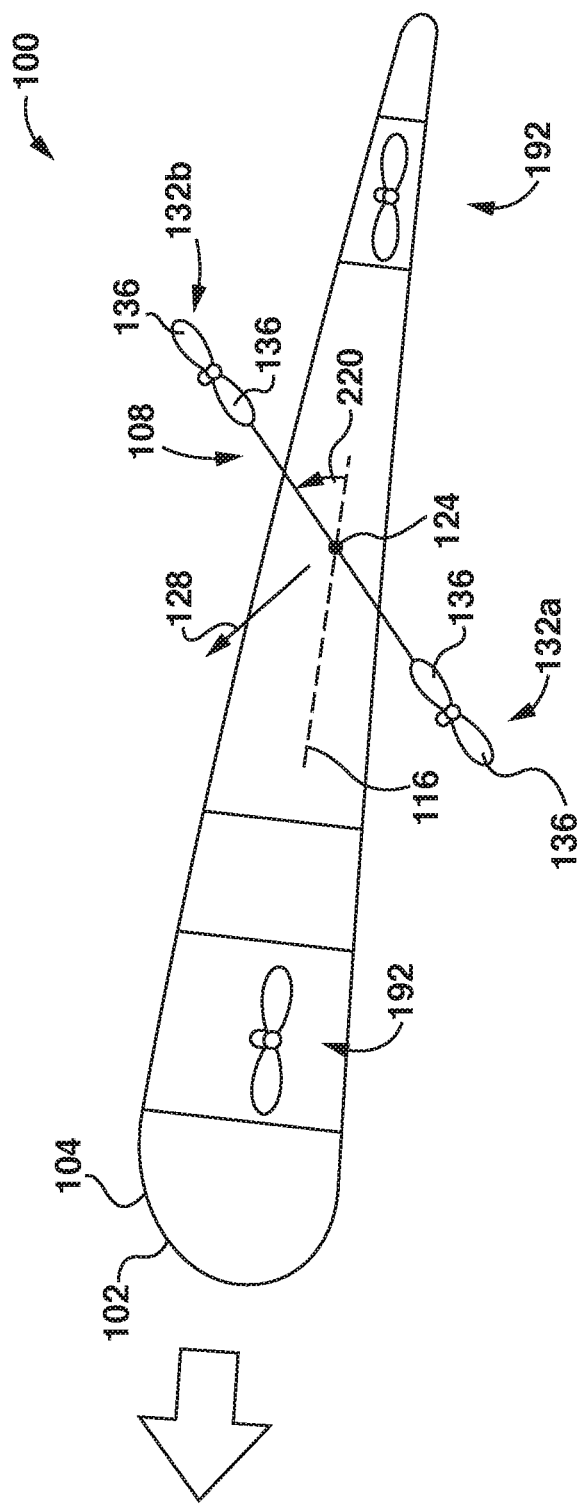
FIG. 4 is a cross-sectional view taken along line 2-2 in FIG. 1 showing the aerial vehicle in a fixed wing configuration.

Referring again to FIG. 1, multicopter 108 may include a plurality of rotors 132. Multicopter 108 including rotors 132 may be rotatable, relative to wing 104, as a unitary assembly about multicopter axis 124. As shown in FIG. 4, rotation of multicopter 108 about multicopter axis 124 may include rotation of each rotor 132 about multicopter axis 124. In some embodiments, multicopter rotors 132 may be fixedly positioned and oriented relative to each other. For example, multicopter 108 may be free of actuators for controlling the position or orientation of multicopter rotors 132 relative to each other. Multicopter rotors 132 may be rigidly connected together in any manner. For example, multicopter rotors 132 may be rigidly connected by a frame 144.

Multicopter 108 may be freely rotatably mounted to body 102 in any manner. In the illustrated embodiment, multicopter frame 144 is mounted to an axle 148, which itself is mounted to wing 104. As shown, multicopter frame 144 may be rigidly mounted to axle 148 and axle 148 may be rotatably mounted to wing 104. In this example, axle 148 may be collinear with multicopter axis 124. Axle 148 is shown mounted to wing 104 at opposite ends of multicopter opening 112. Optionally, axle 148 may be mounted to wing 104 by axle bearings 152. Alternatively or in addition, axle 148 may be loosely held in axle openings 156 formed in wing 104 and wing 104 may be free of bearings 152. In alternative embodiments, multicopter frame 144 may be rotatably mounted to axle 148, and axle 148 may be rigidly connected to wing 104. In a further alternative, multicopter frame 144 may be rotatably mounted to axle 148, and axle 148 may be rotatably mounted to wing 104.

Multicopter 108 may include any number of rotors 132. For example, multicopter 108 may include 2 or more rotors 132, or at least 4 rotors 132. In the illustrated embodiments, multicopter 108 includes four rotors 132, and is commonly referred to as a quadcopter. FIG. 24 shows another example including a multicopter 108 with two rotors 132.

Still referring to FIG. 1, each multicopter rotor 132 may include any number of rotor blades 136. Further, each multicopter rotor 132 may include the same number of blades 136 as each other multicopter rotor 132, or one or more (or all) multicopter rotors 132 may include a different number of rotor blades 136 than one or more other multicopter rotors 132. In some examples, each multicopter rotor 132 may include 1 or more rotor blades 136. In the illustrated embodiment, each rotor 132 includes 2 rotor blades 136. FIG. 24 shows an example of a multicopter 108 where each rotor 132 includes 3 rotor blades 136. Each multicopter rotor 132 may include rotor blades 136 of the same size, or one or more (or all) multicopter rotors 132 may include rotor blades 136 of different sizes than the other multicopter rotors 132. In the illustrated embodiment, all multicopter rotor blades 136 are the same size.

Referring to FIG. 3, each multicopter rotor 132 is operable to rotate rotor blades 136 about a respective rotor axis 140. Typically, the direction 160 of thrust for a multicopter rotor 132 is parallel to its rotor axis 140. Rotor axes 140 of multicopter 108 may all be parallel as shown. Alternatively, one or more (or all) rotor axes 140 may extend at an angle to other rotor axes 140. In this case, multicopter thrust direction 128 may be the average of multicopter rotor thrust directions 160 weighted by thrust magnitude.

Referring back to FIG. 1, multicopter rotors 132 may be arranged in any positional arrangement. For example, multicopter rotors 132 may be evenly or unevenly distributed in a regular arrangement (e.g. a circular arrangement, a regular polygon arrangement, or a grid arrangement) or an irregular arrangement, which may be centered on multicopter axis 124 or center-offset from multicopter axis 124. In the illustrated example, multicopter rotors 132 are evenly distributed in a circular arrangement centered on multicopter axis 124. FIG. 24 shows another example of multicopter 108 including multicopter rotors 132 aligned with wing longitudinal axis 116. As shown, one multicopter rotor 132 is forwardly of the multicopter axis 124, and one multicopter rotor 132 is rearward of the multicopter axis 124.

Referring to FIG. 3, each multicopter rotor 132 is operable to rotate its respective rotor blades 136 about its respective rotor axis 140. For example, each multicopter rotor 132 may include a rotor motor 164 connected to the rotor blades 136 of that multicopter rotor 132, as shown. In some embodiments, the rotary direction of a rotor motor 164 may be selectively reversible for reversing the thrust direction of the multicopter rotor 132.

Figure 2:
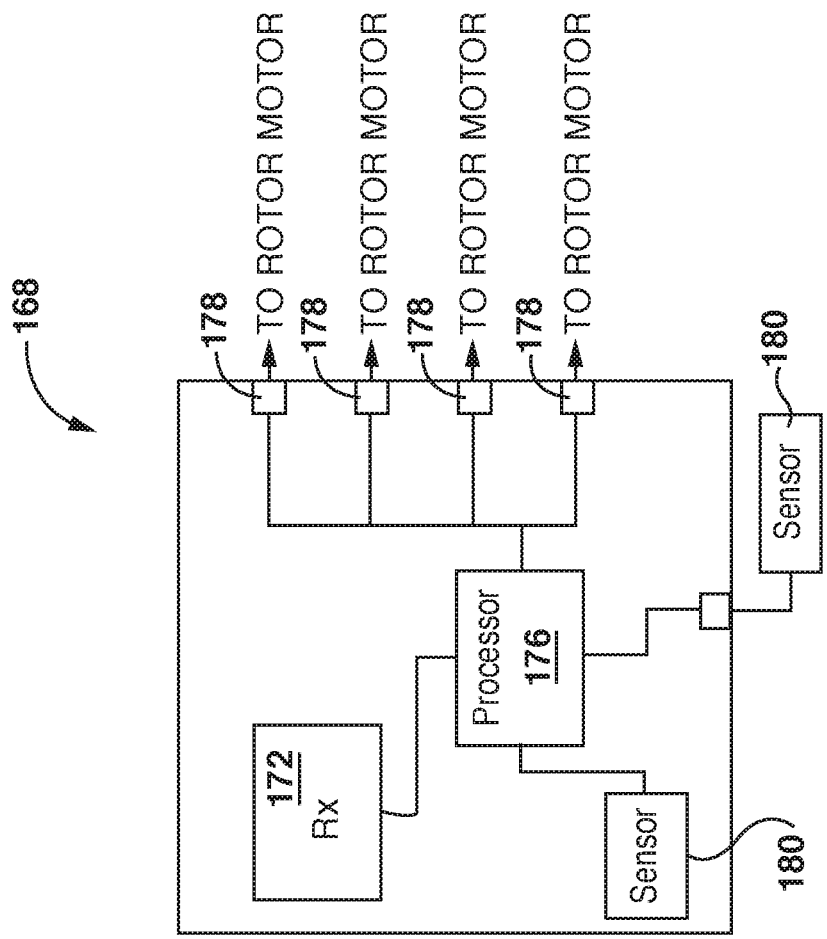
FIG. 2 is a schematic of a hardware controller in accordance with at least one embodiment.

Referring to FIGS. 1 and 2, aerial vehicle 100 may include a hardware controller 168. As shown, hardware controller 168 may include a wireless receiver 172 for receiving wireless control signals (e.g. from user operable handheld controller), and a processor 176 for interpreting the control signals from wireless receiver 172. Processor 176 may be connected (e.g. by one or more I/O ports 178) to the motors (e.g. rotor motors 164), and other actuators of aerial vehicle 100 to operate the aerial vehicle as described herein. For example, processor 176 may be electrically connected to each multicopter rotor motor 164 to separately control the torque of each rotor motor 164. Hardware controller 168 may also include one or more sensors 180 in communication with processor 176 by wire or wirelessly. For example, a sensor 180 may be a multi-axis gyroscopic sensor for determining the angular orientation of wing 104 and multicopter 108, a GPS sensor for determining the location coordinates of aerial vehicle 100, a barometer, a sonar sensor, or an infrared sensor for determining the altitude of aerial vehicle 100 above a surface below. In some embodiments, one or more of sensors 180 may be positioned on wing 104, and one or more of sensors 180 may be positioned on multicopter 108. For example, separate accelerometers may be mounted to each of wing 104 and multicopter 108 for sensing the orientations of both the wing 104 and multicopter 108.

Hardware controller 168 may be mounted to any component of aerial vehicle 100. In the illustrated embodiment, hardware controller 168 is mounted to wing 104. FIG. 24 shows another embodiment where hardware controller 168 is mounted to multicopter 108. In other embodiments, some parts of hardware controller 168 may be separately mounted to different components of aerial vehicle 100. For example, processor 176 may be mounted to multicopter 108, and wireless receiver 172 may be mounted to body 102.

Referring to FIGS. 3 and 4, multicopter rotors 132 may be operable (e.g. by control signals from hardware controller 168 (FIG. 1)) to rotate their respective rotor blades 136 at different torques to control the thrust produced, and therefore control the acceleration and velocity of aerial vehicle 100. Preferably, different multicopter rotors 132 may be selectively operable at different torques to produce different thrust than other multicopter rotors 132. This may permit control over the rotation of multicopter 108 about multicopter axis 124 by modulating the torques of the different multicopter rotors 132. For example, a positive or negative torque about the multicopter axis 124 may be developed by increasing or decreasing the relative torques of the multicopter rotor(s) 132 on one side of the multicopter axis 124 compared to the torques of the multicopter rotor(s) 132 on the other side of the multicopter axis 124. In the illustrated example, multicopter 108 may be pitched forwardly (i.e. rotate counter-clockwise relative to gravity when viewed from the left) by producing greater thrust with the rear multicopter rotors 132b than the front multicopter rotors 132a (and vice versa). This may permit aerial vehicle 100 to transition between the multicopter configuration (FIG. 3) and the fixed wing configuration (FIG. 4).

In some embodiments, multicopter rotors 132 may be operable (e.g. by control signals from hardware controller 168 (FIG. 1)), to reverse the rotary direction, and therefore reverse the rotor thrust direction 160. For example, multicopter 108 may be rapidly pitched forwardly by producing upward thrust with the rear multicopter rotors 132b, and downward thrust with the front multicopter rotors 132a (and vice versa). This may permit aerial vehicle 100 to transition quickly between the multicopter configuration (FIG. 3) and the fixed wing configuration (FIG. 4).

FIG. 3 shows aerial vehicle 100 in a multicopter configuration. The multicopter configuration may provide the convenience of vertical takeoff and landing, and stationary hovering. As shown, in the multicopter configuration, multicopter 108 may be substantially parallel (e.g. co-planar) with wing 104 (e.g. parallel with wing axes 120 and 124 (FIG. 1)). In this orientation, multicopter rotors 132 may be upwardly facing with an upward (e.g. in the direction of gravity) multicopter thrust direction 128. The magnitude of the multicopter thrust may determine whether aerial vehicle 100 rises, falls, or hovers at constant elevation. As shown, in the multicopter configuration one or more (or all) multicopter rotors may be at least partially (or completely) positioned inside of multicopter opening 112.

Figure 25:
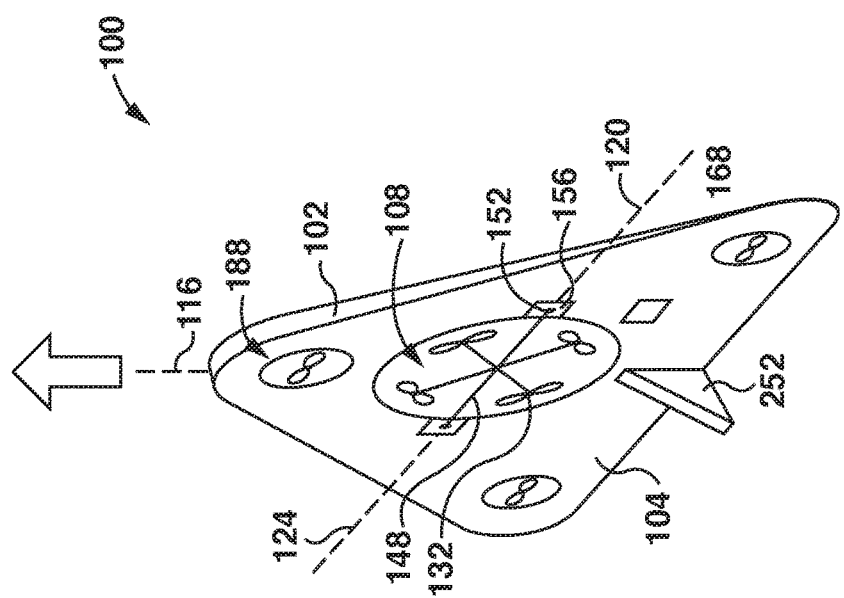
FIG. 25 is a perspective view of an aerial vehicle in a multicopter configuration, in accordance with another embodiment.

Referring to FIG. 25, in some embodiments, multicopter 108 may be rotated out of the plane of wing 104 in the multicopter configuration. For example, multicopter 108 may be rotated substantially perpendicular to wing 104 with multicopter rotors 132 extending above and/or below wing 104. This may reduce the drag from wing 104 during vertical takeoff and landing. Optionally, body 102 may be shaped to permit aerial vehicle 100 to be self-supporting on a surface below in the vertical orientation shown. For example, body 102 may include a vertical stabilizer 252 which extends transverse (e.g. perpendicular) to wing 104 to provide additional stability for landing.

Referring to FIG. 1, in the multicopter configuration, free rotation between multicopter 108 and wing 104 may permit wind and/or air resistance to cause wing 104 to rotate about multicopter axis 124 (e.g. pitch forwardly or rearwardly in the example shown). In some embodiments, aerial vehicle 100 may include a brake 182 selectively operable (e.g. by control signals from hardware controller 168) to inhibit relative rotation between multicopter 108 and wing 104. Brake 182 may be activated while multicopter 108 is in the multicopter configuration, and released to permit multicopter 108 to rotate relative to wing 104 to the fixed wing configuration. In some embodiments, brake 182 may be activated while in the fixed wing configuration. In some embodiments, brake 182 may be activated to lesser degrees to slow the rotation of wing 104 relative to multicopter 108.

Still referring to FIG. 1, as an alternative to brake 182, or in addition to brake 182, aerial vehicle 100 may include an actuator 184 (e.g. motor) operable (e.g. by control signals from hardware controller 168) to control the rotary orientation of wing 104 relative to multicopter 108. Actuator 184 may be operated while multicopter 108 is in the multicopter configuration, or the fixed wing configuration, or both, and released when transitioning between the two modes to permit free rotation of multicopter 108 relative to wing 104. In use, actuator 184 may be operable to make fine adjustments to the angle between multicopter 108 and wing 104 in support of steering aerial vehicle 100.

Referring to FIGS. 1 and 3, as an alternative to brake 182 and actuator 184, or in addition to one or both of brake 182 and actuator 184, aerial vehicle 100 may include a wing stabilization system 188. Wing stabilization system 188 may include one or more rotors 192 which produce thrust to create torque for reorienting body 102 relative to multicopter 108. For example, stabilization rotor(s) 192 may be selectively activated to control the pitch or roll of wing 104.

Figure 5:
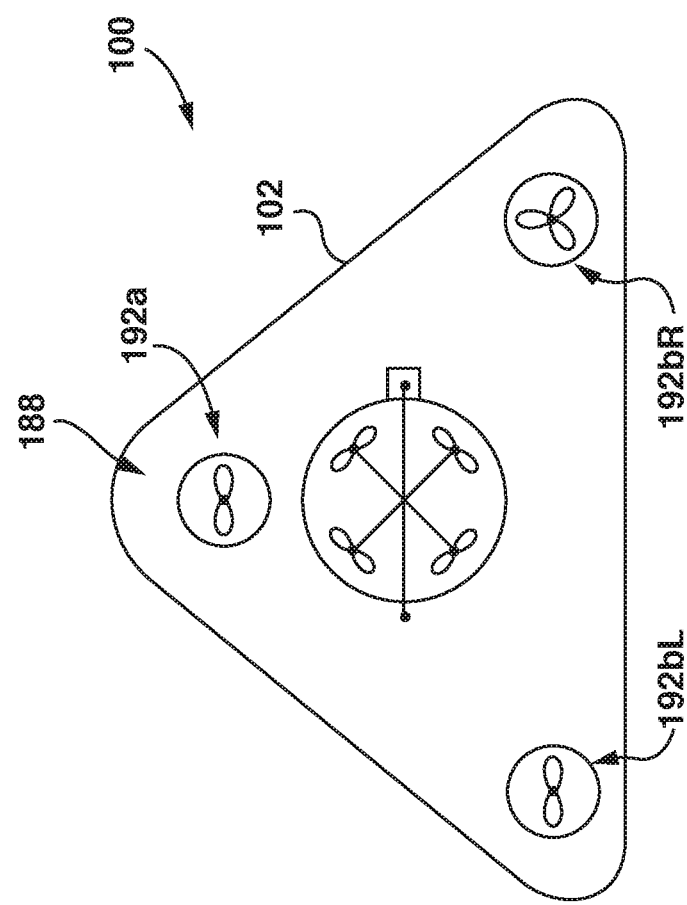
FIG. 5 is a top plan view schematic of an aerial vehicle in accordance with another embodiment.

Wing stabilization system 188 may include any number of stabilization rotors 192. For example, wing stabilization system 188 may include one or more stabilization rotors 192. In the illustrated example, wing stabilization system 188 includes two stabilization rotors 192, which may be selectively activated to develop thrust for providing torque for pitch control. FIG. 5 shows another embodiment of aerial vehicle 100 including a wing stabilization system 188 with three stabilization rotors 192 for pitch and roll control. FIGS. 20 and 24 show embodiments of aerial vehicle 100 including a wing stabilization system 188 with four stabilization rotors 192.

Referring to FIG. 1, each stabilization rotor 192 may be positioned in a stabilization rotor aperture 196 which penetrates wing 104. Stabilization rotors 192 and apertures 196 may be arranged in any positional arrangement about wing 104. For example, stabilization rotors 192 and apertures 196 may be evenly or unevenly distributed about wing 104. In some embodiments, stabilization rotors 192 and apertures 196 may be positioned on opposite sides of one or both of wing axes 116 and 120. This may permit stabilization rotors 192 to provide thrust about opposite sides of the wing axis 116 or 120 for rotating wing 104 about that axis 116 or 120.

In the illustrated embodiment, wing stabilization system 188 includes a front stabilization rotor 192a in a front stabilization rotor aperture 196a, and a rear stabilization rotor 192b in a rear stabilization rotor aperture 196b. Rotors 192a and 192b may be selectively activated independently of multicopter rotors 132 for adjusting the pitch of wing 104 relative to multicopter 108. FIG. 5 shows another embodiment including a front stabilization rotor 192a, a rear left stabilization rotor 192bL, and a rear right stabilization rotor 192bR. As shown, rear stabilization rotors 192bL and 192bR may be positioned on opposite sides of longitudinal wing axis 116 to control the roll of wing 104. In the illustrated embodiment, rear stabilization rotors 192bL and 192bR may be selectively activated to control the roll of aerial vehicle 100 as a whole (i.e. including wing 104 and multicopter 108).

Referring to FIG. 3, each stabilization rotor 192 may be oriented to provide thrust in any direction 200. For example, all stabilization rotors 192 may have an upward thrust direction 200, all stabilization rotors 192 may have a downward thrust direction 200, or some stabilization rotors 192 may have an upward thrust direction 200 while other stabilization rotors 192 have a downward thrust direction 200. In some embodiments, one or more (or all) stabilization rotors 192 may be operable to selectively change their thrust directions 200. For example, a stabilization rotor 192 may be operable to reverse the rotation of its rotor blades 204 to invert its thrust direction 200.

Figure 6:
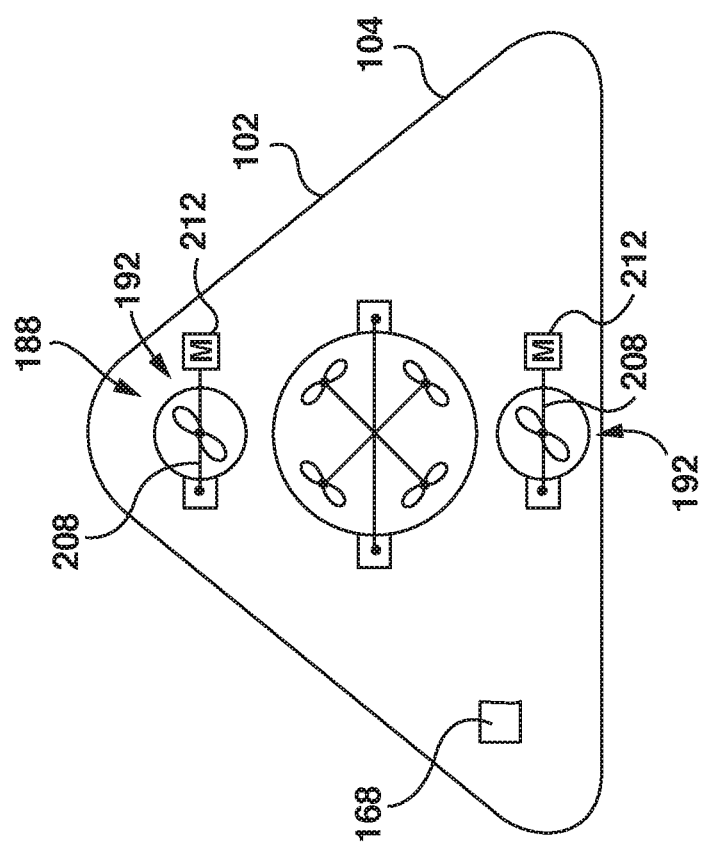
FIG. 6 is a top plan view schematic of an aerial vehicle in accordance with another embodiment.

Alternatively, or in addition, a stabilization rotor 192 may be rotatable to selectively face a different direction. For example, FIG. 6 shows an embodiment where each stabilization rotor 192 is rotatably mounted to wing 104 by a stabilization rotor axle 208. A motor 212 may be connected to each axle 208. Motor 212 may be selectively operated (e.g. by control signals from hardware controller 168) to rotate the connected stabilization rotor 192 to face a selected direction.

Returning to FIG. 3, stabilization rotors 192 may be rigidly connected to wing 104. As shown, each stabilization rotor 192 may have an upward thrust direction 200 that may or may not be reversible. In this example, wing 104 may be pitched forwardly or rearwardly by modulating the relative thrusts of front and rear stabilization rotors 192a and 192b. Stabilization rotors 192 may also be activated to provide lift during either or both of the multicopter configuration and the fixed wing configuration.

Similar to multicopter rotors 132, each stabilization rotor 192 is operable to rotate its respective stabilization rotor blades 204 about its respective stabilization rotor axis 216. For example, each stabilization rotor 192 may include a stabilization rotor motor 216 connected to the rotor blades 204 of that stabilization rotor 192, as shown.

Reference is now made to FIG. 4, which shows aerial vehicle 100 in a fixed wing configuration. In this configuration, multicopter 108 may be independently rotated out of the plane of wing 104 to provide horizontal (e.g. forward) thrust. As shown, multicopter 108 may be rotated at an angle 220 to wing 104. One or more (or all) multicopter rotors 132 may be at least partially (or completely) positioned outside of multicopter opening 112 in the fixed wing configuration (e.g. above or below wing 104). This may permit those multicopter rotors 132 to provide effective thrust for propelling wing 104 horizontally (e.g. forward along longitudinal axis 116). The shape of wing 104 (e.g. aerofoil shape) and/or the angle of attack of wing 104 may passively create lift for aerial vehicle 100 in response to forward movement of wing 104 through air. Optionally, stabilization rotors 192 (if present) may be activated to provide supplemental lift.

Still referring to FIG. 4, multicopter 108 may be rotated to any angle 220 in the fixed wing configuration. For example, multicopter angle 220 may be greater than 10 degrees, such as 10-90 degrees. In the illustrated embodiment, angle 220 is approximately 45 degrees. At some multicopter angles 220 (e.g. less than 90 degrees), multicopter thrust direction 128 may deviate from horizontal (i.e. be non-horizontal) so that multicopter thrust direction 128 may have both upward and forward components to provide both lift and forward thrust. At some other multicopter angles 220 (e.g. 90 degrees), multicopter thrust direction 128 may be substantially horizontal so that multicopter 108 may contribute forward thrust with little or no lift.

Referring back to FIG. 1, aerial vehicle 100 may include one or more devices for stabilizing the orientation of wing 104. For example, aerial vehicle 100 may include one or more of a brake 182, actuator 184, and wing stabilization system 188, as described above. Alternative, or in addition to any one or more of these devices, aerial vehicle 100 may include one or more control surfaces 224. Control surfaces 224 may be movably mounted (e.g. pivotably mounted) to wing 104. The movement of control surfaces 224 may be controlled (e.g. by control signals from hardware controller 168) to operate as ailerons for controlling roll, to operate as elevators for controlling pitch, to operate as a rudder to control yaw, or a combination thereof depending on the number, size, position, and orientation of control surfaces 224. In the illustrated embodiment, aerial vehicle 100 is shown including two control surfaces 224 symmetrically disposed on opposite sides of wing longitudinal axis 116, on a rear end 228 of wing 104. Each control surface 224 may be individually activated (e.g. pivoted upwardly or downwardly) by actuators (e.g. motors 232) to create drag for controlling roll and steering of aerial vehicle 100.

Figure 7:
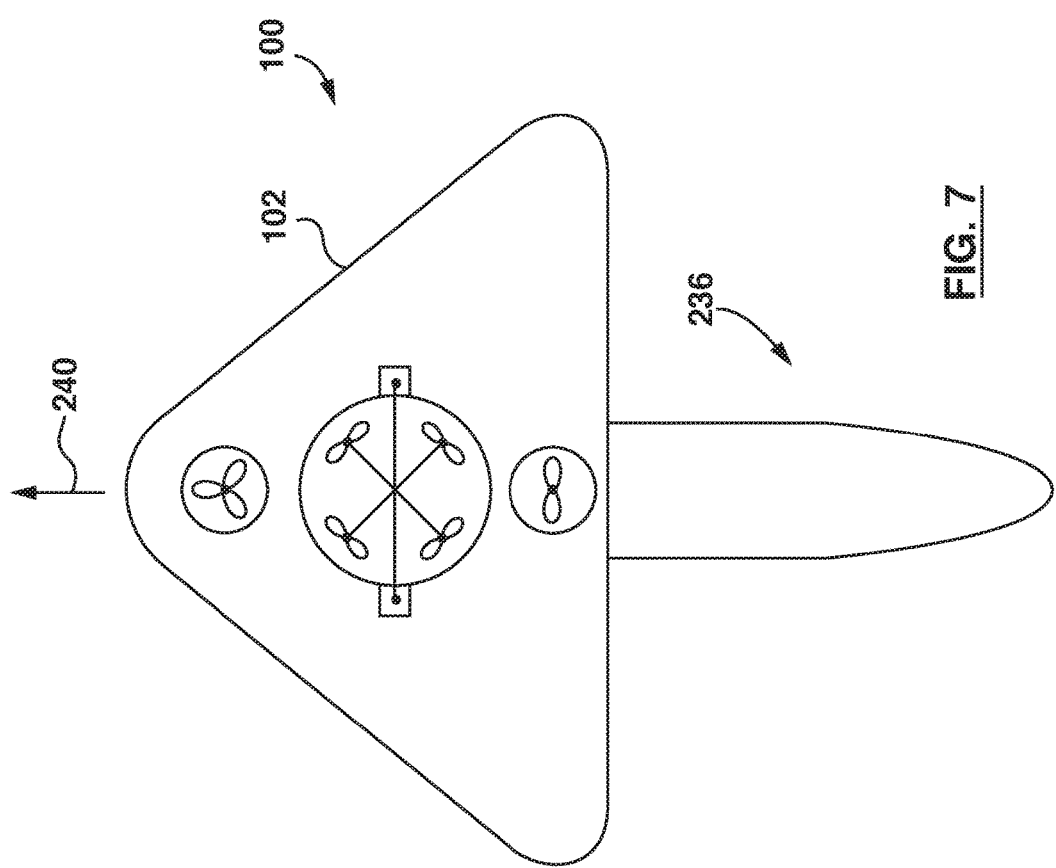
FIG. 7 is a top plan view schematic of an aerial vehicle in accordance with another embodiment.

Referring to FIG. 7, in some embodiments, body 102 may include a tail 236 which extends rearwardly from wing 104. In the illustrated embodiment, tail 236 is a passive tail without control surfaces. Tail 236 may be rigidly connected to wing 104 to provide drag which may help to orient aerial vehicle 100 so that aerial vehicle 100 tends to travel in a forward direction 240 in the fixed wing configuration. Tail 236 may be made of any material, which may be flexible or rigid. In some embodiments, tail 236 may be made of a flexible material, such as a sheet of flexible plastic.

Figure 8:
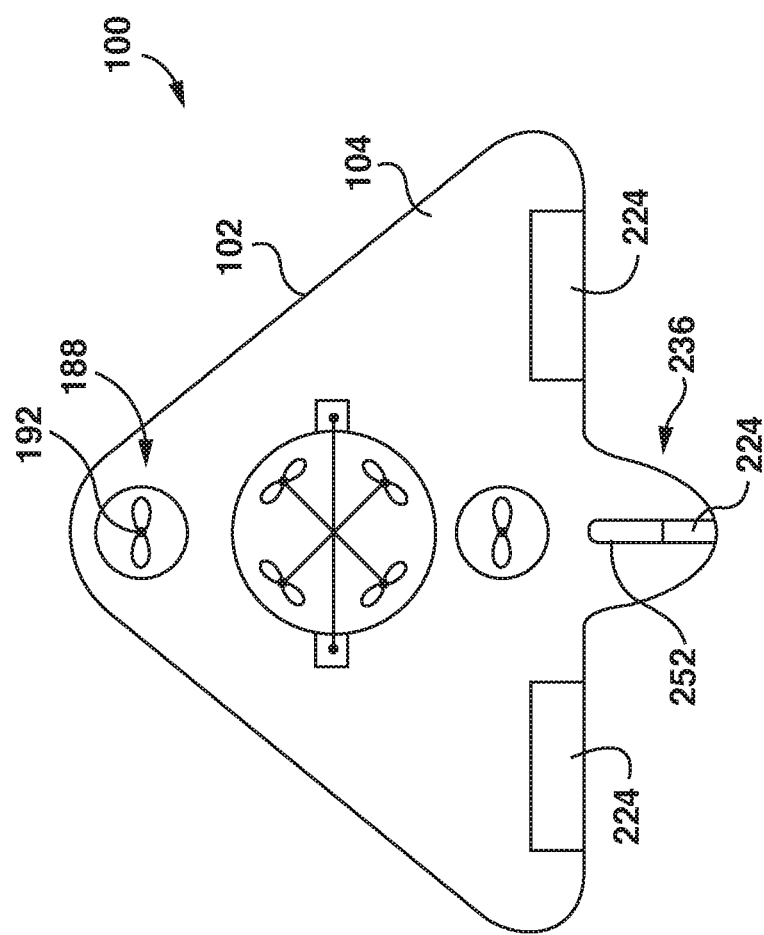
FIG. 8 is a top plan view schematic of an aerial vehicle in accordance with another embodiment.

Referring to FIG. 8, in some embodiments, tail 236 may be an active tail including one or more control surfaces 224. As shown, tail 236 may include a vertical stabilizer 252 including a vertical control surface 224, which may act as a rudder for influencing yaw. Tail 236 may be rigidly connected to wing 104.

Figure 9:
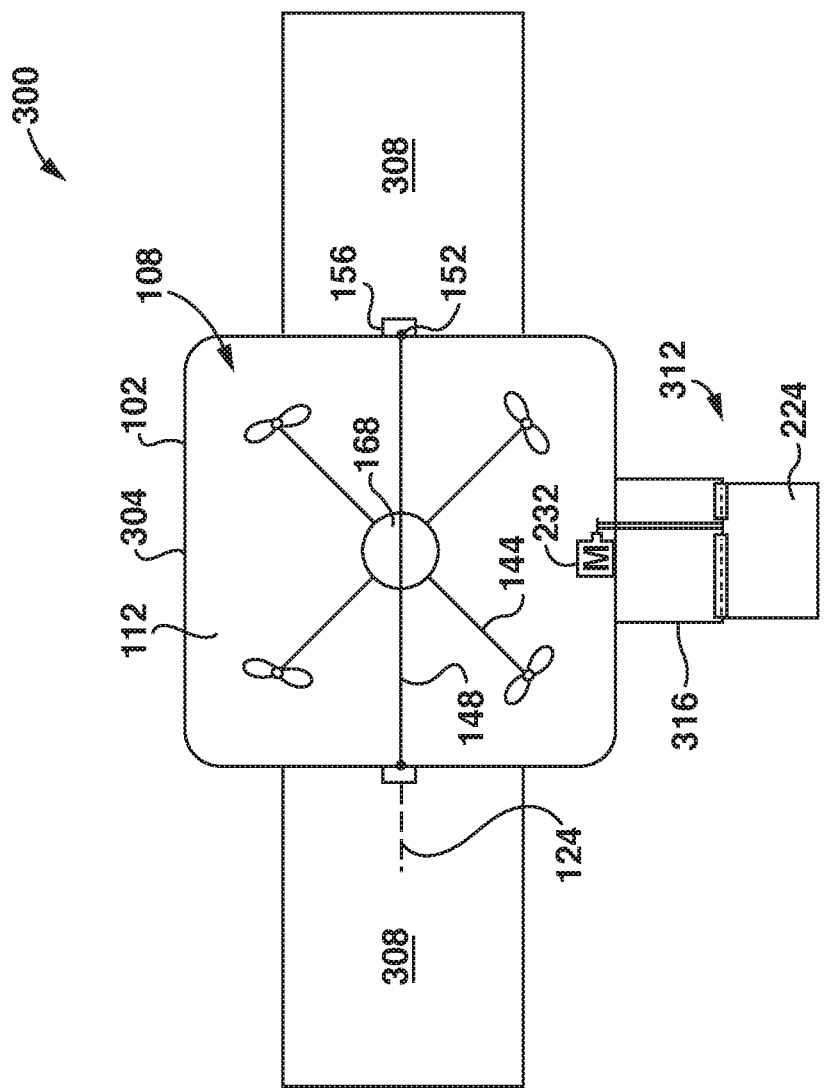
FIG. 9 is a top plan view schematic of an aerial vehicle in accordance with another embodiment.

Reference is now made to FIG. 9, where like part numbers refer to like parts in the previous figures, and where an aerial vehicle 300 in accordance with another embodiment is shown. As exemplified, aerial vehicle 300 may include a body 102 having a frame 304, wings 308, and a tail 312. A multicopter 108 is positioned in a multicopter opening 112 of frame 304. Further, multicopter 108 is freely rotatably mounted to frame 304 similarly to how multicopter 108 is freely rotatably mounted to wing 104 in aerial vehicle 100 (see FIG. 1). This may permit multicopter 108 to rotate about multicopter axis 124 independently of the frame 304, wings 308, and tail 312 for transitioning between the multicopter configuration and the fixed wing configuration, as described above with respect to aerial vehicle 100.

Still referring to FIG. 9, each wing 308 may extend laterally outwardly from vehicle frame 304. Wings 308 may have a cross-sectional shape suitable for producing lift in response to forward movement through air. For example, each wing 308 may be shaped as an aerofoil. This may permit wings 308 to contribute lift to aerial vehicle 300 when operating in the fixed wing configuration where multicopter 108 may be oriented forwardly to provide forward thrust.

As exemplified, tail 312 may extend rearwardly from vehicle frame 304. Tail 312 may be directly connected in contact with vehicle frame 304 or rearwardly spaced apart from vehicle frame 304. In the illustrated embodiment, tail 312 is shown rearwardly spaced apart from vehicle frame 304 by a tail bracket 316. Tail 312 may be a passive tail without control surfaces (e.g. similar to tail 236 of FIG. 7), or tail may be an active tail with one or more control surfaces (e.g. similar to tail 236 of FIG. 8). In the illustrated embodiment, tail 312 is an active tail formed as a control surface 224. Control surface 224 may be selectively rotatable (e.g. pivotable) upwardly and downwardly by activating control surface motor 232 (e.g. by control signals from hardware controller 168). This may permit control surface 224 to create drag to operate as an elevator for influencing the pitch of aerial vehicle 300.

Still referring to FIG. 9, frame 304 may have any shape. In the illustrated example, frame 304 is substantially square in top plan view. In alternative embodiments, frame 304 may have another regular shape (e.g. circular, triangular, octagonal) or an irregular shape.

Reference is now made to FIG. 21, where like part numbers refer to like parts in the previous figures, and where an aerial vehicle 600 in accordance with another embodiment is shown. As shown, aerial vehicle 600 may include a body 102, including a frame 304 and wings 308. In the illustrated example, wings 308 extend laterally outwardly of frame 304 along lateral wing axis 120. Frame 304 is shown extending downwardly, transverse to wings 120. Multicopter 108 is rotatably mounted (e.g. freely rotatably mounted) to frame 304 similarly to how multicopter 108 is rotatably mounted to wing 104 in aerial vehicle 100 (see FIG. 1). As exemplified, multicopter axis 124 may extend parallel to and spaced apart below lateral wing axis 120.

In some embodiments, aerial vehicle 600 may further include a counterweight 602 mounted to body 102. As shown, counterweight 602 may be permanently or removably mounted to the bottom of frame 304. Counterweight 602 may help to maintain aerial vehicle 600 oriented so that frame 304 (and multicopter 108) extends below wings 308. In some embodiments, counterweight 602 may be a functional component, such as an energy source (e.g. batteries or fuel). In alternative embodiments, aerial vehicle 600 may not include counterweight 602.

Figure 22:
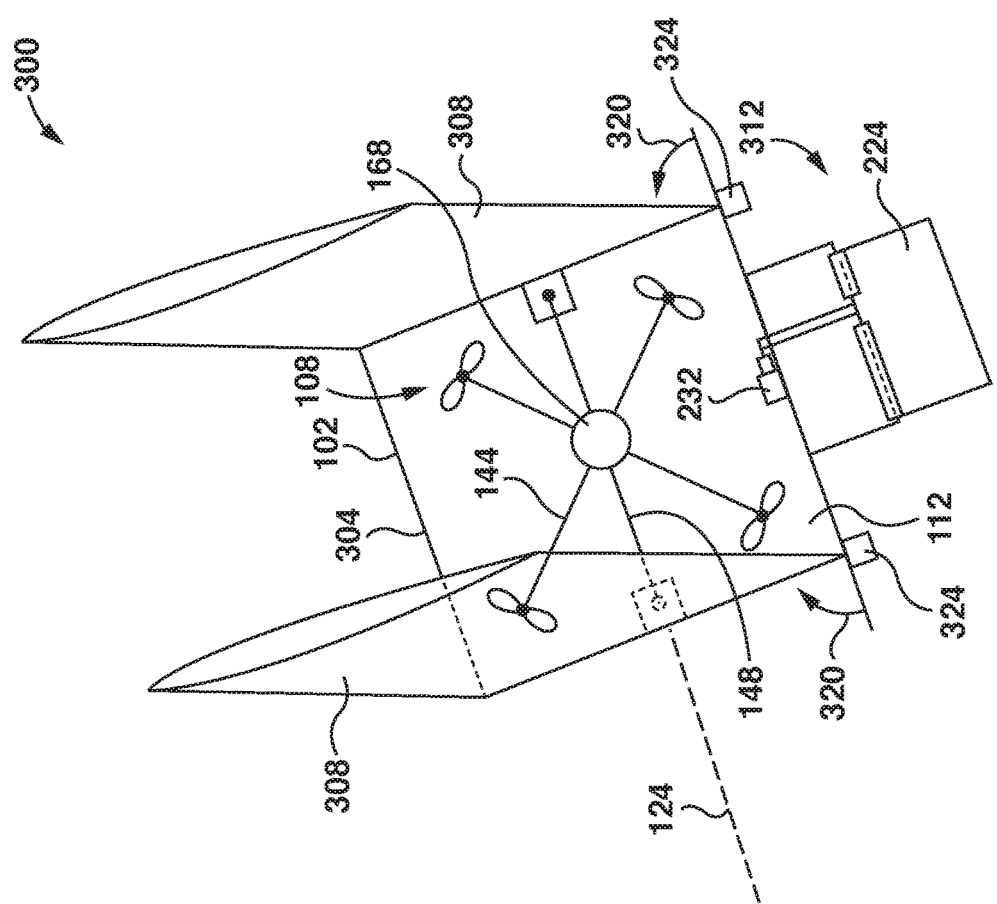
FIG. 22 is a perspective view of an aerial vehicle with wings rotated upwardly.

Referring to FIG. 22, in some embodiments, wings 308 may be upwardly or downwardly rotatable relative to multicopter 108. For example, wings 308 may be rotated upwardly as shown or downwardly, in the multicopter configuration or for compact storage. In the multicopter configuration, turning wings 308 upwardly or downwardly may reduce the resistance from wings 308 during vertical takeoff and landing, and may permit aerial vehicle 300 to land in a smaller area.

Wings 308 may be upwardly or downwardly rotatable relative to multicopter 108 by any wing angle 320. For example, wing angle 320 may be less than 30 degrees, such as 0 degrees, in the fixed wing configuration, and wing angle 320 may be at least 30 degrees, such as 90 degrees in the multicopter configuration.

Wings 308 may be upwardly or downwardly rotatable relative to multicopter 108 in any manner. As exemplified, wings 308 may be pivotably connected to frame 304. Wing motors 324 may be selectively activated (e.g. by control signals from controller 168) to rotate wings 308 to the desired wing angle 320. In an alternative embodiment, upward or downward rotation of wings 308 may be exclusively manually operated (e.g. free of electronic actuators) or additionally manually operated for the purpose of making aerial vehicle 300 more compact for storage.

Reference is now made to FIG. 15 where like part numbers refer to like parts in the previous figures, and where an aerial vehicle 500 in accordance with another embodiment is shown. As shown, aerial vehicle 500 may include a body 102, including a wing 104 and a tail 236. Body 102 is shown positioned between rotors 136 of multicopter 108. As exemplified, multicopter rotors 136 may be rotatably coupled (e.g. freely rotatably coupled) to body 102 by a multicopter axle 148 which extends laterally across and outboard of wing 104. As exemplified, this allows body 102 to be free of multicopter openings 112 (FIG. 1), which may enhance the aerodynamics of body 102.

Still referring to FIG. 15, multicopter 108 is rotatable as a whole (i.e. a unitary element) about multicopter axis 124 relative to body 102. That is, all multicopter rotors 136 of multicopter 108 are collectively rotatable about multicopter axis 124 relative to body 102.

Figure 10:
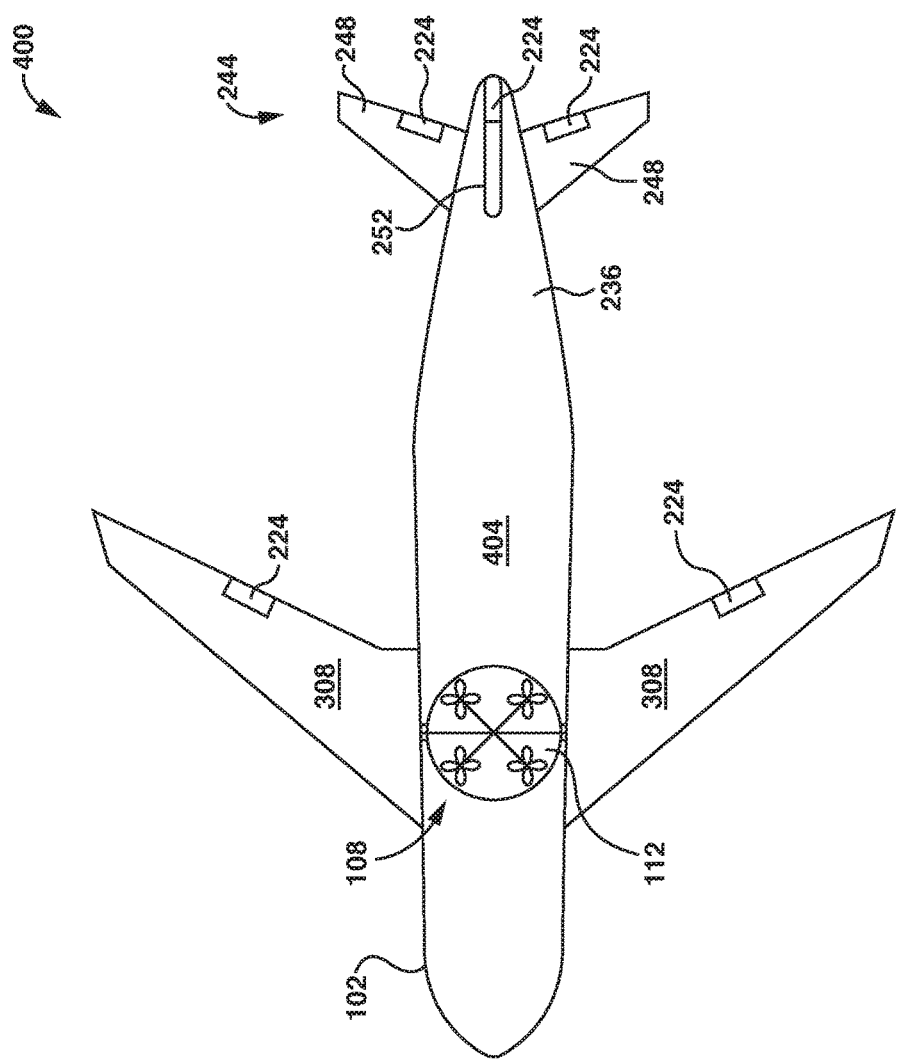
FIG. 10 is a top plan view schematic of an aerial vehicle in accordance with another embodiment.

Reference is now made to FIG. 10 where like part numbers refer to like parts in the previous figures, and where an aerial vehicle 400 in accordance with another embodiment is shown. As shown, aerial vehicle 400 may be shaped as a traditional airplane including a body 102 having a fuselage 404, wings 308, and a tail 236. Multicopter 108 may be positioned in multicopter opening 112 formed in fuselage 404, and freely rotatably mounted to fuselage 404 analogously to the description above with respect to the mounting of multicopter 108 in aerial vehicle 100.

As shown, tail 236 may include a tailplane 244 including left and right horizontal stabilizers 248, and a vertical stabilizer 252. One or more (or all) of stabilizers 248 and 252 may include a control surface 224. In the illustrated example, each horizontal stabilizer 248 includes a horizontal control surface 224, which may act as elevators for influencing pitch, and vertical stabilizer 252 includes a vertical control surface 224, which may act as a rudder for influencing yaw. Tail 236 may be formed of any material, which may be rigid for example.

Fuselage 404 may provide storage capacity for transporting cargo and/or passengers as in a traditional airplane. Multicopter 108 may provide lift for vertical takeoff and landing in the multicopter configuration. Wings 308 may be appropriately shaped (e.g. as aerofoils) to provide lift in the fixed wing configuration where multicopter 108 is angled forwardly to provide forward thrust. One or both of wings 308 and tail 236 may include one or more control surfaces 224, which may act as ailerons, elevators, rudders, or combinations thereof.

Figure 11:
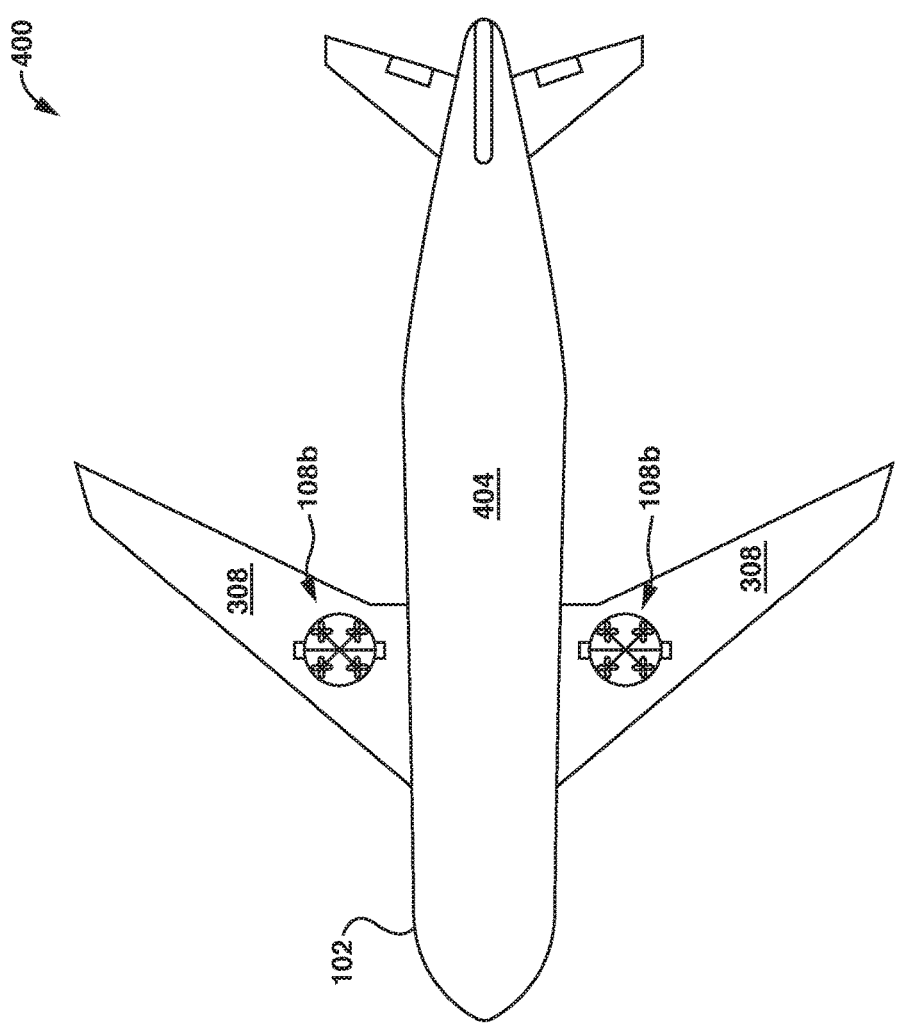
FIG. 11 is a top plan view schematic of an aerial vehicle in accordance with another embodiment.

Reference is now made to FIG. 11. As an alternative to or in addition to positioning a multicopter 108 in a multicopter opening 112 formed in fuselage 404, aerial vehicle 400 may include one or more multicopters 108b positioned in multicopter openings 112 in wings 308. Each multicopter 108b may be freely hingedly mounted to a respective wing 308 analogously to the description above with respect to the mounting of multicopter 108 in aerial vehicle 100. In one aspect, multicopters 108*b* may provide enhanced control over the roll of aerial vehicle 400. For example, multicopters 108*b* may be controlled to produce different magnitudes of thrust to influence the roll of aerial vehicle 400. In another aspect, multicopters 108*b* may substitute a multicopter positioned in fuselage 404 as shown, which may permit fuselage 404 to carry more cargo and/or passengers.

Reference is now made to FIG. 20, which shows another embodiment of aerial vehicle 100. In the illustrated embodiment, aerial vehicle 100 includes a multicopter 108 rotatably mounted (e.g. freely rotatably mounted) in a multicopter opening 112. As shown, body 102 is free of control surfaces. Instead, stabilization system 188 may include four stabilization rotors 192. In some embodiments, stabilization rotors 192 may be operated (e.g. by control signals from hardware controller 168) in the fixed-wing configuration for steering (e.g. to pitch and roll wing 104).

Figure 12:
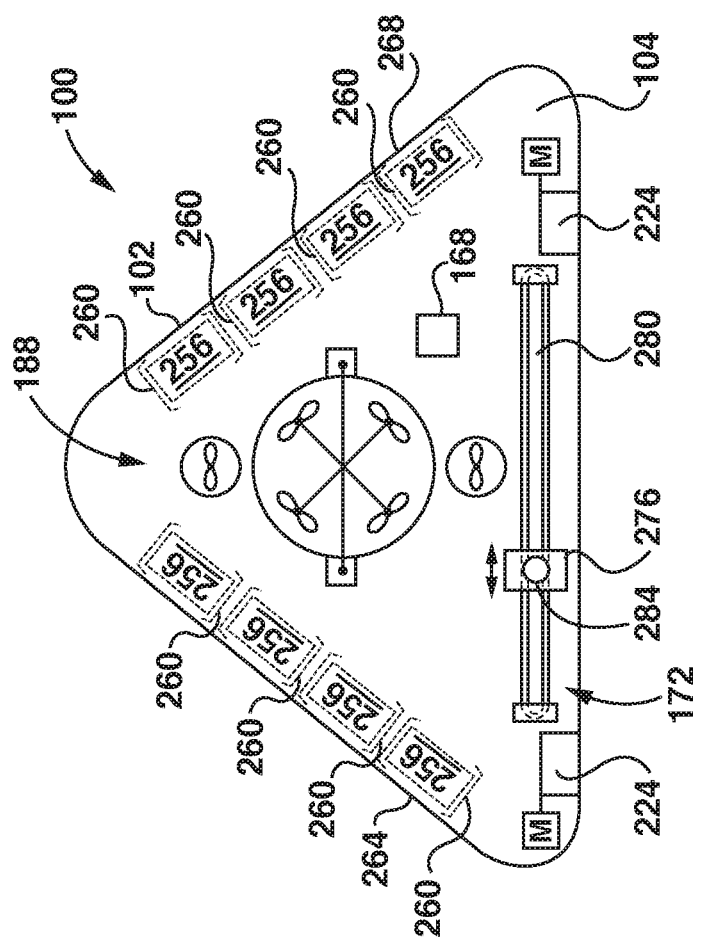
FIG. 12 is a top plan view schematic of an aerial vehicle in accordance with another embodiment.

Reference is now made to FIG. 12. In some embodiments aerial vehicle 100 may be configured to carry one or more articles of cargo 256 (referred to herein as packages). For example, aerial vehicle 100 may include one or more releasable cargo mounts 260 for holding packages 256 (e.g. suspended below wing 104). Cargo mounts 260 may include any retention members (e.g. straps, arms, brackets, etc.), and may be manually releasable (e.g. by hand), and/or electronically releasable (e.g. by control signals from hardware controller 168). This may permit aerial vehicle 100 to operate as a delivery drone for delivering packages (e.g. to fulfill internet orders).

Aerial vehicle 100 may include any number of cargo mounts 260. For example, aerial vehicle 100 may include 1 or more cargo mounts. In the illustrated embodiment, aerial vehicle 100 includes 8 cargo mounts.

Cargo mounts 260 may have any size. For example, all cargo mounts 260 may be configured for holding similarly sized packages 256 as shown, or at least one cargo mount 260 may be configured for holding a differently sized (e.g. larger or smaller) package 256. In some cases, cargo mounts 260 may be adjustable for holding a variety of package sizes, and/or combinable for holding larger sized packages 256 (e.g. double, triple, or quadruple sized packages 256).

Cargo mounts 260 may be positionally arranged in any manner about aerial vehicle 100. For example, cargo mounts 260 may be arranged to hold packages aligned in rows, columns, or arbitrary positions about aerial vehicle 100. In the illustrated embodiment, cargo mounts 260 are positioned to hold packages 256 in a single file row proximate each of the left and right sides 264 and 268 of wing 104. Cargo mounts 260 may be connected to any portion of aerial vehicle 100. For example, cargo mounts 260 may be connected to the body 102 of aerial vehicle 100, such as to wing 104.

It will be appreciated that packages 256 may act to laterally and/or longitudinally offset the center of gravity of aerial vehicle 100. For example, packages 256 may be asymmetrically arranged about wing 104, or packages 256 may be asymmetrically weighted about wing 104. The asymmetry of packages 256 may be further aggravated upon releasing (e.g. delivering) a subset of packages 256 being carried by aerial vehicle 100. Unless compensated for, an offset center of gravity may cause aerial vehicle 100 to unwantedly pitch, roll, or yaw.

In some embodiments, aerial vehicle 100 may include a mass balancing system 272 mounted to the body 102 of aerial vehicle 100 (e.g. connected to wing 104). Mass balancing system 272 may include one or more masses 276 (e.g. relatively heavy solid object or liquid volume) which is selectively movable to help restore the center of gravity of aerial vehicle 100. In some embodiments, masses 276 may be a functional component such as an energy source (e.g. battery or fuel). Each mass 276 may be movable in any direction. For example, mass 276 may be laterally movable as shown, longitudinally movable (see FIG. 13), or both. In a simple example, if a package 256 is released from the left side of aerial vehicle 100, then mass 276 may be moved leftwardly to compensate.

Mass 276 may be movable in any manner. For example, mass 276 may be movable manually (e.g. by hand), or electronically (e.g. by control signals from hardware controller 168). In the illustrated embodiment, mass 276 is a solid object mounted to slide along a rail 280. In this example, a motor 284 (which may constitute mass 276 or contribute to the weight of mass 276) may be connected to mass 276 for moving mass 276 along rail 280. For example, motor 284 may be mounted to mass 276 and drive a sprocket or wheel (not shown) which engages rail 280 to move mass 276 along rail 280.

Figure 13:
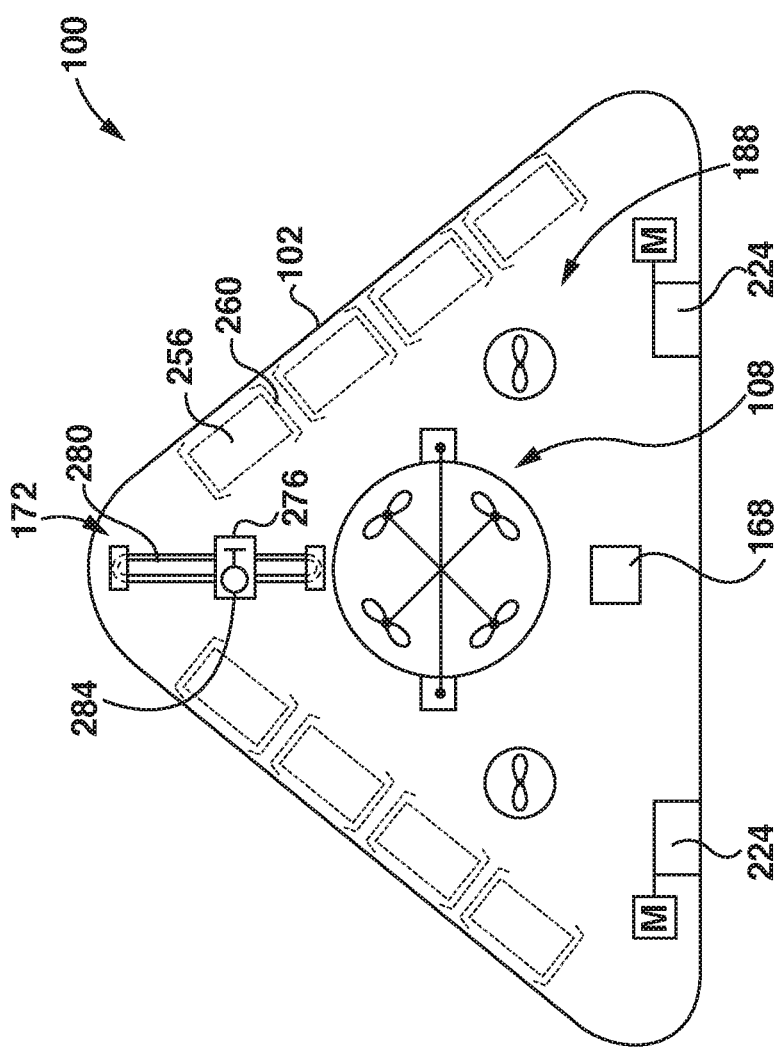
FIG. 13 is a top plan view schematic of an aerial vehicle in accordance with another embodiment.
Figure 14:
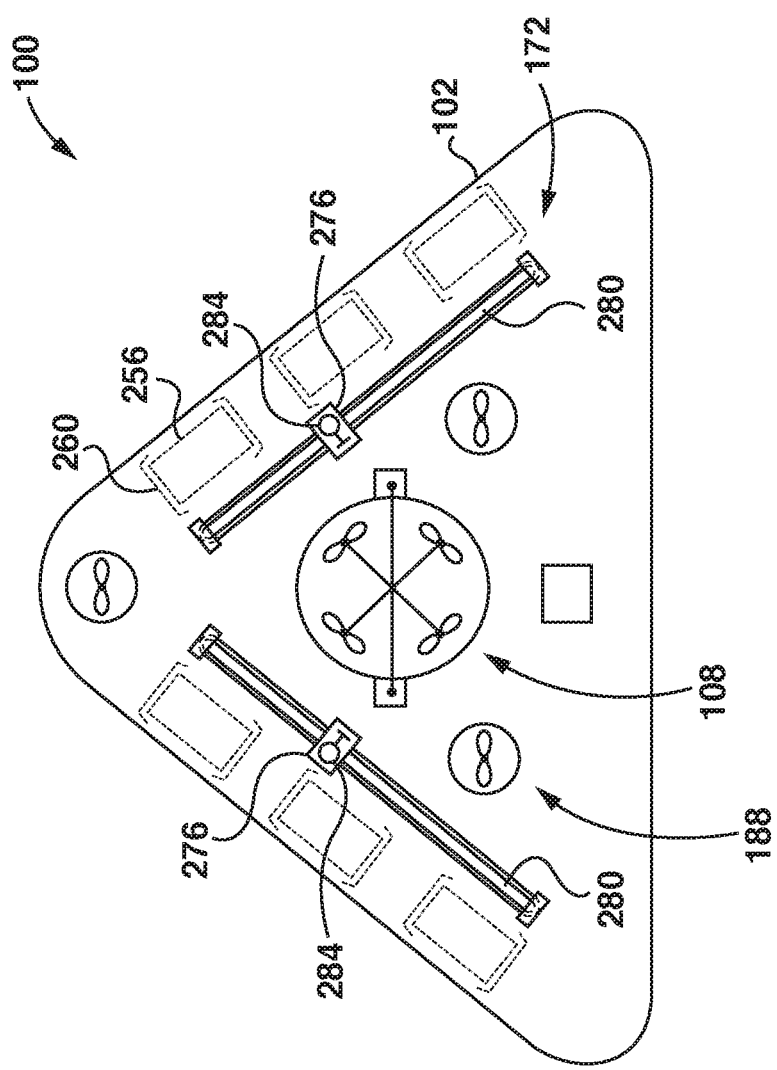
FIG. 14 is a top plan view schematic of an aerial vehicle in accordance with another embodiment.

It will be appreciated that as an alternative to, or in addition to mass balancing system 272, aerial vehicle 100 may include a wing stabilization system 188 and/or control surfaces 224 to help counteract pitch, yaw, or roll caused by mass imbalances. For example, FIG. 12 shows an example including a mass balancing system 272 with a laterally movable mass 276 which may compensate for lateral mass imbalance that might cause roll, and a pitch stabilization system 188 which may be operable to compensate for longitudinal mass imbalance that might cause pitch. Similarly, FIGS. 13 and 14 show examples including a mass balancing system 272, with one or more longitudinally movable masses 276, which may compensate for longitudinal mass imbalance that might cause pitch, and a pitch stabilization system 188 which may be operable to compensate for lateral mass imbalance that might cause roll. In FIG. 13, mass 276 is longitudinally movable along a range of motion defined by rail 280 which is centered laterally and positioned forwardly of multicopter 108. In FIG. 14, two masses 276 are longitudinally movable along separate paths defined by separate rails 280 which are laterally outboard of opposite sides of multicopter 108, and which extend forwardly and rearwardly of multicopter 108.

Figure 23:
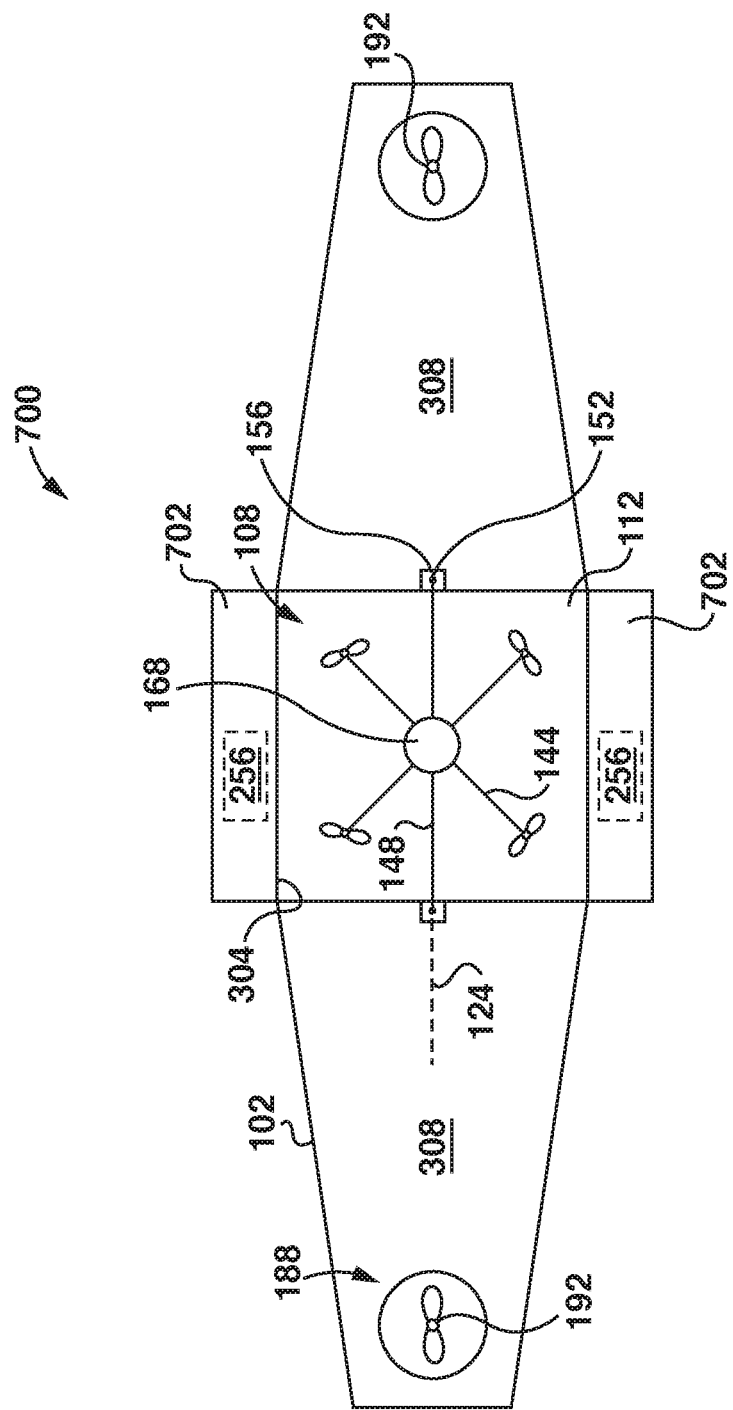
FIG. 23 is a top plan view schematic of an aerial vehicle in accordance with another embodiment.

Reference is now made to FIG. 23, where like part numbers refer to like parts in the other figures, and where an aerial vehicle 700 is shown in accordance with another embodiment. As shown, body 102 may include frame 304, wings 308, and cargo holds 702. Cargo holds 702 may provide storage for packages 256. Packages 256 can be manually stored in cargo holds 702. Optionally, packages 256 may be selectively jettisoned (e.g. by control signals) from cargo holds 702 (e.g. to complete a package delivery).

Cargo holds 702 may be positioned anywhere on aerial vehicle 700. In the illustrated example, cargo holds 702 are positioned forwardly and rearwardly of multicopter 108. This may help to distribute the weight of packages 256 on aerial vehicle 700.

It will be appreciated that in any of the embodiments disclosed herein, the body 102 of the aerial vehicle (100, 200, 300, 400, 500, 600, or 700) may be provided as a subassembly (e.g. retrofit kit) for attachment with a compatible (e.g. appropriately sized) multicopter 108. This allows an existing multicopter 108 to be enhanced with a fixed wing configuration.

Figure 16:
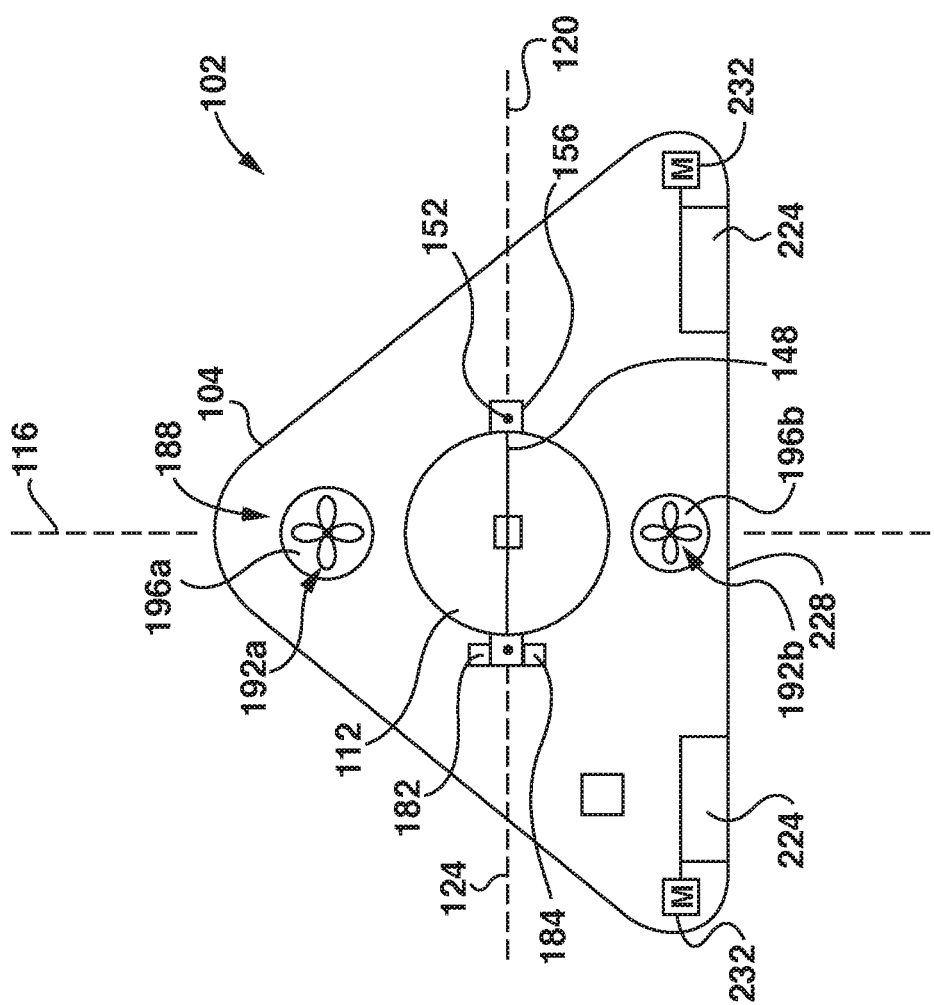
FIG. 16 is a top plan view schematic of an aerial vehicle in accordance with another embodiment.

FIG. 16 shows an example of body 102 of aerial vehicle 100 of FIG. 1, which is suitable for attachment to an existing multicopter. Body 102 may be connected to a multicopter in any manner that allows the multicopter to rotate about the multicopter axis 124. In the illustrated embodiment, wing 104 of body 102 includes an axle 148 which extends across multicopter opening 112 and which is rotatably mounted to wing 104 by axle bearings 156. As shown, a multicopter mounting bracket 288 may be secured to axle 148 in any manner, such as by screws, bolts, welds, magnets, straps, or by integrally forming multicopter mounting bracket 288 and axle 148. A multicopter may be rigidly fastened to multicopter mounting bracket 288 in any manner, such as by screws, bolts, welds, magnets, or straps. In some embodiments, multicopter mounting bracket 288 may accommodate a releasable connection to a multicopter so that the multicopter can be selectively disconnected from body 102 as desired.

In alternative embodiments, axle 148 may be rigidly connected to wing 104 in any manner, such as by screws, bolts, welds, or by integrally forming axle 148 and wing 104. In this case, multicopter mounting bracket 288 may be rotatably mounted to axle 148 in any manner suitable for allowing the multicopter connected to mounting bracket 288 to rotate about multicopter axis 124.

Figure 19:
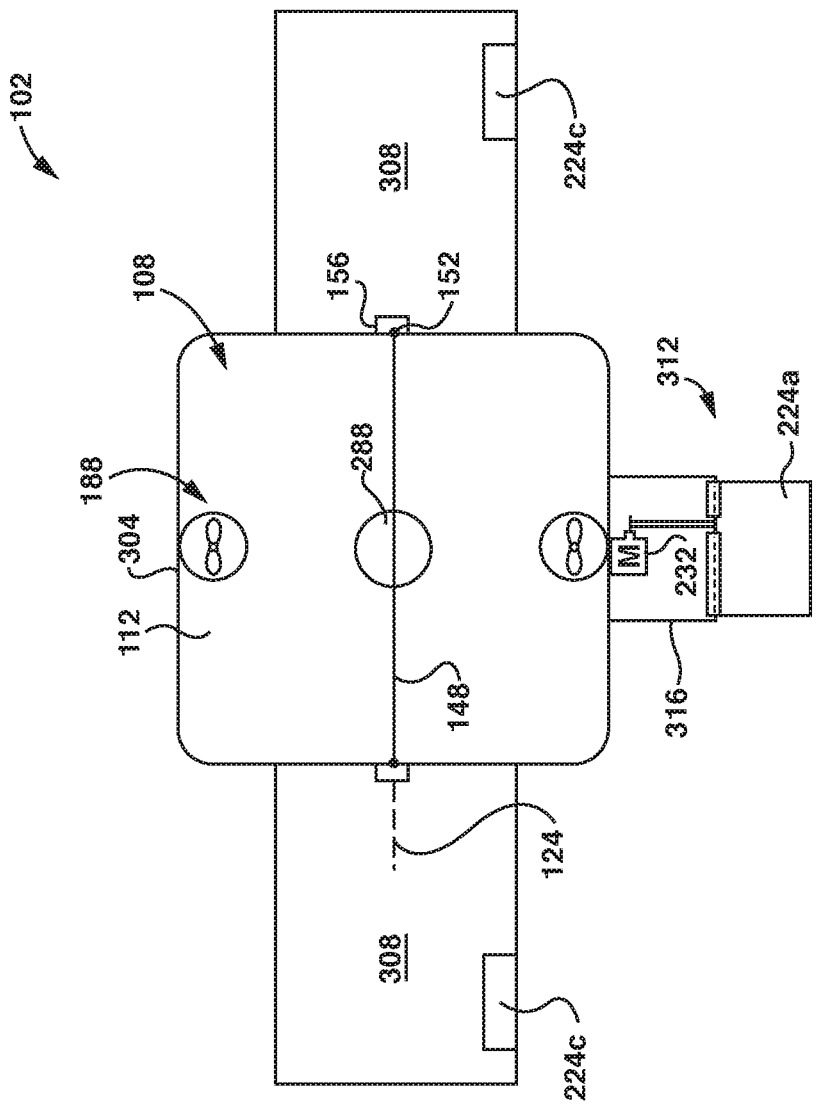
FIG. 19 is a top plan view schematic of an aerial vehicle in accordance with another embodiment.

FIG. 19 shows another example of a body 102 suitable for attachment to an existing multicopter. As shown, body 102 may include stabilization system 188, wings 308 with control surfaces 224c, and tail 312 with control surface 224a. As with the embodiment of FIG. 16, body 102 may be connected to a multicopter in any manner that allows the multicopter to rotate about the multicopter axis 124. In the illustrated embodiment, frame 304 of body 102 includes an axle 148 which extends across multicopter opening 112 and which is rotatably mounted to frame 304 by axle bearings 156. As shown, a multicopter mounting bracket 288 may be secured to axle 148 in any manner, such as by screws, bolts, welds, magnets, straps, or by integrally forming multicopter mounting bracket 288 and axle 148. As described with respect to FIG. 16, a multicopter may be rigidly fastened to multicopter mounting bracket 288 in any manner, multicopter mounting bracket 288 may accommodate a releasable connection to a multicopter, and axle 148 may alternatively be rigidly connected to frame 304 and multicopter mounting bracket 288 rotatably mounted to axle 148.

Figure 17:
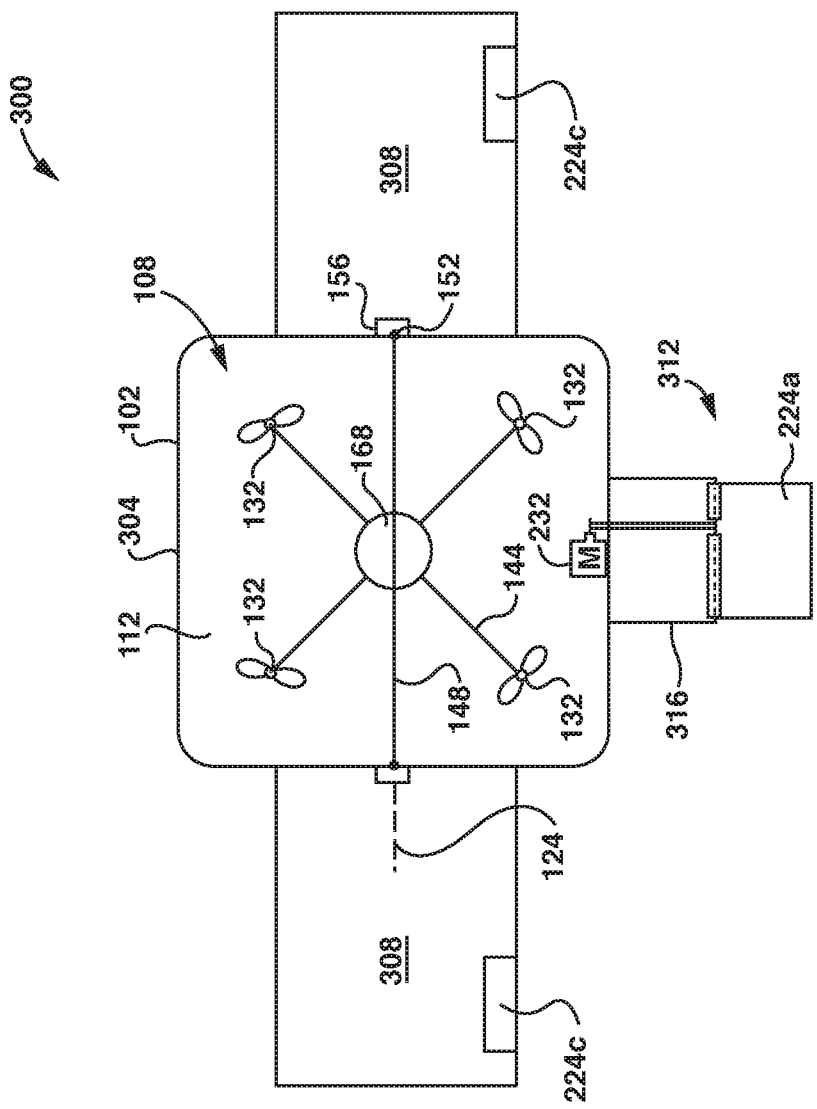
FIG. 17 is a top plan view schematic of an aerial vehicle in accordance with another embodiment.

Referring to FIG. 17, aerial vehicle 300 may provide simplified movement control. For example, in some embodiments, aerial vehicle 3 may have seven degrees of freedom and effectively seven actuators, which may be mapped to a square 7×7 matrix. As a square matrix, it is invertible and single-solution. This may reduce the computational demand on hardware controller 168. For example, when a user directs hardware controller 168 (e.g. by remote control) to produce a specific movement in one or more of the seven degrees of freedom, the hardware controller 168 may resolve a single solution (e.g. a single set of instructions for the seven actuators). In contrast, where there are more actuators than degrees of freedom (e.g. an 8×7 matrix), there will be several solutions for each movement scenario, which may require hardware controller 168 to assess and select the best solution. This may be more computationally intensive. Still, in some embodiments, aerial vehicle 300 has more actuators than degrees of freedom.

The seven degrees of freedom include movement along three axes (e.g. x, y, z) and rotation about the three axes (e.g. roll, yaw, and pitch), as well as rotation of the body 102 about multicopter axis 124 relative to multicopter 108. In the illustrated embodiment, the seven actuators may include the four multicopter rotors 132, the two control surfaces 224c of wings 308, and the control surface 224a of tail 312. The rotational connection between multicopter 108 and wing 104 may be unactuated (i.e. free of torque producing devices).

In some embodiments, a group of two or more actuators may operate synchronously as effectively one actuator. As used herein, and in the claims, a group of actuators are said to operate "synchronously" where those actuators are operated according to a predefined fixed relationship. For example, hardware controller 168 may be configured to control two synchronously operated actuators according to a predefined relationship which may be to actuate the two actuators identically, oppositely, or according to one or more mathematical correlations.

Referring to FIG. 1, aerial vehicle 100 may be characterized as having effectively seven actuators including the four multicopter rotors 132, the two stabilization rotors 192, and the two control surfaces 224. In this example, the two stabilization rotors 192 may operate synchronously as effectively one actuator, or the two control surfaces 224 may operate synchronously as effectively one actuator.

Referring to FIG. 8, aerial vehicle 100 may be characterized as having effectively seven actuators including the four multicopter rotors 132, the two stabilization rotors 192, the two control surfaces 224a, and the control surface 224b. In this example, the two stabilization rotors 192 may operate synchronously as effectively one actuator, and the two control surfaces 224 may operate synchronously as effectively one actuator.

Figure 18:
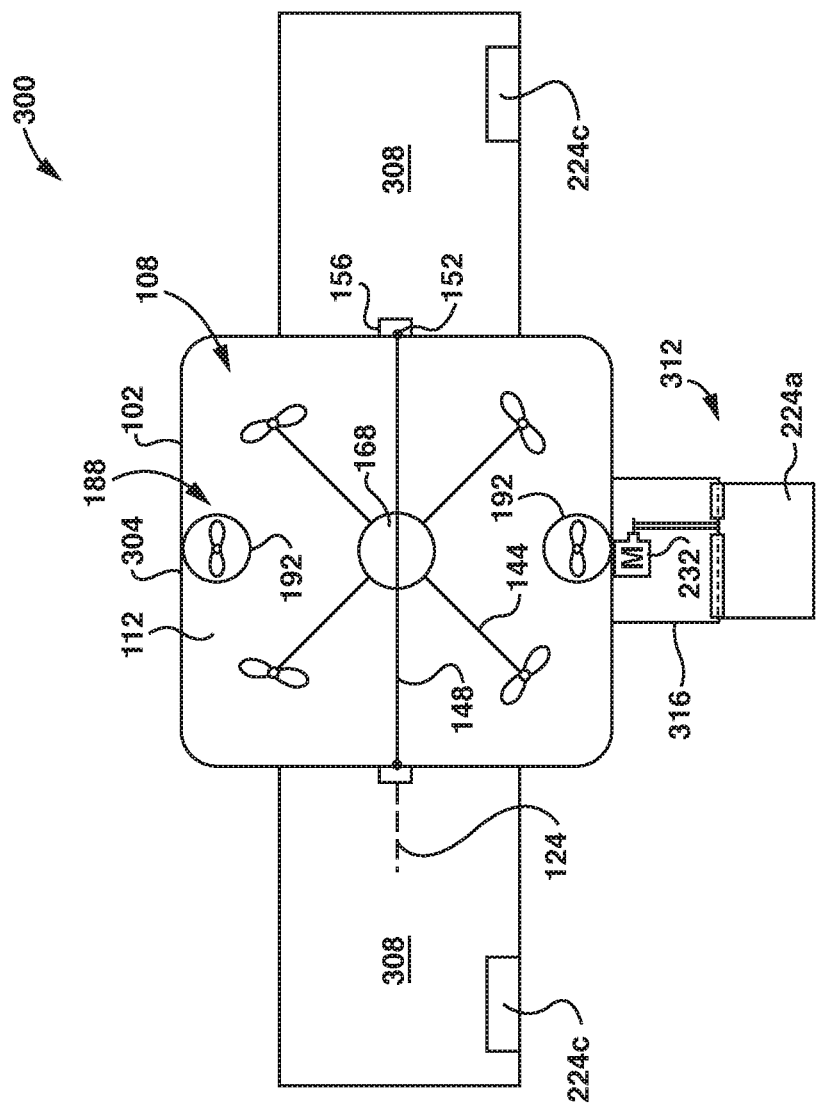
FIG. 18 is a top plan view schematic of an aerial vehicle in accordance with another embodiment.

Referring to FIG. 18, aerial vehicle 300 may be characterized as having effectively seven actuators including the four multicopter rotors 132, the two stabilization rotors 192, the one control surface 224a, and the two control surfaces 224c. In this example, the two stabilization rotors 192 may operate synchronously as effectively one actuator, and the two control surfaces 224c may operate synchronously as effectively one actuator.

Figure 26:
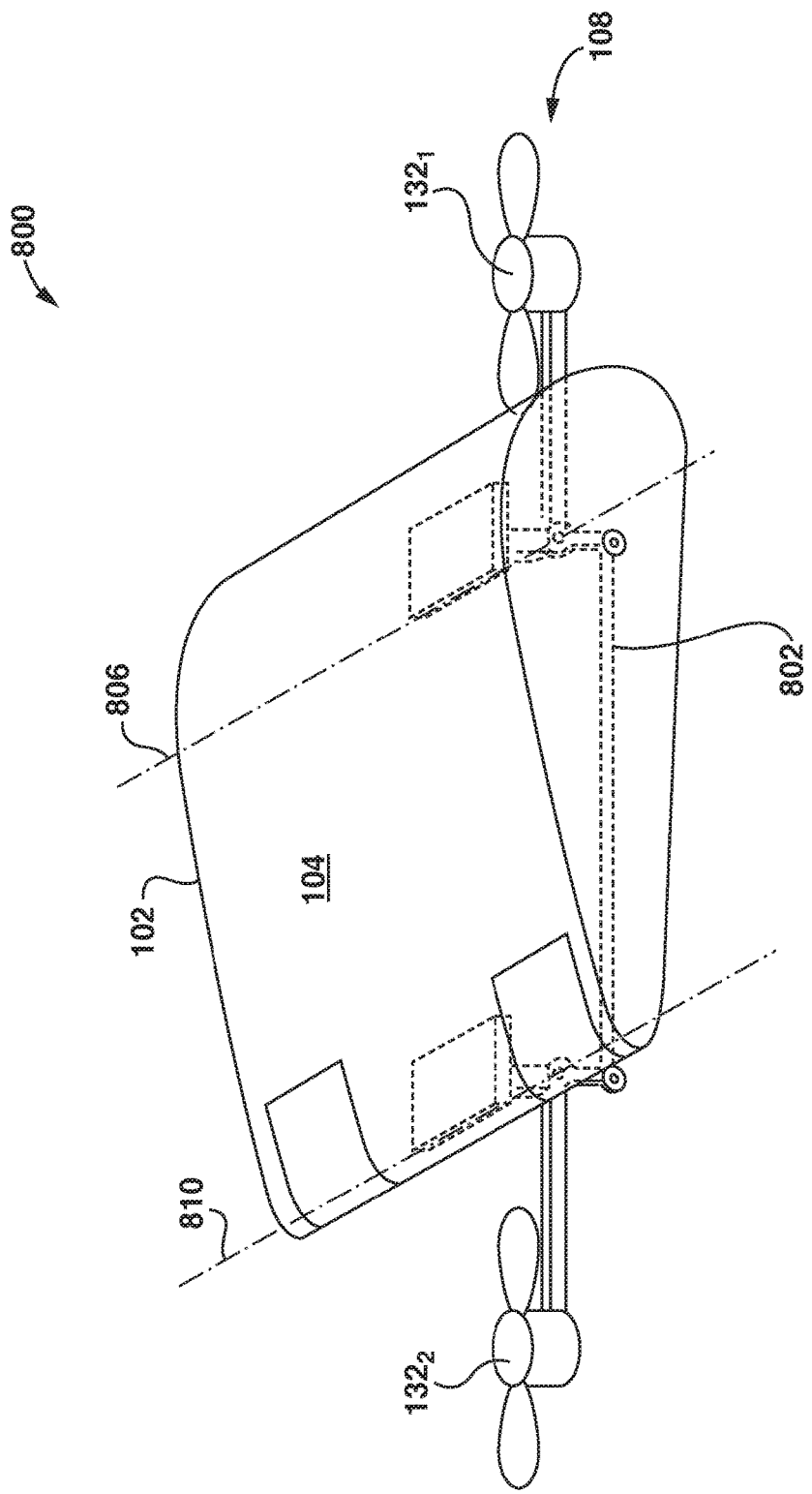
FIG. 26 is a perspective view of an aerial vehicle in a multicopter configuration, in accordance with another embodiment.

Reference is now made to FIG. 26, where like part numbers refer to like parts in the previous figures, and where an aerial vehicle 800 in accordance with another embodiment is shown. As shown, aerial vehicle 800 may include a body 102 including a wing 104, which is positioned between rotors 132 of multicopter 108. As exemplified, multicopter rotors 136 may be rotatably coupled (e.g. freely rotatably coupled) to body 102 by a multicopter linkage 802 which extends forwardly and rearwardly of wing 104. This allows body 102 to be free of multicopter openings 112 (FIG. 1), which may enhance the aerodynamics of body 102, and make multicopter 108 more easily retrofitted to existing aerial vehicles.

Still referring to FIG. 26, multicopter 108 may include one or more first multicopter rotors $132_1$, and one or more second multicopter rotors $132_2$ connected to wing 104 by a multicopter linkage 802. First multicopter rotors $132_1$ may be positioned forwardly of second multicopter rotors $132_2$. In the illustrated example of a multicopter configuration, the first multicopter rotors $132_1$ are positioned forwardly of wing 104, and the second multicopter rotors $132_2$ are positioned rearwardly of wing 104. Multicopter linkage 802 allows the first multicopter rotors $132_1$ to rotate about a first axis 806, and allows the second multicopter rotors $132_2$ about a second axis 810, for moving between the multicopter and fixed-wing configurations.

Figure 27:
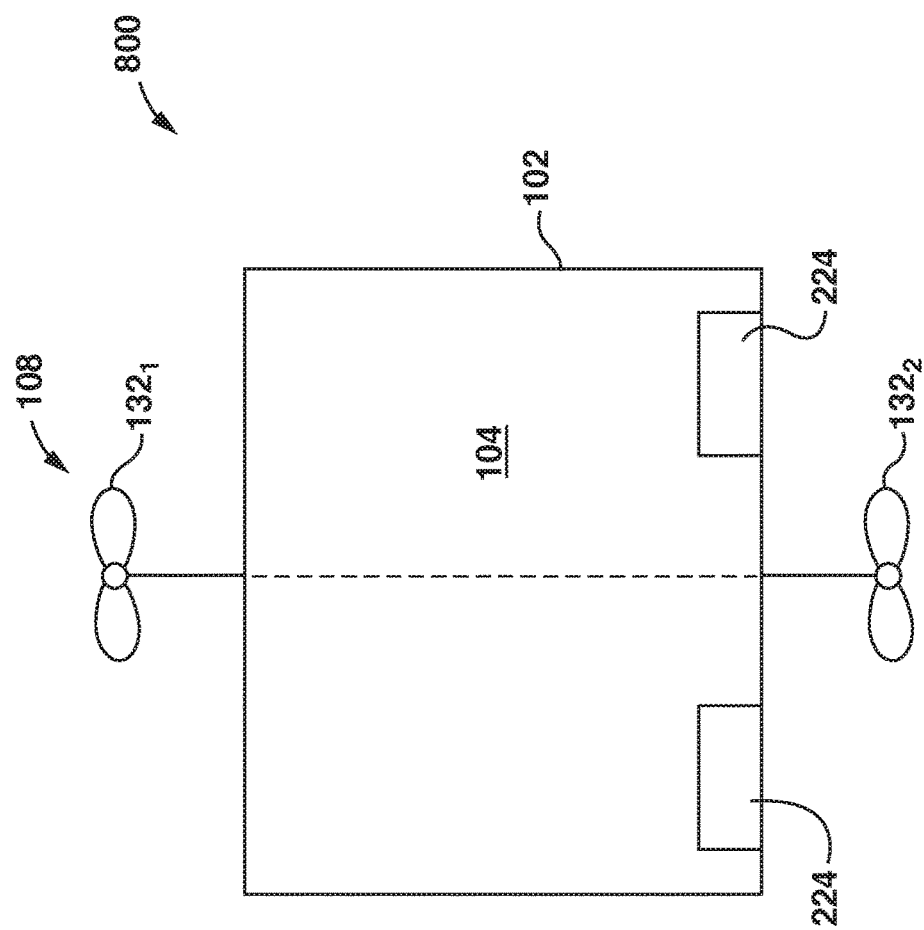
FIG. 27 is a top plan view of the aerial vehicle of FIG. 26.
Figure 28:
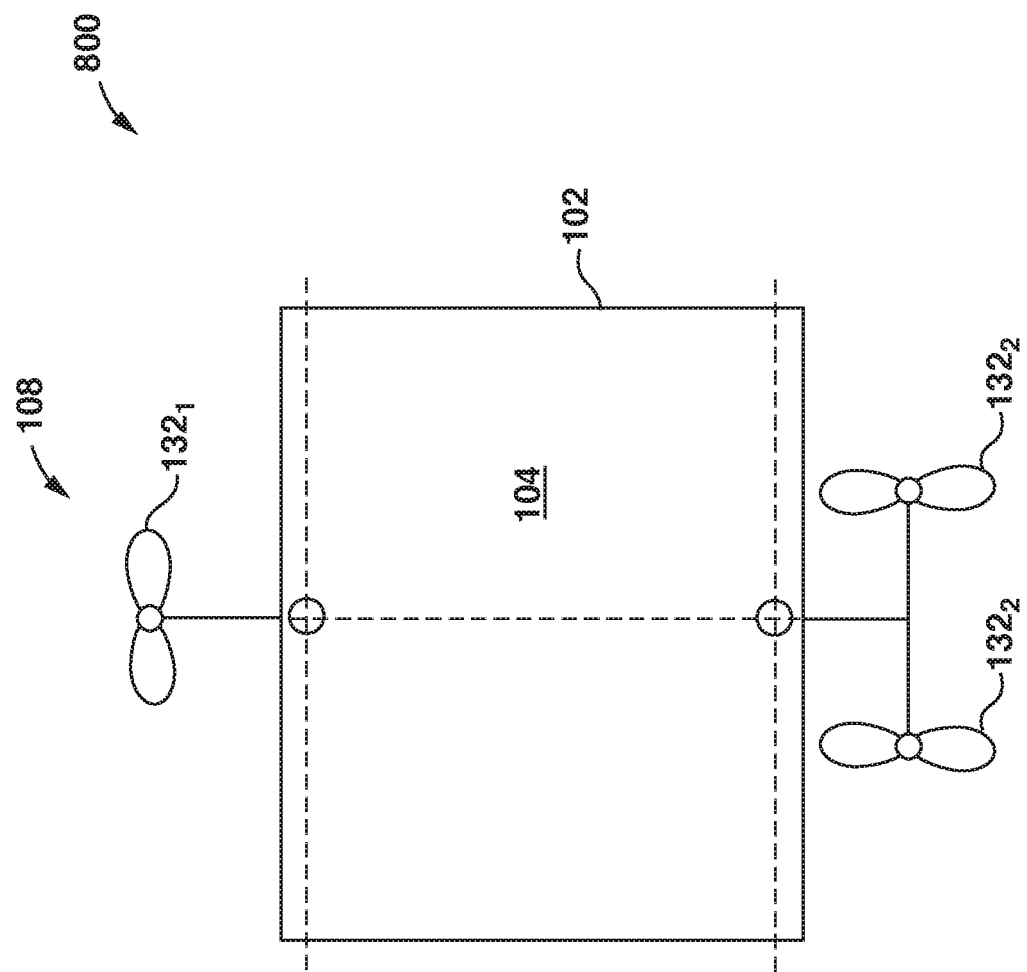
FIG. 28 is a top plan view of an aerial vehicle in accordance with another embodiment.
Figure 29:
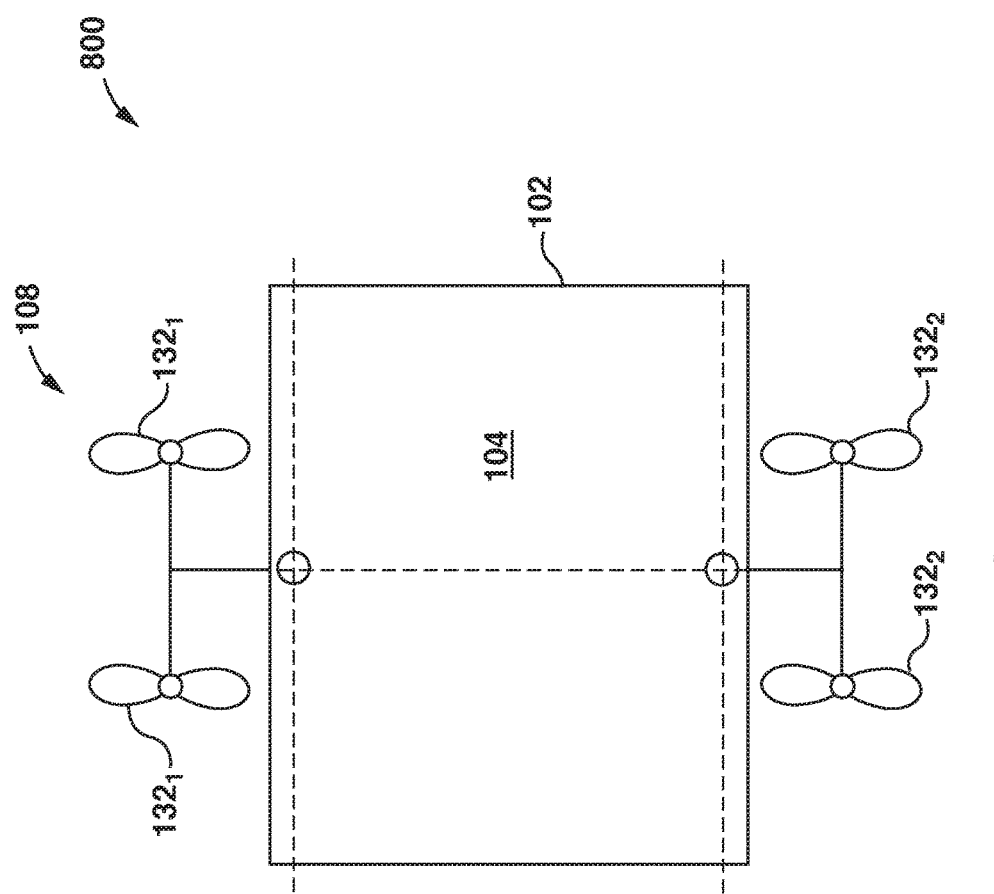
FIG. 29 is a top plan view of an aerial vehicle in accordance with another embodiment.

Multicopter 108 may include any number of first and second multicopter rotors $132_1$ and $132_2$. FIG. 27 shows an example of multicopter 108 including one first multicopter rotor $132_1$, and one second multicopter rotor $132_2$. In the illustrated example, aerial vehicle 800 may further include control surfaces 224 for additional control. FIG. 28 shows an example of multicopter 108 include one first multicopter rotor $132_1$, and two second multicopter rotors $132_2$. FIG. 29 shows an example of multicopter 108 including two first multicopter rotors $132_1$, and two multicopter rotors $132_2$.

Figure 30:
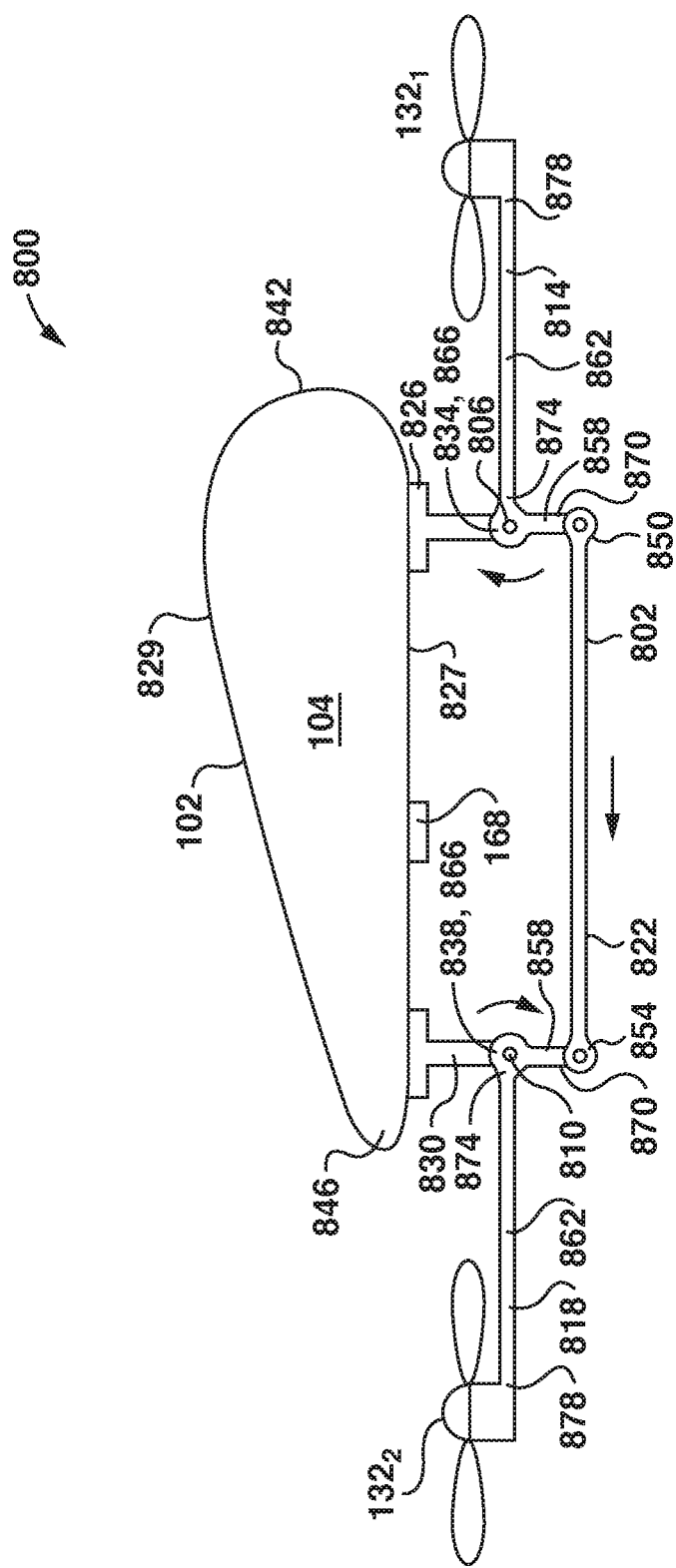
FIG. 30 is a side elevation view of the aerial vehicle of FIG. 26 in a multicopter configuration.
Figure 31:
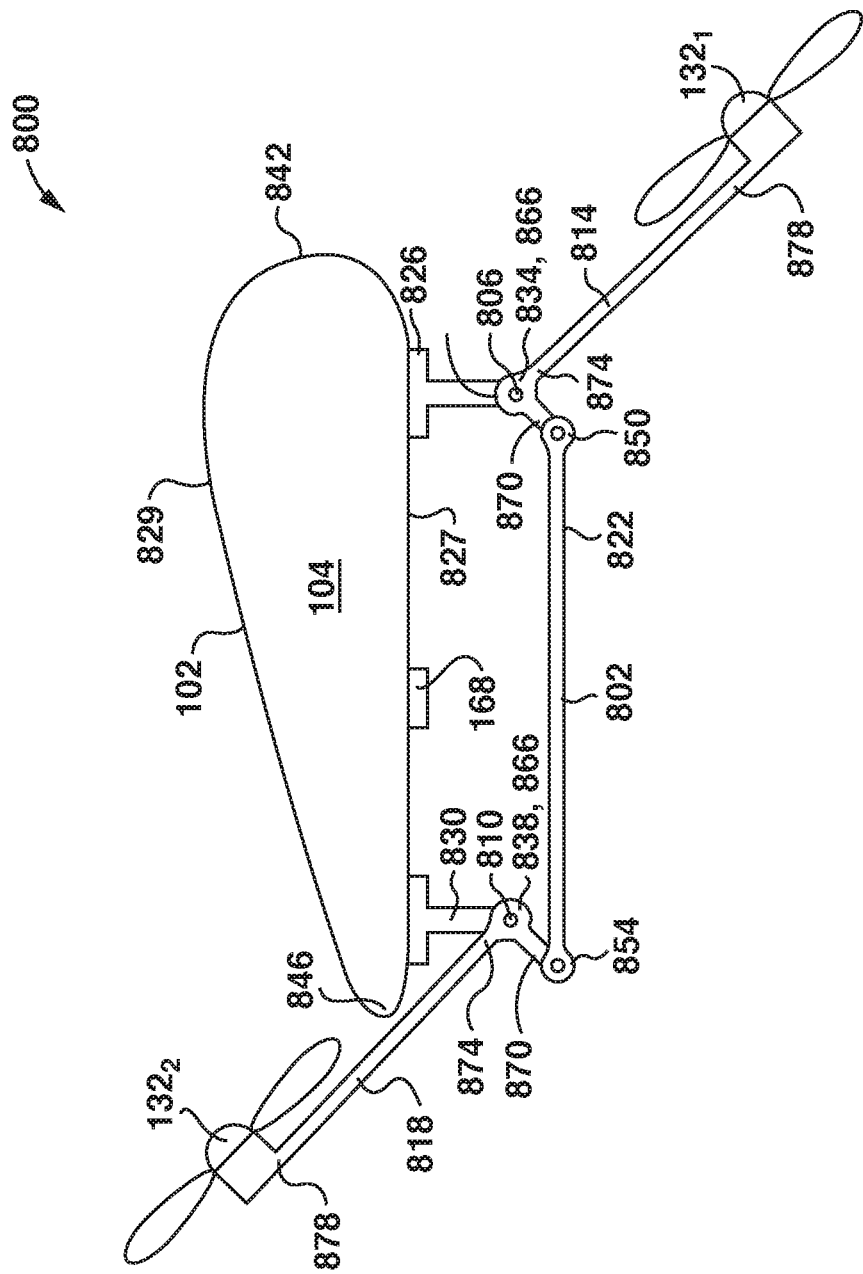
FIG. 31 is a side elevation view of the aerial vehicle of FIG. 26 in a fixed-wing configuration.

Reference is now made to FIGS. 30 and 31, which show aerial vehicle 800 in a multicopter configuration and a fixed-wing configuration, respectively. Multicopter linkage 802 may be any mechanical linkage that connects the first and second multicopter rotors $132_1$ and $132_2$ to wing 104 and allows the first and second multicopter rotors $132_1$ and $132_2$ to rotate about spaced apart first and second axes 806 and 810, respectively.

Multicopter linkage 802 synchronizes the movement of multicopter rotors $132_1$ and $132_2$ between the multicopter and fixed-wing configurations. This may optionally allow aerial vehicle 800 to be constructed free of actuators or other devices which directly apply torque to rotate multicopter rotors $132_1$ and $132_2$ about axes 806 and 810, respectively. Instead, the thrust developed by multicopter rotors $132_1$ and $132_2$ may be controlled (e.g. by hardware controller 168) to cause multicopter rotors $132_1$ and $132_2$ to move between the multicopter and fixed-wing configurations, substantially as described with respect to other embodiments. In other embodiments, aerial vehicle 800 may include one or more actuators or brakes (not shown) for moving or restricting the movement of multicopter rotors $132_1$ and $132_2$ between the multicopter and fixed-wing configurations.

In some embodiments, multicopter linkage 802 operates as a four-bar linkage. As shown, multicopter linkage 802 may include a first rotor arm 814 connected to multicopter rotor $132_1$, a second rotor arm 818 connected to multicopter rotor $132_2$, and a connecting arm 822. The first rotor arm is rotatably connected to wing 104 for rotation about the first axis 806, the second rotor arm is rotatably connected to wing 104 for rotation about the second axis 810, and connecting arm 822 is rotatably connected to both of the first and second rotor arms 814 and 818 for tying the rotation of the first and second rotor arms 814 and 818 together. For example, clockwise rotation of first multicopter rotor $132_1$ about first axis 806 relative to wing 104 moves connecting arm 822 which causes second multicopter rotor $132_2$ to rotate clockwise about second axis 810 relative to wing 104.

Rotor arms 814 and 818 may be rotatably connected to wing 104 in any manner that allows rotor arms 814 and 818 to rotate about first and second axes 806 and 810, respectively. In the illustrated example, first rotor arm 814 is shown rotatably mounted to a first mount 826 that is rigidly connected to an underside 827 of wing 104. Similarly, second rotor arm 818 is shown rotatably mounted to a second mount 830 that is rigidly connected to the underside of wing 104. As shown, first and second mounts 826 and 830 extend from wing 104 downwardly to provide rotary connections 834 and 838, respectively, which are spaced apart from wing 104. In other embodiments, one or both of first and second mounts 826 and 830 may be connected to an upper side 829 of wing 104 and extend upwardly. In alternative embodiments, aerial vehicle 800 may not include one or both of mounts 826 and 830, and instead one or both of rotor arms 814 and 818 may be directly rotatably connected to wing 104.

First and second axes 806 and 810 may be positioned anywhere relative to wing 104 that allows first and second multicopter rotors $132_1$ and $132_2$ move between the multicopter and fixed-wing configurations. In the illustrated example, first and second axes 806 and 810 are parallel and spaced apart, with first axis 806 positioned forward of second axis 810. As shown, first and second axes 806 and 810 may be spaced apart from wing 104, and positioned below wing 104. In alternative embodiments, one or both of first and second axes 806 and 810 may be positioned above wing 104. In some embodiments, one or both of axes 806 and 810 may extend through (e.g. be coincident with) wing 104.

In the illustrated embodiment, first axis 806 is positioned rearward of wing front end 842, and second axis 810 is positioned forward of wing rear end 846. In alternative embodiments, first axis 806 may be positioned forward of wing front end 842, second axis 810 may be positioned rearward of wing rear end 846, or both.

Still referring to FIGS. 30 and 31, connecting arm 822 may be connected to first and second rotor arms 814 and 818 in any manner that allows connector arm 822 to synchronize the movement of first and second rotor arms 814 and 818. In the illustrated embodiment, connector arm 822 is rotatably connected to first rotor arm 814 at first arm rotary connection 850, and connector arm 822 is rotatably connected to second rotor arm 818 at second arm rotary connection 854. As shown, first and second arm rotary connections 850 and 854 are spaced apart from first and second mount rotary connections 834 and 838 respectively. In this way, connection arm 822 may be made to move whenever either of rotor arms 814 or 818 rotates about first or second axis 806 or 810.

First and second rotor arms 814 and 818 may have any shape suitable for moving first and second multicopter rotors $132_1$ and $132_2$ between the multicopter and fixed-wing configurations. In the illustrated example, first and second rotor arms 814 and 818 are shown each including first and second arm portions 858 and 862. The first arm portion 858 is rotatably connected to wing 104 and connecting arm 822, and the second arm portion 862 joins a multicopter rotor 132 to first arm portion 858. In the illustrated embodiment, wing 104 and connecting arm 822 are rotatably mounted to first and second ends 866 and 870 of first arm portion 858, respectively. Second arm portion 862 has a first end 874 connected to first arm portion first end 866, and a second end 878 connected to multicopter rotor 132.

Figure 32:
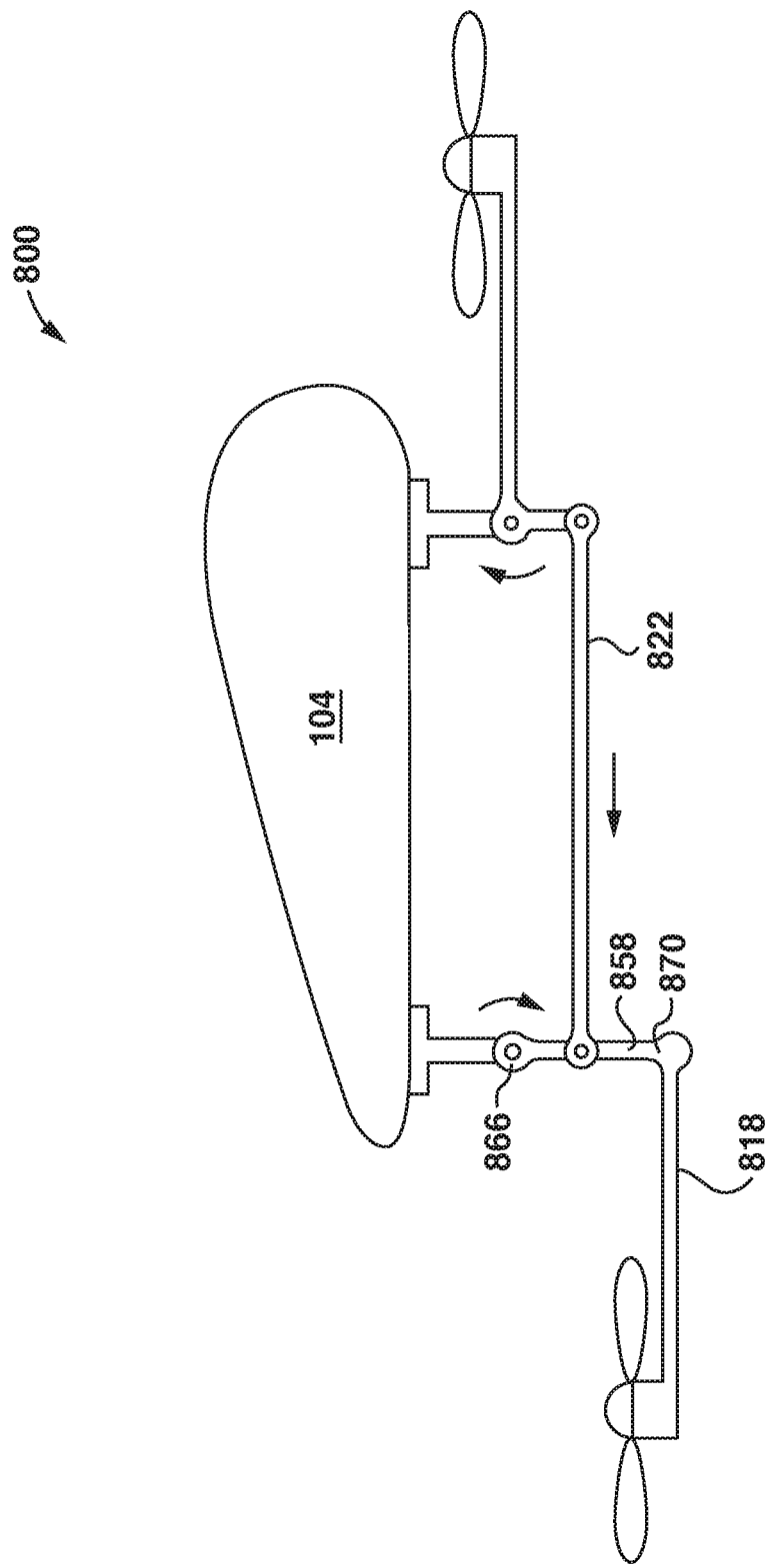
FIG. 32 is a side elevation view of an aerial vehicle in a multicopter configuration, in accordance with another embodiment.
Figure 33:
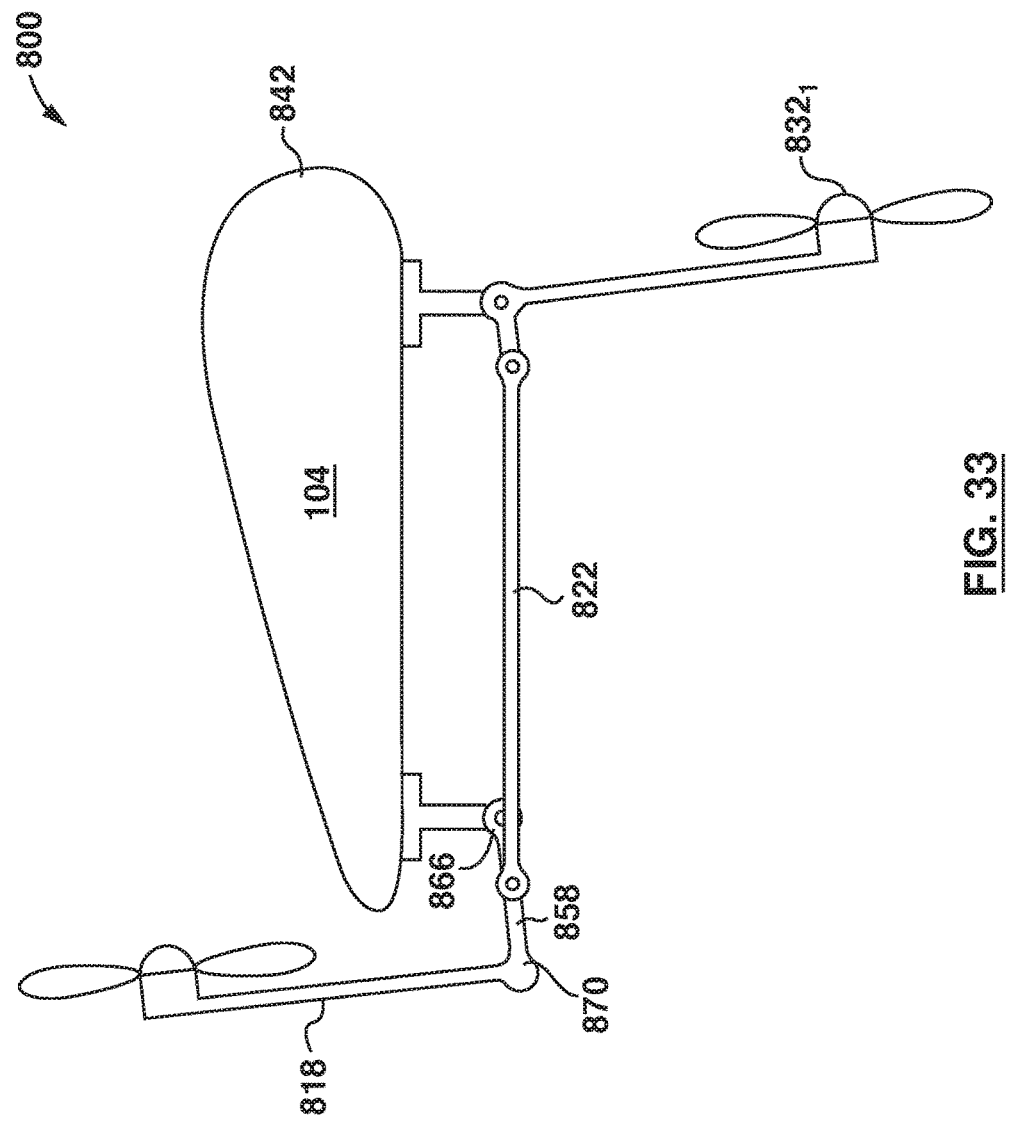
FIG. 33 is a side elevation view of the aerial vehicle of FIG. 32, in a fixed-wing configuration.

FIGS. 32 and 33 show an embodiment of aerial vehicle 800 where connecting arm 822 is rotatably mounted to first arm portion 858 of second rotor arm 818 between first and second ends 866 and 870, and second arm portion 862 of second rotor arm 818 is connected to first arm portion second end 870. As shown, this can help to provide clearance between wing 104 and second rotor arm 818 in the fixed-wing configuration to allow greater range of motion between the multicopter configuration and the fixed-wing configuration.

Figure 34:
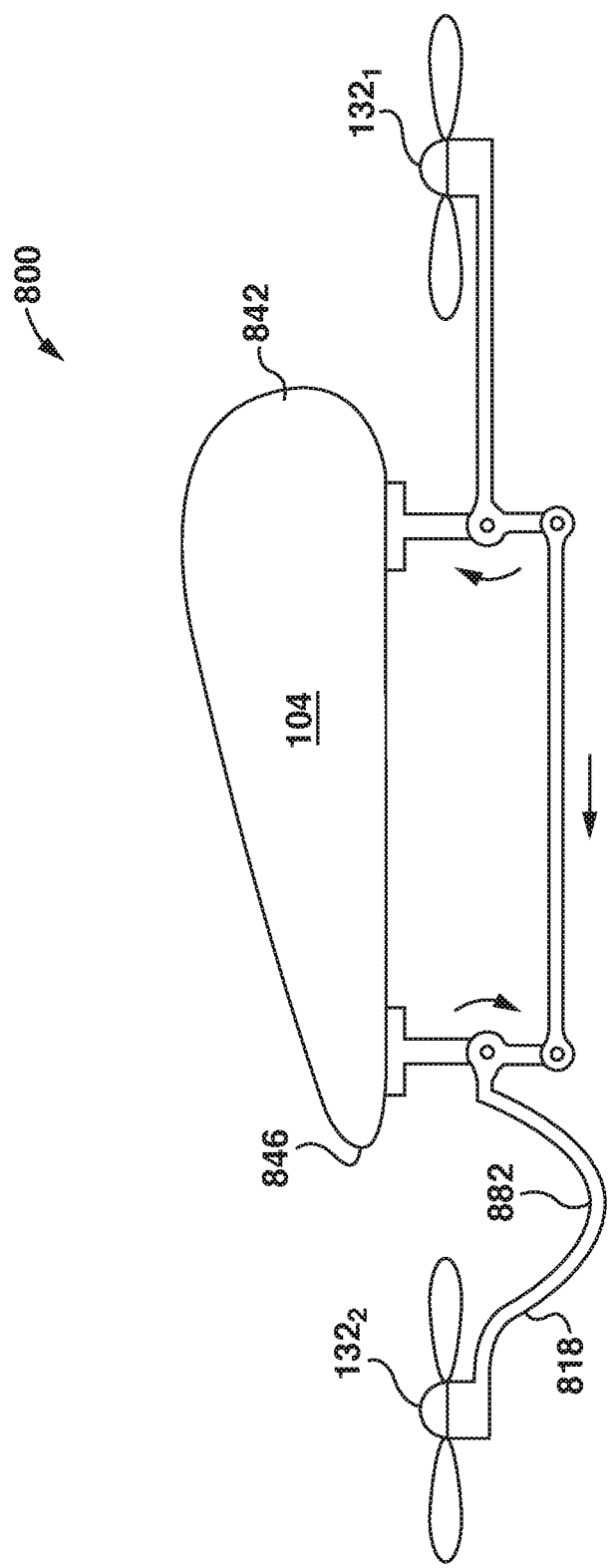
FIG. 34 is a side elevation view of an aerial vehicle in a multicopter configuration, in accordance with another embodiment.
Figure 35:
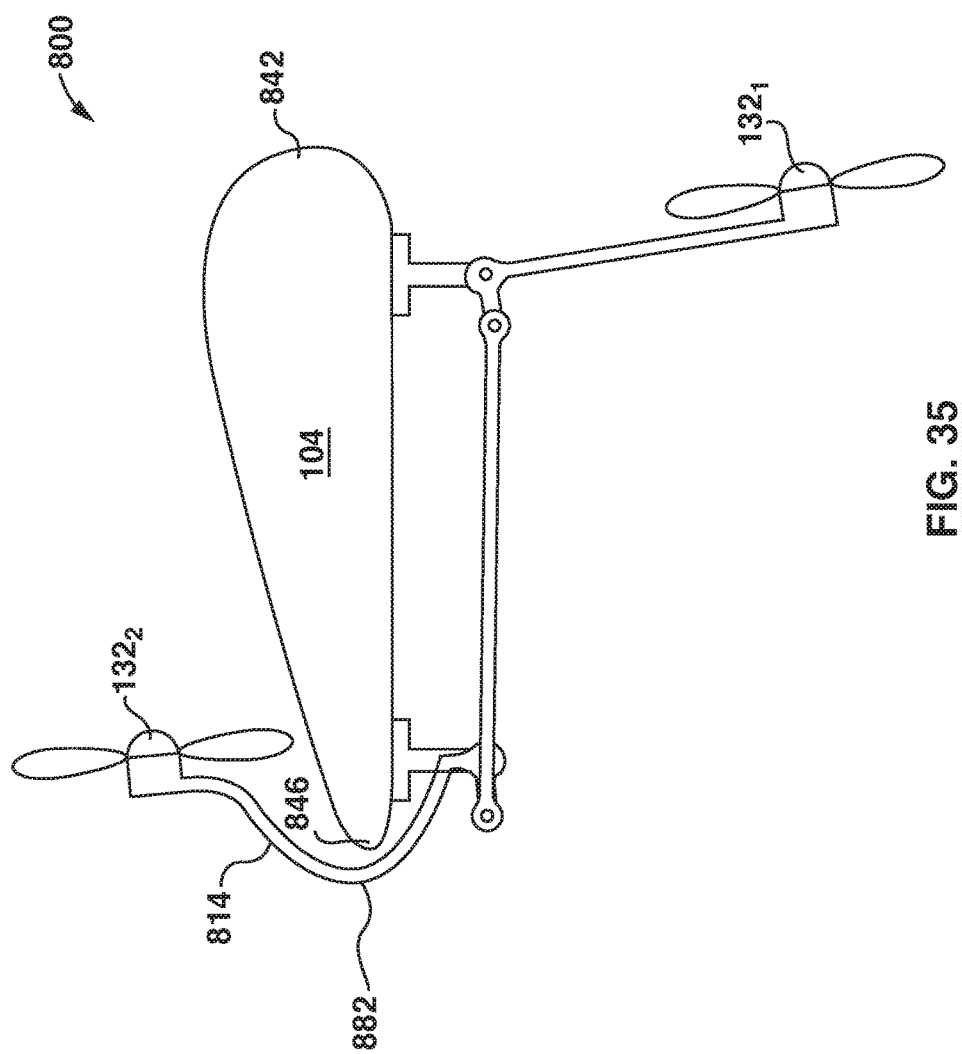
FIG. 35 is a side elevation view of the aerial vehicle of FIG. 34, in a fixed-wing configuration.

FIGS. 34 and 35 show an embodiment of aerial vehicle 800 where second arm portion 862 of second rotor arm 818 includes a concave portion 882. As shown, concave portion 882 may receive a wing rear end 846 to provide clearance between wing 104 and second rotor arm 818 in the fixed-wing configuration for greater range of motion between the multicopter configuration and the fixed-wing configuration.

Multicopter rotors 132 may be positioned in any position relative to wing 104 that allows multicopter rotors 132 to contribute lift in the multicopter configuration, and to contribute forward thrust in the fixed-wing configuration. In the multicopter configuration, first multicopter rotors $132_1$ may be positioned forward of wing front end 842, and second multicopter rotors $132_2$ may be positioned rearward of wing rear end 846. This allows the air streams through multicopter rotors 132 to pass substantially uninterrupted by wing 104.

In alternative embodiments, one or more (or all) of multicopter rotors 132 may be partially or entirely positioned between the wing front and rear ends 842 and 846.

In the multicopter configuration, first multicopter rotors $132_1$ may be coplanar with second multicopter rotors $132_2$, as shown in FIG. 30. Alternatively, first multicopter rotors $132_1$ may be vertically offset from second multicopter rotors $132_2$ in the multicopter configuration, as shown in FIG. 32.

In the fixed-wing configuration, a portion (or all) of first multicopter rotor $132_1$ may be positioned below wing 104, and a portion (or all) of second multicopter rotor $132_2$ may be positioned above wing 104, as shown in FIG. 31. As shown, first multicopter rotor $132_1$ may be forward of wing front end 842 and second multicopter rotor $132_2$ may be rearward of wing rear end 846 in the fixed-wing configuration. FIG. 33 shows an embodiment where first multicopter rotor $132_1$ is at least partially rearward of wing front end 842 in the fixed-wing configuration. FIG. 35 shows an embodiment where second multicopter rotor $132_2$ is forward of wing rear end 846 in the fixed-wing configuration.

Figure 36:
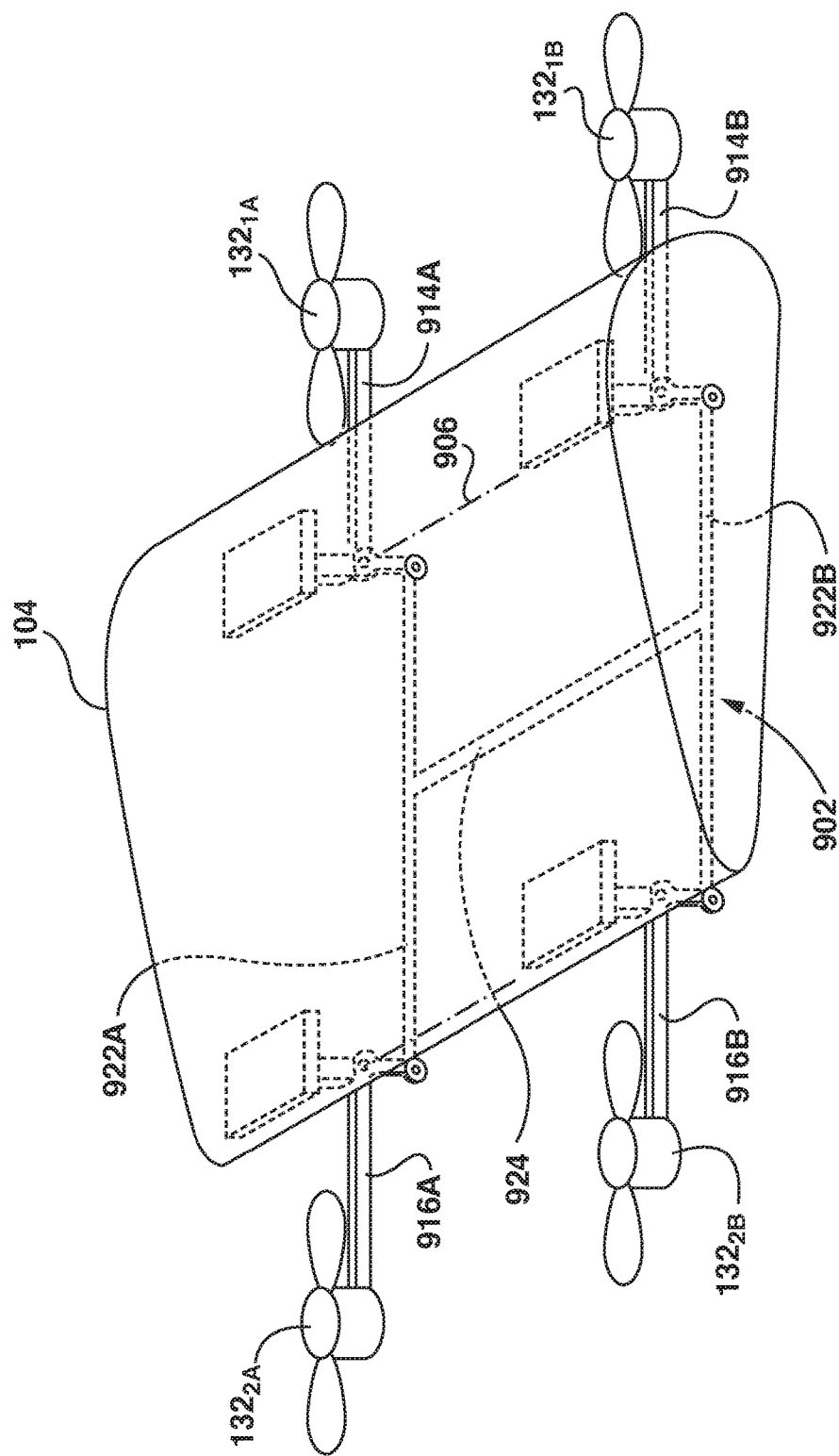
FIG. 36 is a perspective view of an aerial vehicle in accordance with another embodiment.

Reference is now made to FIG. 36, which shows an aerial vehicle 900. Multicopter linkage 902 includes two coupled linkages similar to linkages 802 shown in previous embodiments. First and second multicopter rotors $132_{1A}$ and $132_{2A}$ are mounted to wing 104 through rotor arms $914_A$, $918_A$ and connecting arms $922_A$. First and second multicopter rotors $132_{1B}$ and $132_{2B}$ are mounted to wing 104 through rotor arms $914_B$, $918_B$ and connecting arms $922_B$. Connecting arms $922_A$ and $922_B$ are rigidly coupled through crossbar 924 such that connecting arms 922A, 922B and crossbar 924 move as a unit. Rotors 132 move in unison through movement of multicopter linkage 902 such that rotors 1321 rotate together about axis 906 and rotors 1322 rotate together about axis 910. Aerial vehicle 900 may have no actuators other devices that apply torque directly to rotate rotors 132 about axes 906 and 910. In other embodiments, multicopter linkage 902 may actuated or braked to allow the rotation of rotors 132 about axes 906 and 910 to be controlled.

Figure 37:
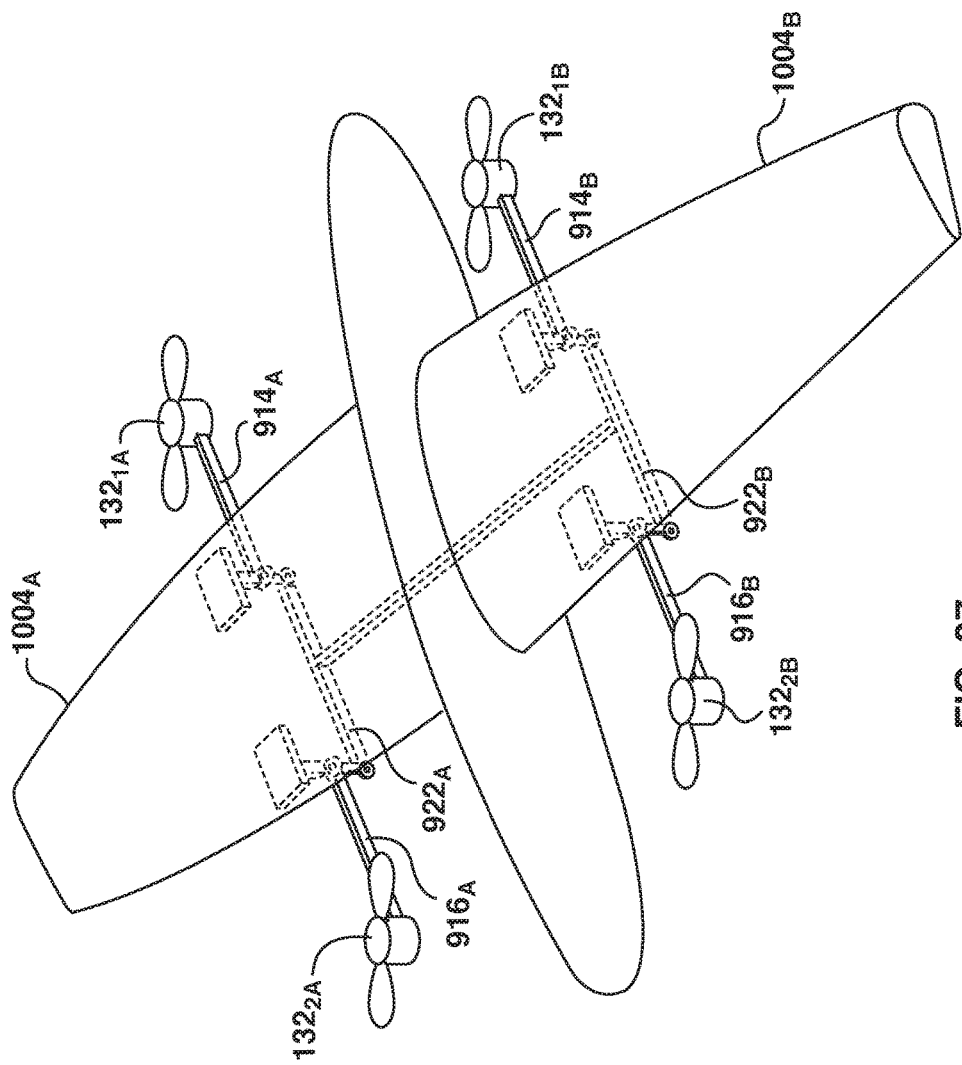
FIG. 37 is a perspective view of an aerial vehicle in accordance with another embodiment.

Reference is next made to FIG. 37 which shows an aerial vehicle 1000 that is similar to aerial vehicle 900. The use of use like reference numerals identifies like components. Aerial vehicle 1000 has a fuselage 1026 and a pair of wings 1004A and 1004B on opposite sides of the fuselage. Multicopter linkage 902 is mounted to wings 1004A and 1004B in a manner similar to that described above in relation to previous embodiments. Fuselage 1026 may be used to carry cargo or passengers.

It will be appreciated that multicopter 108 of aerial vehicle 800 may be provided as a retrofit kit for attachment to a wing 104. The retrofit kit may include at least multicopter rotors 108, multicopter linkage 802, and hardware controller 168. Optionally, the retrofit kit may further include mounts 826 and 830 for connecting the multicopter 108 to the wing. The retrofit kit allows an existing wing 104 (e.g. of a fixed-wing aerial vehicle) to be enhanced with a multicopter configuration.

Figure 38:
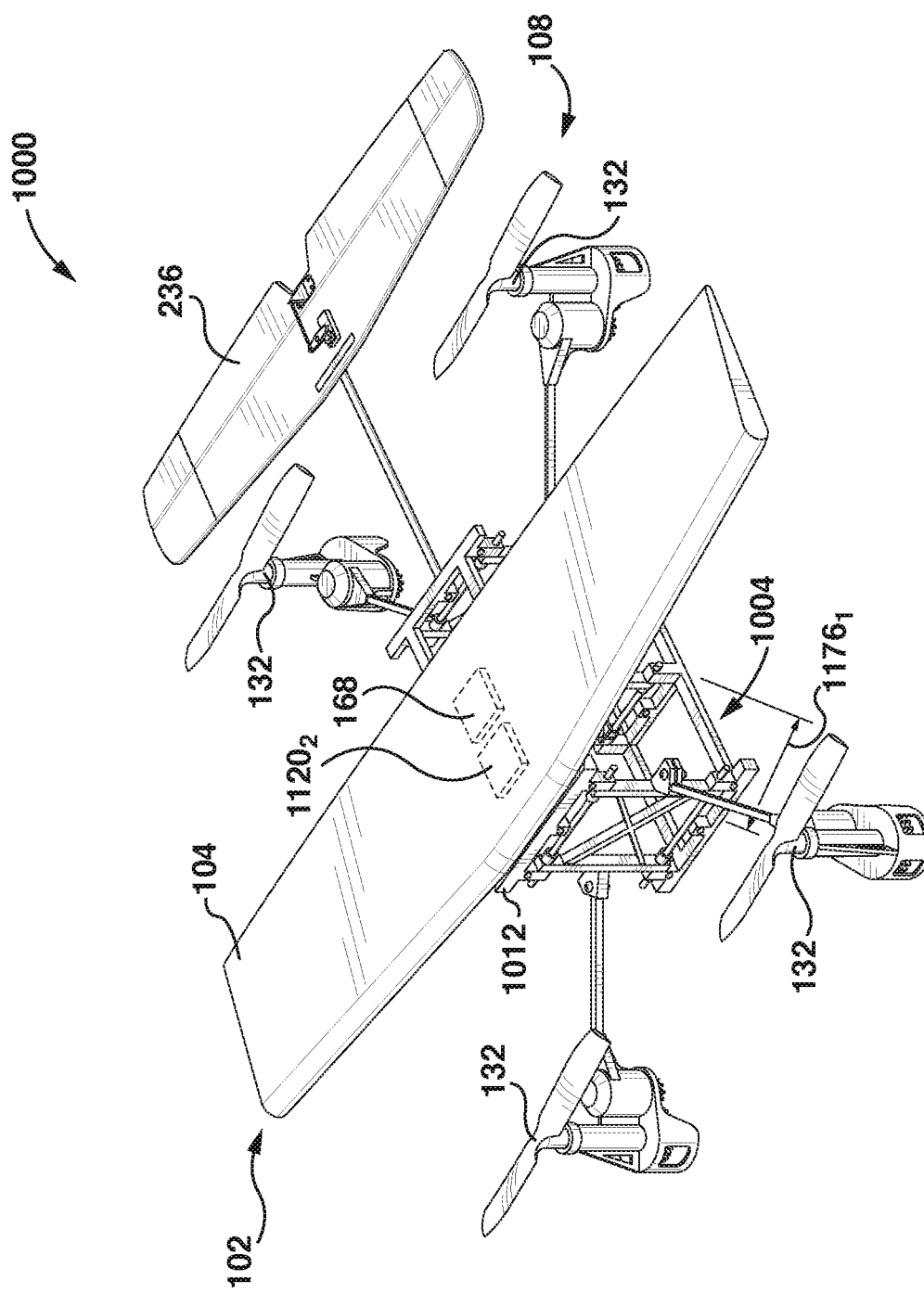
FIG. 38 is a perspective view of an aerial vehicle in a multicopter configuration, in accordance with another embodiment.

Reference is now made to FIG. 38, where like part numbers refer to like parts in the previous figures, and where an aerial vehicle 1000 is shown in accordance with another embodiment. As shown, aerial vehicle 1000 includes a body 102 including a wing 104, which is positioned between rotors 132 of multicopter 108. As exemplified, multicopter rotors 132 may be rotatably coupled (e.g. freely rotatably coupled) to body 102 by a multicopter linkage 1004 which extends forwardly and rearwardly of wing 104.

Figure 42:
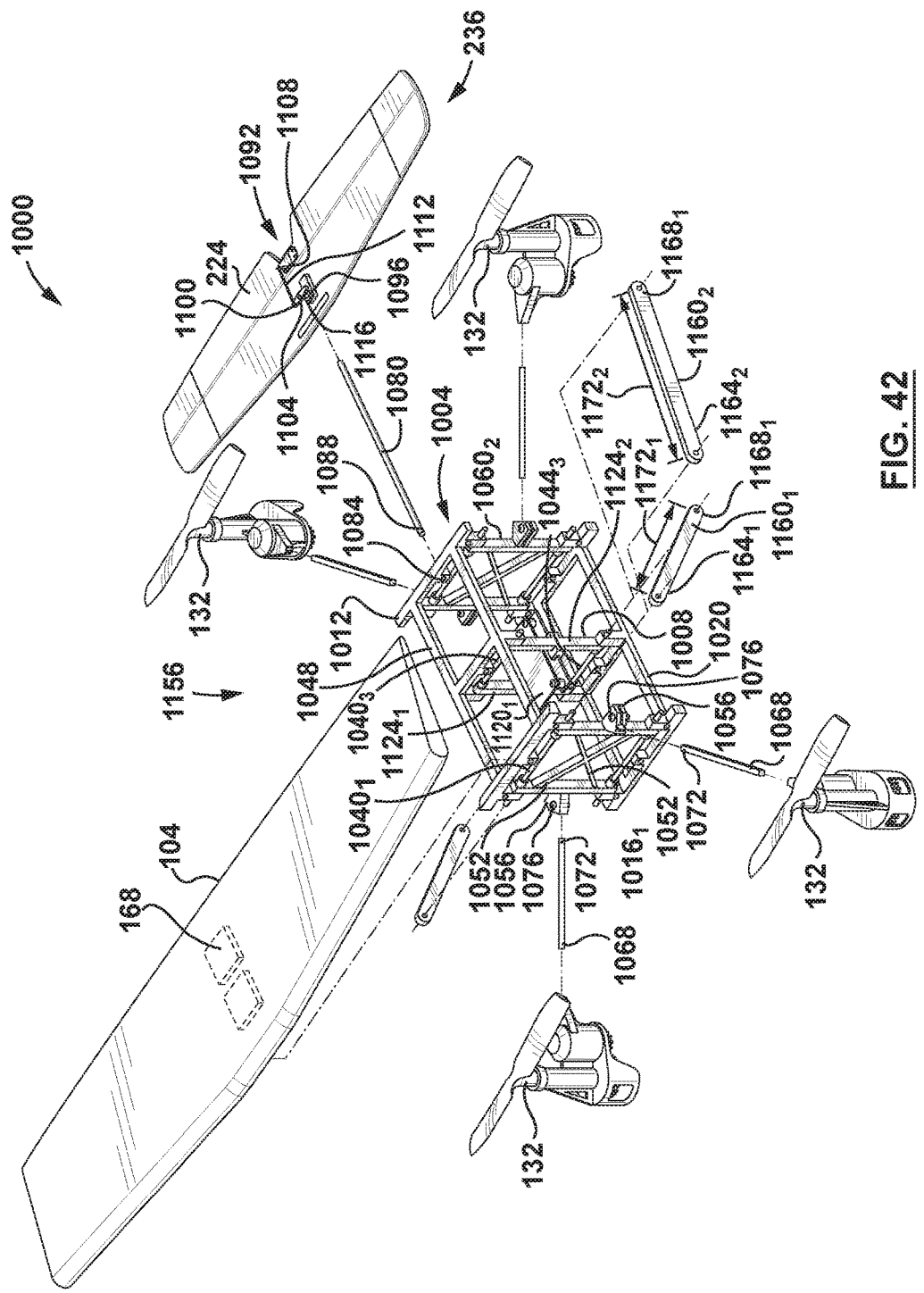
FIG. 42 is an exploded view of the aerial vehicle of FIG. 38 including the multicopter linkage and sensor of FIG. 40.

Referring to FIG. 42, aerial vehicle 1000 is similar to aerial vehicle 800 in many respects, except for example the configuration of the multicopter linkage 1004, which now includes a sensor mount 1008. As shown, multicopter linkage 1004 includes a wing mount 1012, a plurality of rotor arms 1016, and a connecting arm 1020 connected to wing mount 1012 by rotor arms 1016. Collectively, wing mount 1012, rotor arms 1016, and connecting arm 1020 form a four-bar linkage that is movable relative to wing 104 between the multicopter configuration (FIG. 38) and a fixed-wing configuration seen in FIG. 39.

Figure 40:
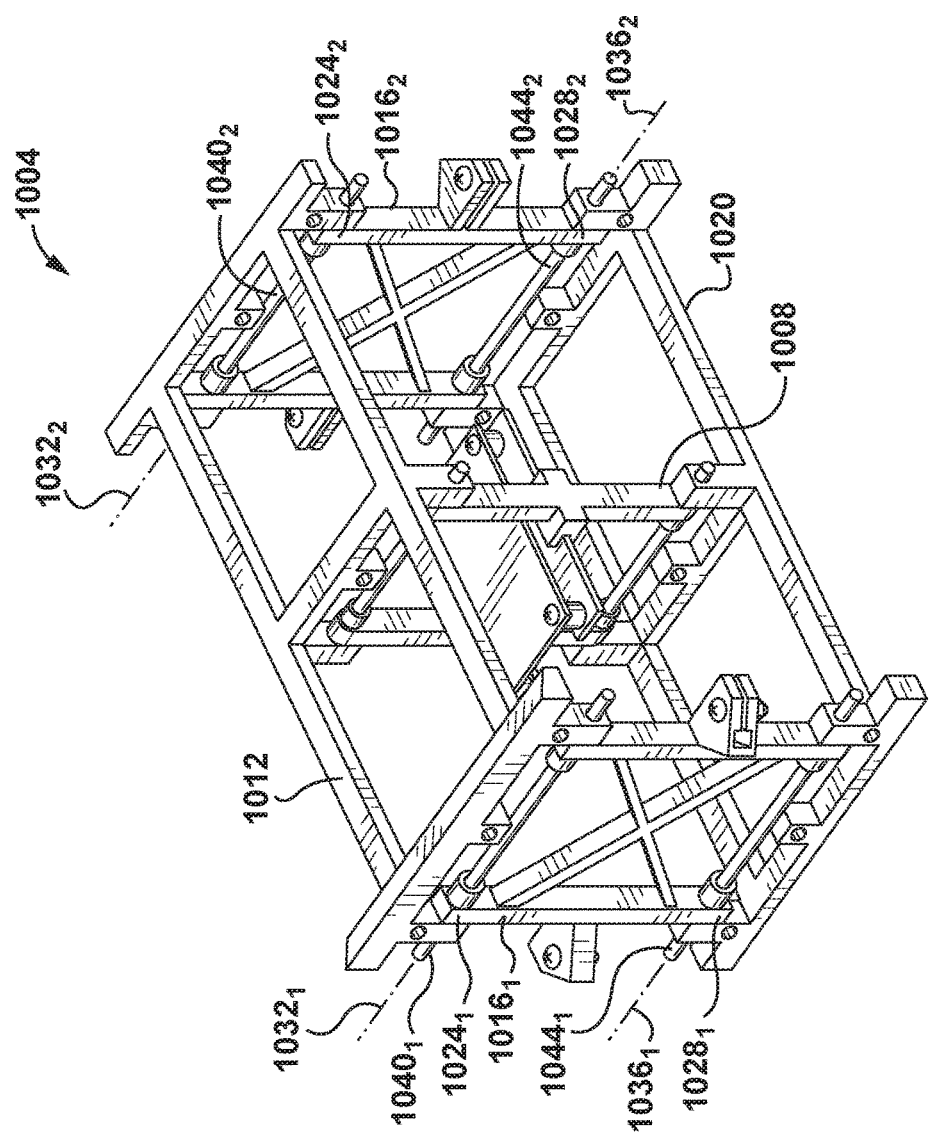
FIG. 40 is a perspective view of a multicopter linkage and a sensor, in accordance with an embodiment.
Figure 41:
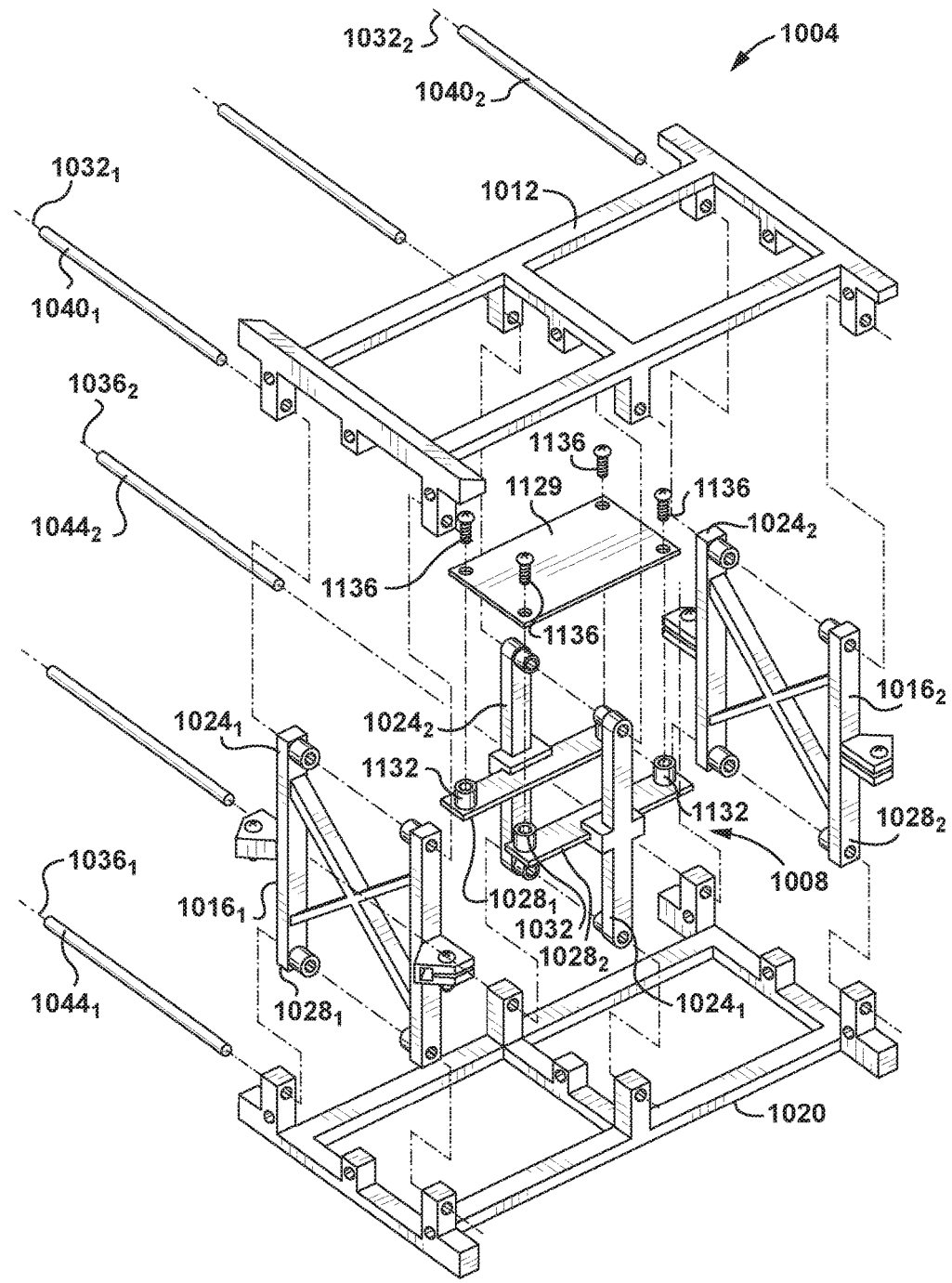
FIG. 41 is an exploded view of the multicopter linkage of FIG. 40.

Referring to FIGS. 40-41, rotor arms 1016 include a front arm $1016_1$ and a rear arm $1016_2$. Each arm 1016 has a rotor arm first end 1024 connected to wing mount 1012, and a rotor arm second end 1028 connected to connecting arm 1020. Each rotor arm 1016 can be connected to wing mount 1012 in any manner that allows the rotor arm 1016 to rotate with respect wing mount 1012 about a respective lateral axis 1032. Similarly, each rotor arm 1016 can be connected to connecting arm 1020 in any manner that allows rotor arms 1016 to rotate with respect to connecting arm 1020 about a respective lateral axis 1036. In the illustrated example, rotor arms 1016 are rotatably connected to wing mount 1012 by a first rotary connection formed by first axles 1040, and rotor arms 1016 are rotatably connected to connecting arm 1020 by a second rotary connection formed by second axles 1044. As shown, axles 1040 extend parallel to lateral axes 1032, and second axles 1044 extend parallel to lateral axes 1036. Lateral axis $1032_1$ is longitudinally spaced apart from lateral axis $1032_2$, and lateral axis $1036_1$ is longitudinal spaced apart from lateral axis $1036_2$.

Referring to FIG. 42, wing mount 1012 can be any device configured to accommodate a connection to a wing 104 and rotor arms 1016. In the illustrated example, wing mount 1012 is formed as a rigid open frame including a wing mount upper surface 1048 that is shaped to support wing 104. Wing 104 may be connected to wing mount 1012 in any manner, such as by one or more of fasteners (e.g. screws, bolts, or rivets), adhesives (e.g. glue, cement, or epoxy), welds, strapping (e.g. string, wire, or chain), hooks and loops, or magnets, for example. In alternative embodiments, wing 104 and wing mount 1012 are integrally formed.

Each rotor arm 1016 is connected to one or more rotors 132, and rotationally connected to wing mount 1012 and connecting arm 1020. In the illustrated embodiment, each rotor arm 1016 is formed as a rigid frame. As shown, rotor arm 1016 may include rotor arm trusses 1052 to enhance strength and rigidity.

Figure 39:
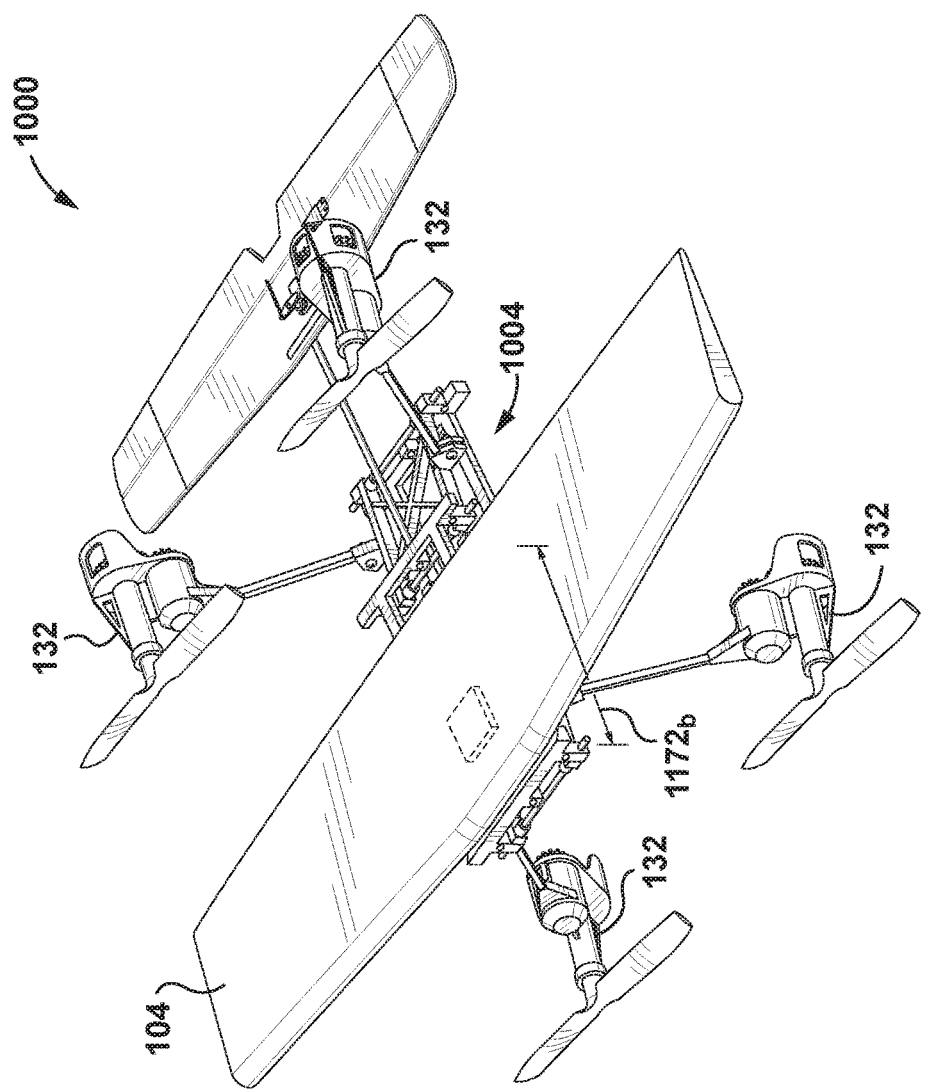
FIG. 39 is a perspective view of the aerial vehicle of FIG. 38, in a fixed-wing configuration.

Each rotor arm 1016 can be coupled to one or more multicopter rotors 132 in any manner that allows multicopter rotor 132 to rotate together with rotor arm 1016 between the multicopter configuration (FIG. 38) and the fixed-wing configuration (FIG. 39). For example, rotor arm 1016 may accommodate a rigid connection with one or more multicopter rotors 132 so that the rotor arm 1016 and multicopter rotors 132 behave as a unitary element. In the illustrated example, each rotor arm 1016 includes two rotor mounts 1056 for connecting two multicopter rotors 132. As shown, the rotor mounts 1056 of each rotor arm 1016 are laterally spaced apart to connect with laterally spaced apart multicopter rotors 132. Each multicopter rotor 132 is shown supported on a rotor rod 1068, which is connected to a rotor arm 1016 by a rotor mount 1056. Rotor rods 1068 can connect with rotor arms 1016 in any manner, such as by one or more of fasteners (e.g. screws, bolts, or rivets), adhesives (e.g. glue, cement, or epoxy), welds, strapping (e.g. string, wire, or chain), hooks and loops, interference fit, or magnets, for example. In the illustrated example, rotor mounts 1056 are formed as clamps, which receive a proximal end 1072 of a rotor arm 1016 and tighten with fasteners 1076.

Rotor rods 1068 can have any size and shape. In some embodiments, a rotor rod 1068 is shaped to provide a rigid connection between a multicopter rotor 132 and a rotor arm 1016 so that the rotor rod 1068 and rotor arm 1016 behave a unitary element. In the illustrated example, rotor rods 1068 are formed as shafts with non-circular (e.g. rectangular) cross-section. This can provide rotor rods 1068 with enhanced rigidity and resistance to axial rotation relative to rotor arm 1016. In alternative embodiments, a rotor rod 1068 is integrally formed or permanently connected with a rotor arm 1016.

Still referring to FIG. 42, in some embodiment aerial vehicle 1000 includes a tail 236. Tail 236 can be connected to wing 104 in any manner. For example, multicopter linkage 1004 or wing 104 may be configured to accommodate a connection to tail 236. In the illustrated embodiment, tail 236 is connected to wing mount 1012 by a tail rod 1080. Tail rod 1080 can be connected to wing mount 1012 in any manner. For example, tail rod 1080 can be connected to wing mount 1012 by one or more of fasteners (e.g. screws, bolts, or rivets), adhesives (e.g. glue, cement, or epoxy), welds, strapping (e.g. string, wire, or chain), hooks and loops, interference fit, or magnets, for example. In the illustrated embodiment, wing mount 1012 includes a tail mount 1084 sized and positioned to receive tail rod 1080. As shown, tail mount 1084 may include a receptacle (e.g. recess or aperture) sized to receive tail rod proximal end 1088. In alternative embodiment, tail rod 1080 is integrally formed with wing 104 or multicopter linkage 1004. For example, tail rod 1080 may be integrally formed with wing mount 1012.

Tail 236 can be an active tail with one or more control surfaces 224 as shown, or a passive tail free of control surfaces. In the illustrated example, tail 236 includes a tail actuator 1092 to control the position of control surface 224. Tail actuator 1092 can be any device that can be electronically actuated to move control surface 224. In the illustrated example, tail actuator 1092 includes a tail motor 1096, and a tail linkage 1100 that drivingly connects tail motor 1096 to control surface 224. Tail linkage 1100 converts rotary movement of tail motor 1096 into pivotal movement of control surface 224. As shown, tail linkage 1100 includes a first arm 1104 rigidly connected to tail motor output shaft 1116, a second arm 1108 rigidly connected to control surface 224, and a third arm 1112 rotatably connected to first and second arms 1104 and 1108. Actuation of tail motor 1096 rotates tail motor output shaft 1116 and therefore first arm 1104, which pulls or pushes on third arm 1112, which rotates second arm 1108 and therefore control surface 224 upwardly or downwardly.

Returning to FIG. 42, multicopter linkage 1004 includes a sensor mount 1008. Sensor mount 1008 can be any device configured to accommodate a connection to a movement sensor 1120$_1$, and that rotates with multicopter rotors 132 between the multicopter configuration (FIG. 38) and the fixed wing configuration (FIG. 39). This allows a connected hardware controller 168 to determine the position of multicopter rotors 132, in respect of movement between the multicopter and fixed-wing configurations, based on readings from the movement sensor 1120$_1$. Movement sensor 1120$_1$ can include one or more of accelerometers, gyroscopes, magnetometers, and rotation sensors for example. In some embodiments, movement sensor 1120$_1$ is an inertial measurement unit.

Sensor mount 1008 can be connected to multicopter rotors 132 in any manner that allows a connected movement sensor 1120$_1$ to move with multicopter rotors 132 between the multicopter and fixed wing configurations. In the illustrated embodiment, sensor mount 1008 includes laterally opposed sensor mount arms 1024$_1$ and 1024$_2$, each of which is rotatably connected to wing mount 1012 and connecting arm 1020 by axles 1040$_3$ and 1044$_3$ respectively. This allows sensor mount 1008 to pivot forwardly and rearwardly relative to wing mount 1012 (and wing 104) as multicopter linkage 1004 (and rotors 132) moves between the multicopter and fixed-wing configurations. Movement sensor 1120$_1$ reports on this movement with sensor readings that allow hardware controller 168 to determine the position of multicopter rotors 132.

Referring to FIG. 41, sensor mount 1008 can accommodate a connection with a movement sensor 1120$_1$ in any manner. For example, sensor 1120$_1$ may be connected to sensor mount 1008 by one or more of fasteners (e.g. screws, bolts, or rivets), adhesives (e.g. glue, cement, or epoxy), welds, strapping (e.g. string, wire, or chain), hooks and loops, interference fit, or magnets, for example. In the illustrated example, each sensor mount arm 1124 includes a mounting platform 1128 with receptacles 1132 (e.g. recesses or apertures) sized to receive a fastener 1136 (e.g. screw, bolt, or rivet) that secures movement sensor 1120$_1$ to mounting platform 1128. As shown, mounting platforms 1128 are positioned longitudinally between rotor arms 1016 and vertically between wing mount 1012 and connecting arm 1020.

Referring to FIG. 38, in some embodiments aerial vehicle 1000 includes a second movement sensor 1120$_2$ which is positioned so that multicopter linkage 1004 moves between the multicopter and fixed-wing configurations independently of the second movement sensor 1120$_2$. For example, second movement sensor 1120$_2$ may be coupled to wing mount 1012, wing 104, or tail 236. In the illustrated example, second movement sensor 1120$_2$ is connected to wing 104. Second movement sensor 1120$_2$ can include one or more of accelerometers, gyroscopes, and magnetometers, for example. In some embodiments, movement sensor 1120$_2$ is an inertial measurement unit. In some embodiments, movement sensor 1120$_2$ is a relative pitch or rotation sensor that senses the relative pitch or rotation between wing 104 and components of multicopter linkage 1004 that move between the multicopter and fixed-wing configurations. Hardware controller 168 is communicatively coupled to the first and second movement sensors 1120$_1$ (obscured from view) and 1120$_2$ to receive movement sensor readings. This allows hardware controller 168 to determine the position of multicopter linkage 1004 as between the multicopter and fixed-wing configurations, and also to determine movement information (e.g. spatial orientation, velocity, and/or acceleration) of aerial vehicle 1000 as a whole.

Figure 43:
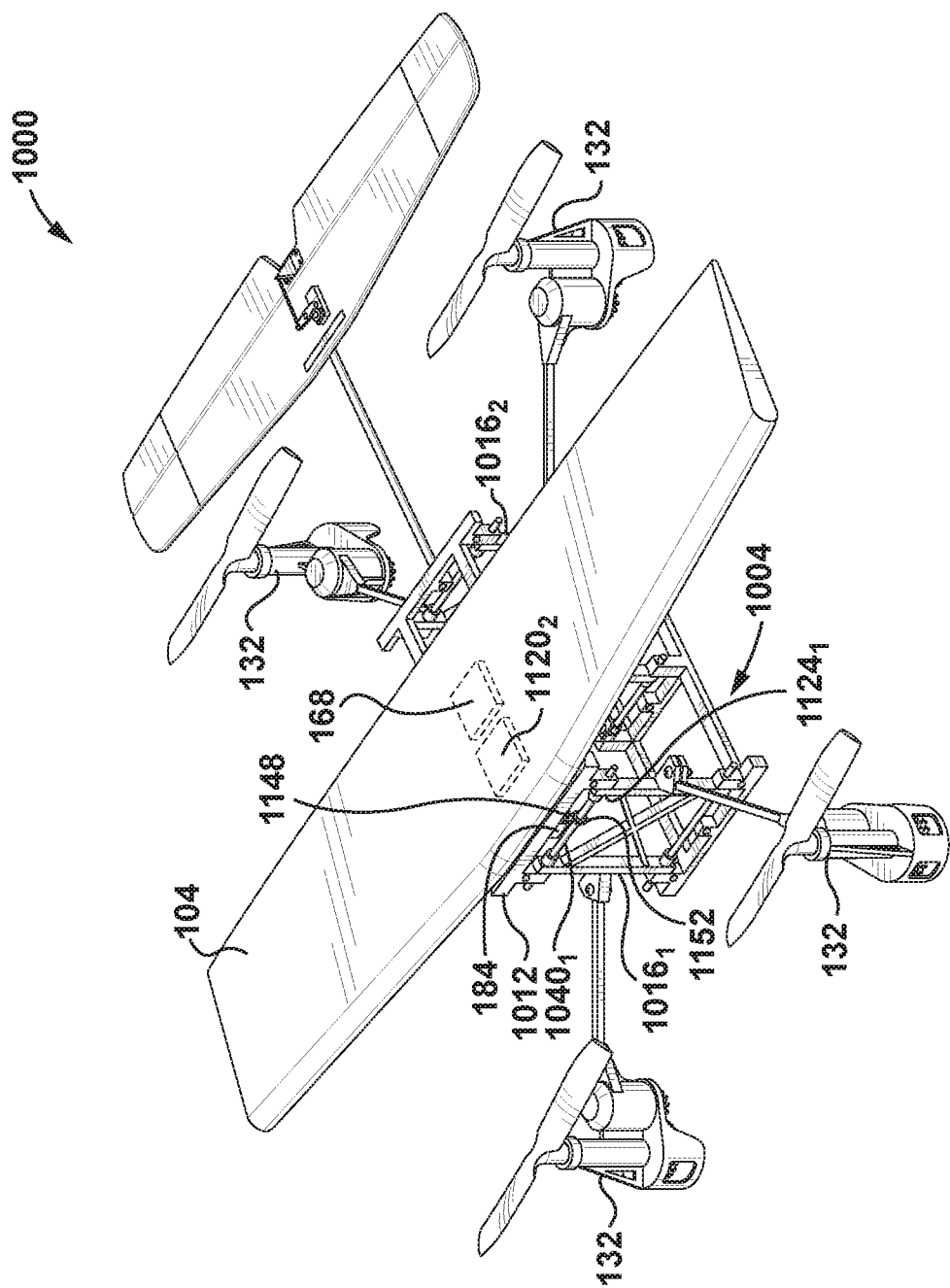
FIG. 43 is a perspective view of the aerial vehicle of FIG. 38, further including a configuration actuator, in accordance with an embodiment.
Figure 43B:
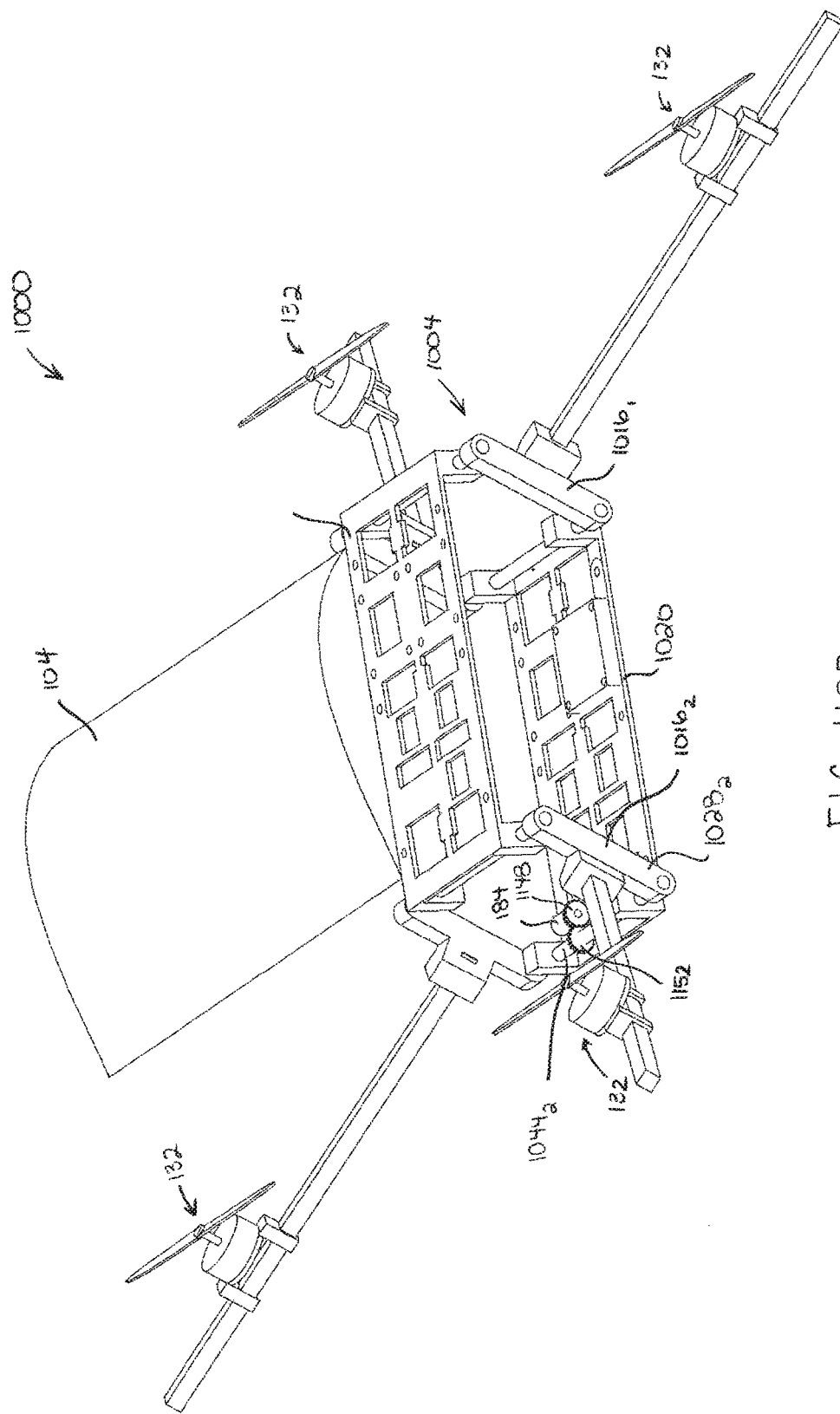
FIG. 43B is a perspective view of an aerial vehicle in accordance with another embodiment.

FIG. 43 shows another embodiment of aerial vehicle 1000 including a configuration actuator 184. Configuration actuator 184 can be any device operable to move multicopter rotors 132 between the multicopter and fixed-wing configurations. For example, actuator 184 may be rigidly coupled to wing 104 and engaged with a movable portion of multicopter linkage 1004 so that multicopter linkage 1004 (and therefore multicopter rotors 132) can be selectively moved between the multicopter and fixed-wing configurations by activating actuator 184. In the illustrated example, actuator 184 is a motor that is rigidly connected to wing mount 1012. FIG. 43B shows another embodiment in which actuator 184 is a motor that is rigidly connected to connecting arm 1020.

In FIG. 43B, the wing 104 is partially sectioned for clarity of illustration. As shown, actuator 184 is operable to cause rotor arms 1016 to rotate relative to wing mount 1012. Actuator 184 can act upon rotor arms 1016 by directly or indirectly by way of one or more of gears, belts, and axles for example.

In the example of FIG. 43, actuator 184 drives an output gear 1148, first axle $1040_1$ includes an axle gear 1152 meshed with output shaft gear 1148, and rotor arm first end $1024_1$ is rigidly connected to first axle $1040_1$. Actuator 184 can be activated (e.g. by control signals from hardware controller 168) to rotate output gear 1148, which rotates first axle $1040_1$ (and therefore rotor arms 1016) by way of gear 1152. Thus, actuator 184 can be operated to move multicopter linkage 1004, and therefore multicopter rotors 132, between the multicopter and fixed-wing configurations.

In the example of FIG. 43B, actuator 184 drives an output gear 1148, second axle $1044_2$ includes an axle gear 1152 meshed with output shaft gear 1148, and rotor arm second end $1028_2$ is rigidly connected to second axle $1044_2$. Actuator 184 can be activated (e.g. by control signals from the hardware controller) to rotate output gear 1148, which rotates second axle $1044_2$ (and therefore rotor arms 1016) by way of gear 1152. Thus, actuator 184 can be operated to move multicopter linkage 1004, and therefore multicopter rotors 132, between the multicopter and fixed-wing configurations.

In some embodiments, hardware controller 168 operates actuator 184 based at least in part on sensor readings from movement sensor(s) 1120. For example, sensor $1120_1$ (obscured from view, see FIG. 40) or sensors $1120_1$ and $1120_2$ can provide hardware controller 168 with feedback on the current position of multicopter rotors 132 between the multicopter and fixed-wing configurations, whereby hardware controller 168 can activate actuator 184 until sensor readings from sensor(s) 1120 indicate that the multicopter rotors 132 have moved to the desired position (e.g. as commanded by a user by remote control). As a result, sensor(s) 1120 can allow hardware controller 168 to move multicopter rotors 132 more accurately, which can provide more responsive user control over aerial vehicle 1000.

Referring to FIG. 42, multicopter linkage 1004 can be sold as a discrete component for user's to assemble with custom or off-the-shelf wing 104, rotors 132, and tail 236 to form an aerial vehicle 1000. This allows hobbyist users to customize aerial vehicle 1000 to their liking, and can also reduce user costs when employing off-the-shelf or homemade components 104, 132, and 236.

In some embodiments, multicopter linkage 1004 is packaged in a kit 1156 including multicopter linkage 1004, and one or more (or all) of hardware controller 168, movement sensor $1120_1$, and configuration actuator 184. Kit 1156 provides users with the freedom to customized aerial vehicle 1000 with custom or off-the-shelf wing 104, multicopter rotors 132, and tail 236, while saving the user from having to source and configure one or more (or all) of the electronics (e.g. hardware controller 168, movement sensor(s) 1120, and/or actuator 184) that operate the aerial vehicle 1000. This can be a boon for users without the skills or access to parts that are required to source and configure these components.

In other embodiments, kit 1156 includes all of the components necessary to build aerial vehicle 1000. For example, kit 1156 may include multicopter linkage 1004, hardware controller 168, movement sensor(s) 1120 (if present), actuator 184 (if present), a plurality of multicopter rotors 132, and a tail 236. An unassembled kit 1156 can reduce assembly costs, and these savings can be passed on to the consumer. Unassembled kit 1156 can also provide a useful learning exercise for users new to the hobby, or a pleasurable activity for users that enjoy assembling the aerial vehicle 1000 but want to avoid sourcing and configuring the parts.

Still referring to FIG. 42, in some embodiments aerial vehicle 1000 includes one or more configuration locks 1160 for selectively locking the position of multicopter rotors 132 in a fixed-wing or multicopter configuration. In the illustrated example, aerial vehicle 1000 includes a multicopter lock $1160_1$ and a fixed wing lock $1160_2$. Each configuration lock 1160 is connectable to multicopter linkage 1004 to inhibit movement of the multicopter linkage 1004 between the multicopter and fixed-wing configurations. Multicopter lock $1160_1$ is removably connectable to multicopter linkage 1004 to lock multicopter linkage 1004 in the multicopter configuration, and fixed-wing lock $1160_2$ is removably connectable to lock multicopter linkage 1004 in the fixed-wing configuration. This allows aerial vehicle 1000 to be preconfigured in a multicopter or fixed-wing configuration prior to take off so that aerial vehicle 1000 remains in the chosen configuration for the duration of the flight. One or both of configuration locks $1160_1$ and $1160_2$ can be included in a kit 1156.

Configuration lock 1160 can be any device operable to selectively lock the position of multicopter rotors 132 in a fixed-wing or multicopter configuration. In the illustrated example, each configuration lock 1160 is formed as a locking bar that attaches to multicopter linkage 1004 at two positions which do not move synchronously (i.e. the distance between the two positions changes) between the multicopter and fixed-wing configurations. For example, a configuration lock 1160 may be a rigid bar having a first configuration lock end 1164 connectable to first axle $1040_1$ and a second configuration lock end 1168 connectable to second axle $1044_3$. Because first axle $1040_1$ and second axle $1044_3$ move relative to one another when multicopter linkage 1004 moves between the multicopter and fixed-wing configurations, configuration lock 1160 is able to lock the position of the multicopter linkage 1004 by rigidly connecting the first and second axles $1040_1$ and $1044_3$.

The length of each configuration lock 1160 corresponds to the distance between the two positions on the multicopter linkage 1004 in the associated configuration. For example, a multicopter lock will be sized according to the distance between the two positions on multicopter linkage 1004 when in the multicopter position, and the fixed-wing lock will be sized according to the distance between two positions on multicopter linkage 1004 when in the fixed-wing configuration. In the illustrated example, the multicopter lock $1160_1$ has a lock length $1172_1$ corresponding to the distance $1176_1$ (FIG. 38) between first and second axles $1040_1$ and $1044_3$ when in the multicopter configuration, and fixed-wing lock $1160_2$ has a lock length $1172_2$ corresponding to the distance $1176_2$ (FIG. 39) between first and second axles $1040_1$ and $1044_3$ in the fixed-wing configuration.

It will be appreciated that different configuration locks can be configured to connect to the same or different positions on multicopter linkage 1004. For example, the multicopter and fixed-wing locks $1160_1$ and $1160_2$ can be configured to connect to the same pair of positions on multicopter linkage 1004 as each other, or can be configured to connect to different pairs of positions on multicopter linkage 1004.

Figure 44:
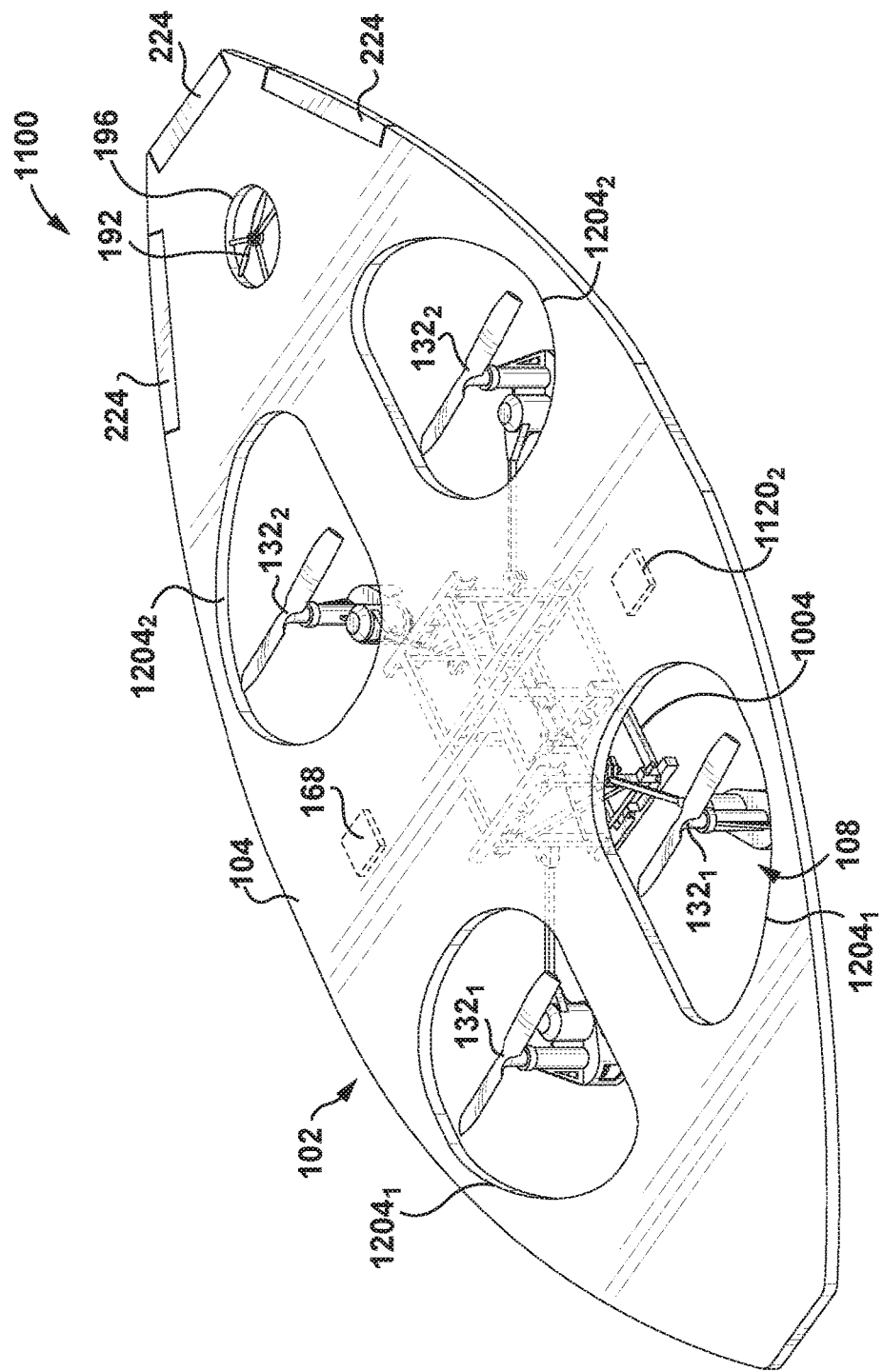
FIG. 44 is a perspective view of an aerial vehicle in a multicopter configuration, in accordance with another embodiment.
Figure 45:
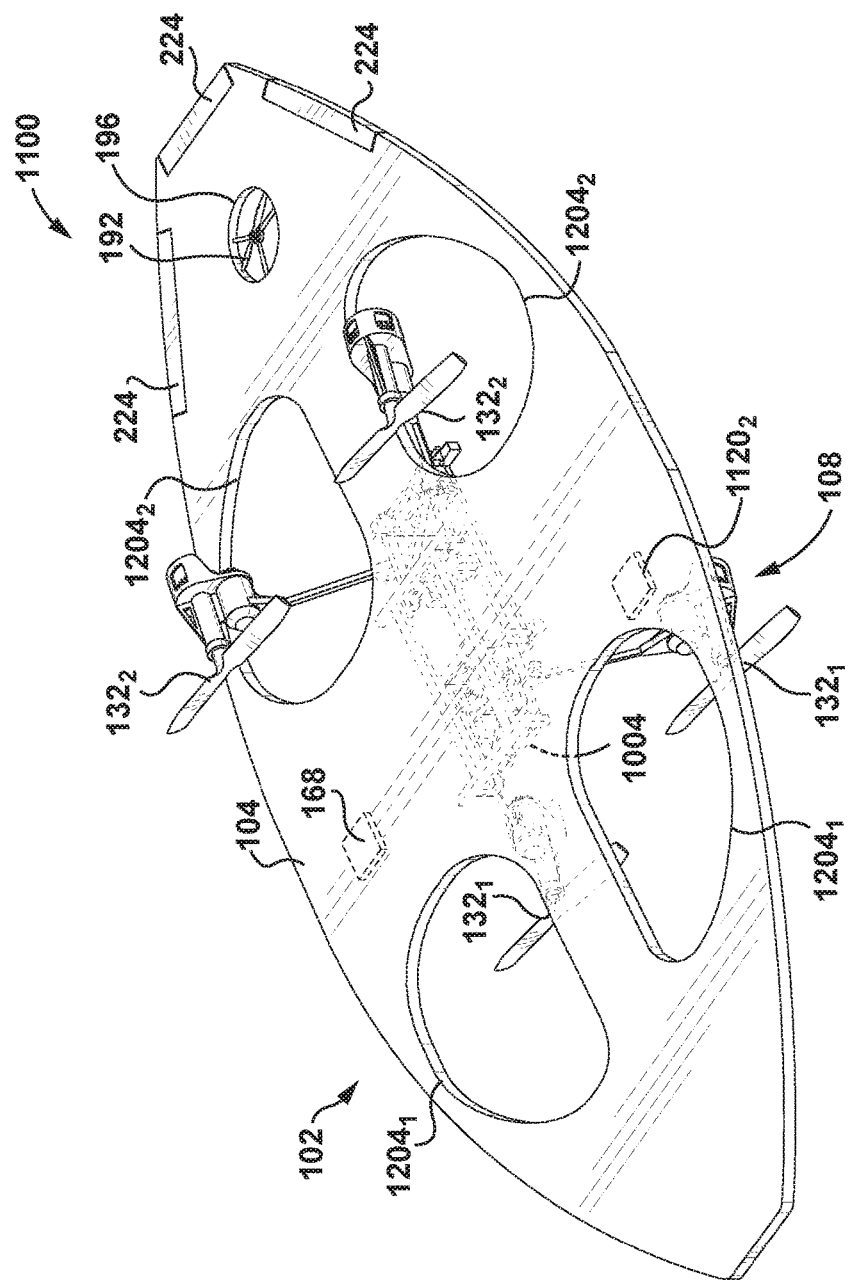
FIG. 45 is a perspective view of the aerial vehicle of FIG. 44, in a fixed-wing configuration.

Reference is now made to FIGS. 44 and 45, where like part numbers refer to like parts in the previous figures, and where an aerial vehicle 1100 is shown in accordance with another embodiment. As shown, aerial vehicle 1100 includes a body 102 including a wing 104. A multicopter 108 including rotors 132 is mounted to wing 104 by multicopter linkage 1004. As exemplified, multicopter rotors 132 may be rotatably coupled (e.g. freely rotatably coupled) to body 102 by multicopter linkage 1004 between a multicopter configuration (FIG. 44) and a fixed-wing configuration (FIG. 45).

Still referring to FIGS. 44 and 45, aerial vehicle 1100 is similar to aerial vehicle 1000 in many respects, except for example the configuration of wing 104. As shown, wing 104 extends forwardly and rearwardly of multicopter rotors 132, and includes a plurality of rotor apertures 1204. Collectively, rotor apertures 1204 are sized and positioned in alignment with multicopter rotors 132 to allow air moved by multicopter rotors 132 when in the multicopter configuration to flow through wing 104 substantially unobstructed.

As shown, rear rotor apertures 1204$_2$ are also sized and positioned to provide passage for rear multicopter rotors 132$_2$ to move from the multicopter configuration (FIG. 44) to the fixed wing position (FIG. 45). In the fixed wing configuration, rear multicopter rotors 132$_2$ extend above wing 104. A portion of multicopter linkage 1004 may extend through rear rotor apertures 1204$_2$ to support multicopter rotors 132$_2$ above wing 104.

Wing 104 can have any number of rotor apertures 1204. For example, wing 104 can have one rotor aperture 1204 for each multicopter rotor 132, as shown. In other embodiments, wing 104 can have fewer rotor apertures 1204 than the number of multicopter rotors 132. For example, a rotor aperture 1204 may be sized to align with a plurality of multicopter rotors 132 (e.g. one large rotor aperture 1204 may be sized and shaped to align with both front multicopter rotors 132$_1$).

Rotor apertures 1204 can have any shape. In the illustrated example, rotor apertures 1204 are substantially quadrilateral. In other embodiments, rotor apertures 1204 can be circular, triangular, square, or another regular or irregular shape.

Any number of control surfaces 224 may be movably mounted (e.g. pivotably mounted) to wing 104. The movement of control surfaces 224 may be controlled (e.g. by control signals from hardware controller 168) to operate as ailerons for controlling roll, to operate as elevators for controlling pitch, to operate as a rudder to control yaw, or a combination thereof depending on the number, size, position, and orientation of control surfaces 224. In the illustrated embodiment, aerial vehicle 1100 is shown including three control surfaces 224. Each control surface 224 may be individually activated (e.g. pivoted upwardly or downwardly) by actuators to create drag for controlling the movement of aerial vehicle 1100. In some embodiments, aerial vehicle 1100 may have no control surfaces 224.

Aerial vehicle 1100 may include any number of rotors 192 which produce thrust to create torque for pitching body 102 relative to multicopter 108 or pitching aerial vehicle 1100 as a whole. For example, rotor 192 may be selectively activated to control the pitch of wing 104. As shown, rotor 192 may be positioned in a rotor aperture 196 which penetrates wing 104. In the illustrated example, aerial vehicle 1100 includes one rotor aperture 196 and rotor 192 positioned rearward of multicopter rotors 132. Alternatively, aperture 196 and rotor 192 may be positioned forward of multicopter rotors 132. In other embodiments, aerial vehicle 1100 may include a plurality of rotors 192 and apertures 196, which may be arranged in any positional arrangement about wing 104, as described above in connection with aerial vehicle 100. In some embodiments, aerial vehicle 1100 may have no rotors 192 and no apertures 196.

Figure 48:
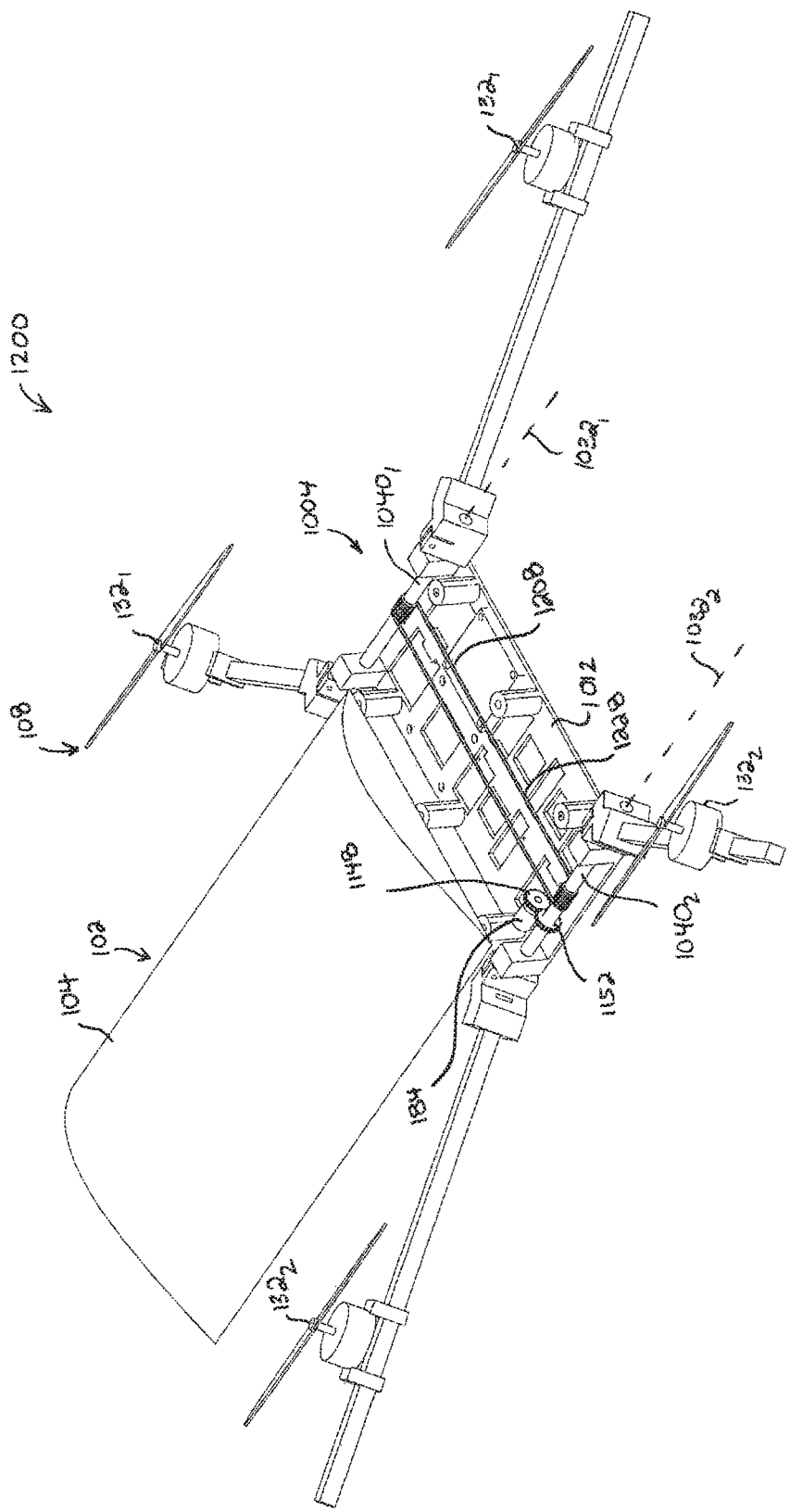
FIG. 48 is a perspective view of an aerial vehicle in accordance with another embodiment.
Figure 49:
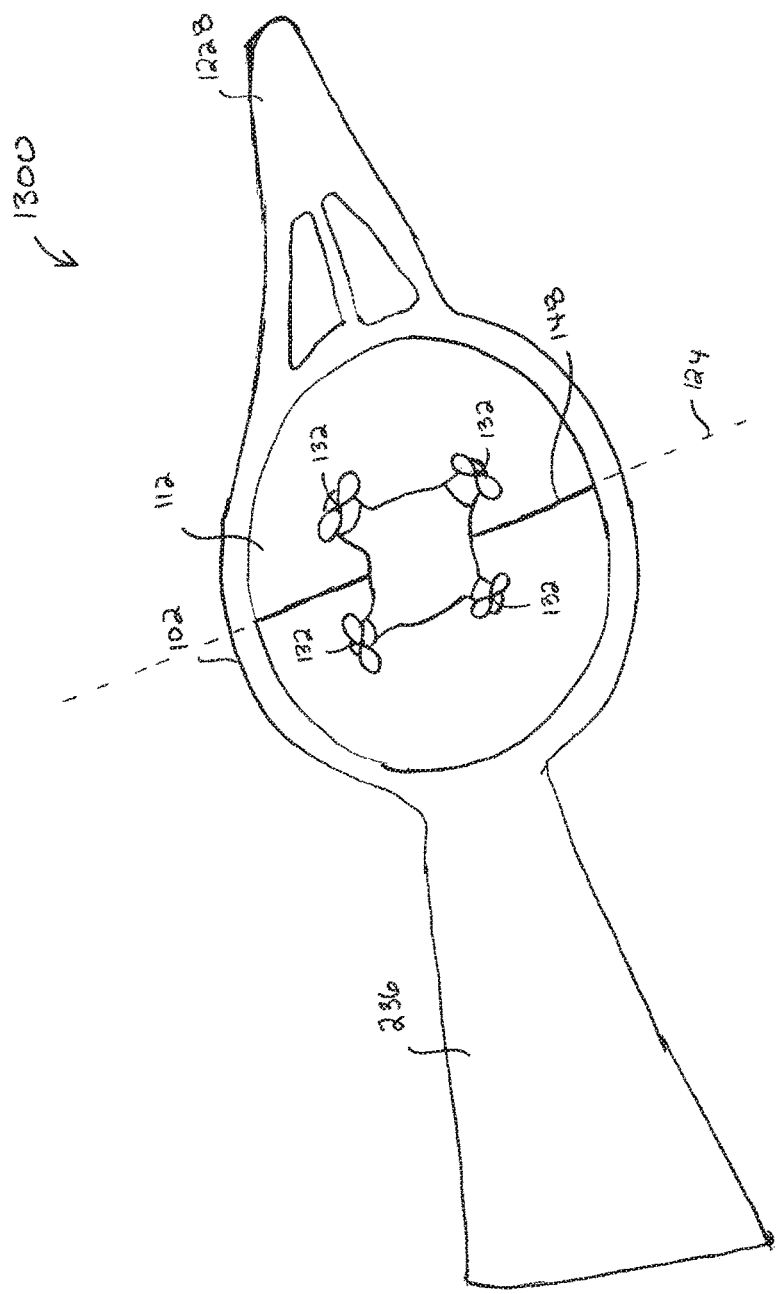

Reference is now made to FIGS. 46-48, where like part numbers refer to like parts in the previous figures, and where an aerial vehicle 1200 is shown in accordance with another embodiment. As shown, aerial vehicle 1200 includes a body 102 including a wing 104. The wing 104 is partially sectioned for clarity of illustration. A multicopter 108 including rotors 132 is mounted to wing 104 by multicopter linkage 1004. As exemplified, multicopter rotors 132 may be rotatably coupled (e.g. freely rotatably coupled) to body 102 by multicopter linkage 1004 between a multicopter configuration and a fixed-wing configuration. Aerial vehicle 1200 is similar to aerial vehicle 1000 in many respects, except for example the configuration of multicopter linkage 1004 which is not formed as a four-bar linkage.

As shown, multicopter linkage 1004 includes a wing mount 1012, front and rear axles 1040$_1$ and 1040$_2$, and a transmission 1208. Multicopter rotors 132 are connected to front and rear axles 1040, and are thereby rotatable with axles 1040 about lateral axes 1032 relative to body 102 between the multicopter and fixed-wing configurations. Transmission 1208 can be any device that can coordinate the rotation of front and rear axles 1040$_1$ and 1040$_2$, so that front and rear axles 1040$_1$ and 1040$_2$ are constrained to rotate simultaneously between the multicopter and fixed-wing configurations.

FIG. 46 shows an example in which transmission 1208 includes a drive shaft 1212 having a bevel gear 1216 at each end, where the bevel gears 1216 are meshed with the bevel gears 1220 of the front and rear axles 1040. As a result of the geared connections, the drive shaft 1212 and both axles 1040 are constrained to rotate in unison between the multicopter and fixed-wing configurations.

FIG. 47 shows another example in which transmission 1208 includes a drive belt 1224 that is wound around the pulleys 1228 of the front and rear axles 1040. As a result of the pulley connection, the drive belt 1224 constrains the two axles 1040 to rotate in unison between the multicopter and fixed-wing configurations.

FIG. 48 shows another example in which transmission 1208 includes a drive cable 1228 that is wound at each end around a different one of axles 1040. As a result of the cable connection, the drive cable 1228 constrains the two axles 1040 to rotate in unison between the multicopter and fixed-wing configurations.

Referring again to FIGS. 46-48, multicopter linkage 1004 synchronizes the movement of multicopter rotors 132 between the multicopter and fixed-wing configurations. This may optionally allow aerial vehicle 1200 to be constructed free of actuators or other devices which directly apply torque to rotate multicopter rotors 132 about axles 1040$_1$ and 1040$_2$. Instead, the thrust developed by rotors 132$_1$ and 132$_2$ about axles 1040$_1$ and 1040$_2$ may be controlled (e.g. by a hardware controller) to cause multicopter rotors 132$_1$ and 132$_2$ to move between the multicopter and fixed-wing configurations, substantially as described with respect to other embodiments.

In some embodiments, aerial vehicle 1200 may include a configuration actuator 184 as shown. Configuration actuator 184 may be operable to move multicopter rotors 132 between the multicopter and fixed-wing configurations. As shown, configuration actuator 184 may be rigidly coupled to body 102 or wing 104. For example, configuration actuator may be rigidly connected to wing mount 1012.

FIG. 46 shows an example in which configuration actuator 184 drives an output gear 1148, and drive shaft 1212 includes an axle gear 1152 meshed with output shaft gear 1148, whereby configuration actuator 184 is operable to rotate drive shaft 1212 and therefore axles 1040 and multicopter rotors 132 in unison between the multicopter and fixed-wing configurations.

FIGS. 47 and 48 show an example in which configuration actuator 184 drives an output gear 1148, and an axle 1040 includes an axle gear 1152 meshed with output shaft gear 1148, whereby configuration actuator 184 is operable to rotate the axle 1040, and therefore the other axle 1040 and multicopter rotors 132 by way of transmission 1208, between the multicopter and fixed-wing configurations.

Figure 49:
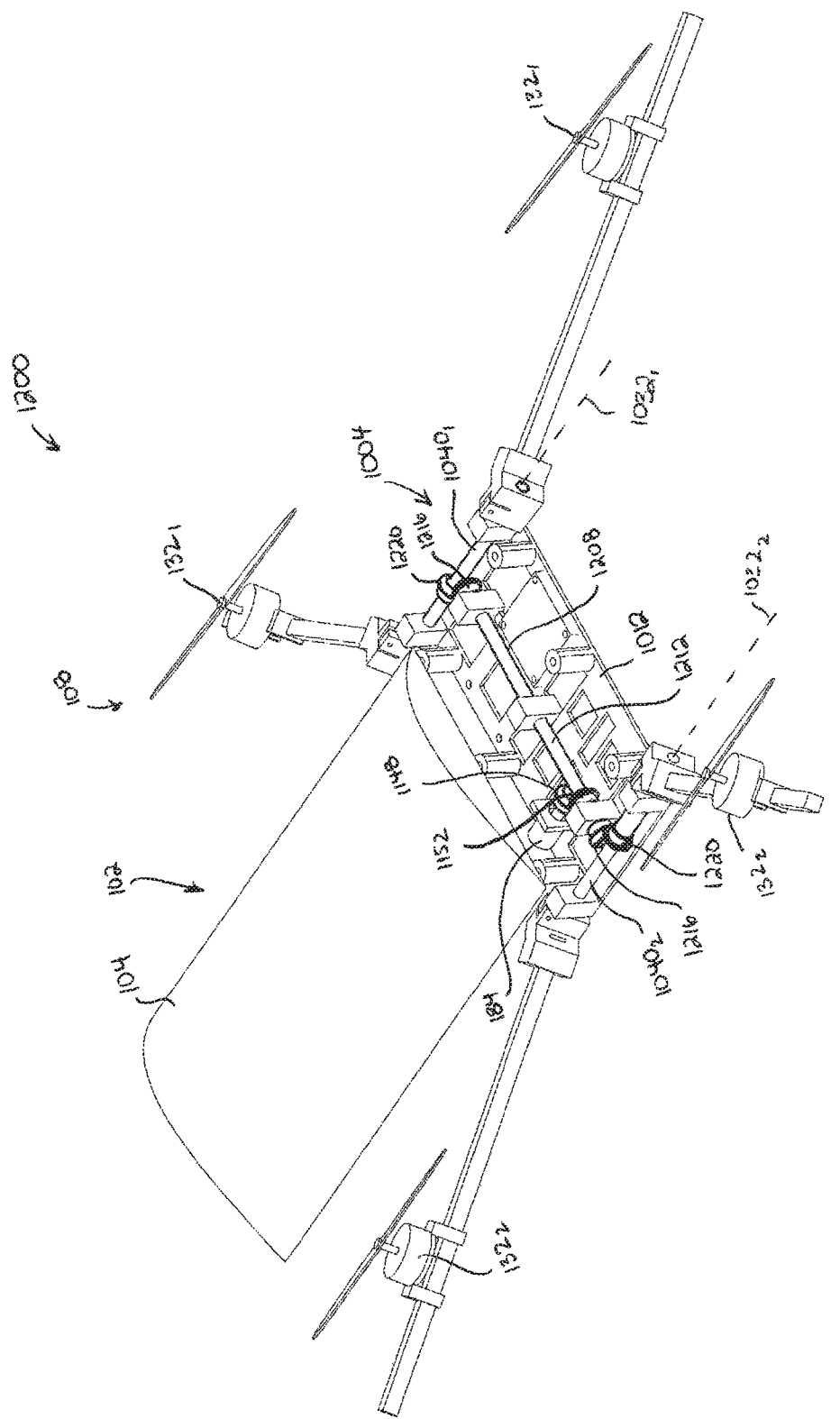
FIG. 49 is a perspective view of an aerial vehicle in accordance with another embodiment.

Reference is now made to FIG. 49, where like part numbers refer to like parts in the previous figures, and where an aerial vehicle 1300 is shown in accordance with another embodiment. As shown, aerial vehicle 1300 includes a multicopter 108 rotatably mounted to a body 102 about a multicopter axis 124. In the example shown, body 102 includes a tail 236, a nose 1228, and a multicopter opening 112 positioned between tail 236 and nose 1228. Multicopter 108 may be rotatably coupled to body 102 in any manner, such as by multicopter axle 148 as shown.

The aerial vehicle embodiments disclosed herein (e.g. aerial vehicle 100, 300, 400, 500, 600, 700, 800, 900, 1000, 1100, 1200, and 1300) can be scaled to any size. For example, the aerial vehicles can be scaled from small toys, to medium sized personal carriers (e.g. for carrying one or more human passengers), to large sized cargo carriers (e.g. for carrying large shipping containers).

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

Items

Item 1. An aerial vehicle comprising:
a body including at least one wing; and
a multicopter rotatably mounted to the body about a multicopter axis,
wherein
the multicopter includes a plurality of rotors positioned and controllable to rotate
the multicopter about the multicopter axis.

Item 2. The aerial vehicle of item 1, wherein:
the multicopter is freely rotatable about the multicopter axis relative to the body at least within an angular range of motion.

Item 3. The aerial vehicle of item 1, wherein:
the multicopter is rotatable between a multicopter configuration and a fixed wing configuration,
in the multicopter configuration, the multicopter provides lift to the body, and
in the fixed wing configuration, the multicopter provides forward thrust to move the body forwardly and the wing provides lift to the body.

Item 4. The aerial vehicle of item 3, wherein:
the multicopter is rotatable between the multicopter configuration and the fixed wing configuration by modulating the thrust of the plurality of rotors to torque the multicopter about the multicopter axis.

Item 5. The aerial vehicle of item 1, wherein:
the multicopter axis extends laterally relative to the body.

Item 6. The aerial vehicle of item 3, wherein:
the body includes a multicopter opening, and
the multicopter is rotatably positioned in the opening.

Item 7. The aerial vehicle of item 6, wherein:
in the multicopter configuration, the multicopter is substantially parallel to the body.

Item 8. The aerial vehicle of item 6, wherein:
in the multicopter configuration, the multicopter is substantially parallel to the wings.

9. The aerial vehicle of item 6, wherein:
in the multicopter configuration, at least one rotor of the plurality of rotors is positioned at least partially inside the opening, and
in the fixed wing configuration, the at least one rotor is positioned outside the opening.

Item 10. The aerial vehicle of item 9, wherein:
in the fixed wing configuration, the at least one rotor is positioned above or below the body.

Item 11. The aerial vehicle of item 9, wherein:
in the fixed wing configuration, the at least one rotor is positioned above or below the wing.

Item 12. The aerial vehicle of item 3, wherein:
the multicopter is rotatable at least 30 degrees about the multicopter axis relative to the body between the multicopter configuration and the fixed wing configuration.

Item 13. The aerial vehicle of item 1, further comprising:
a brake coupled to the body and selectively engageable to inhibit rotation of the multicopter about the multicopter axis relative to the body.

Item 14. The aerial vehicle of item 1, wherein:
the multicopter comprises a multicopter frame, and
the plurality of rotors are rigidly connected to the multicopter frame.

Item 15. The aerial vehicle of item 1, further comprising:
at least one stabilization rotor mounted to the body.

Item 16. The aerial vehicle of item 15, wherein:
the stabilization rotor is positioned in a stabilization rotor aperture of the body.

Item 17. The aerial vehicle of item 15, wherein:
the multicopter axis extends laterally relative to the body, and
the at least one stabilization rotor comprises a first stabilization rotor forward of the multicopter, and a second stabilization rotor rearward of the multicopter.

Item 18. The aerial vehicle of item 5, wherein:
the body further comprises a rearwardly extending tail.

Item 19. The aerial vehicle of item 18, wherein:
the tail is a passive tail free of actuators.

Item 20. The aerial vehicle of item 18, wherein:
the tail is an active tail including one or more control surfaces.

Item 21. The aerial vehicle of item 18, wherein:
the body further comprises a fuselage,
the at least one wing comprises a second wing, and
the tail and the wings extend outwardly from the fuselage.

Item 22. The aerial vehicle of item 1, further comprising:
a second multicopter rotatably mounted to the body about a second multicopter axis,
wherein
the second multicopter includes a second plurality of rotors positioned and controllable to provide thrust to rotate the second multicopter about the second multicopter axis.

Item 23. The aerial vehicle of item 1, further comprising:
at least one cargo mount connected to the body.

Item 24. The aerial vehicle of item 23, further comprising:
a mass balancing system connected to the body, the mass balancing system including at least one mass that is selectively movable along the body.

Item 25. The aerial vehicle of item 24, wherein:
the mass is at least one of movable laterally or longitudinally relative to the body.

Item 26. A hybrid aerial vehicle assembly for connection with a multicopter to form a hybrid aerial vehicle, the assembly comprising:
a body including at least one wing; and
a multicopter mount rotatably connected to the body and connectable to a multicopter, the multicopter mount permitting a connected multicopter to rotate as a unitary assembly about a multicopter axis relative to the body.

Item 27. The hybrid aerial vehicle assembly of item 26, wherein:
the multicopter axis extends laterally to a forward direction of movement.

Item 28. The hybrid aerial vehicle assembly of item 26, wherein:
the multicopter mount is freely rotatable about the multicopter axis relative to the body.

Item 29. An aerial vehicle, comprising:
a body including at least one wing; and
a multicopter mounted to the body,
the multicopter including a first rotor, a second rotor, and a mechanical linkage connecting the first and second rotors to the wing,
the mechanical linkage being movable relative to the wing, to rotate the first and second rotors about spaced apart first and second axes respectively between a multicopter configuration and a fixed wing configuration.

Item 30. The aerial vehicle of item 29, wherein:
the mechanical linkage is movable with one degree of freedom.

Item 31. The aerial vehicle of item 29, wherein:
in the multicopter configuration,
the first rotor is forward of the wing, and
the second rotor is rearward of the wing.

Item 32. The aerial vehicle of item 29, wherein:
in the fixed-wing configuration,
one of the first and second rotors is above the wing, and
the other of the first and second rotors is below the wing.

Item 33. The aerial vehicle of item 29, wherein:
in the multicopter configuration, the first and second rotors provide lift to the body, and
in the fixed-wing configuration, the first and second rotors provide forward thrust to move the body forwardly and the wing provides lift to the body.

Item 34. The aerial vehicle of item 29, wherein:
the mechanical linkage operates as a four-bar linkage in concert with the body.

Item 35. The aerial vehicle of item 29, wherein:
the first and second axes are parallel.

Item 36. The aerial vehicle of item 35, wherein:
the first axis is forward of the second axis.

Item 37. An aerial vehicle kit comprising:
a multicopter linkage having a wing mount, a first rotor mount rotatably coupled to the wing mount to rotate about a first lateral axis, and a second rotor mount rotatably coupled to the wing mount to rotate about a second lateral axis longitudinally spaced apart from the first lateral axis, wherein the first and second rotor mounts are restricted to collective synchronous rotation relative to the wing mount between a multicopter configuration and a fixed-wing configuration.

Item 38. The aerial vehicle kit of item 37, wherein:
the multicopter linkage further comprises a first rotor arm and a second rotor arm,
each of the first and second rotor arms is rotatably coupled to the wing mount to rotate between the multicopter and fixed-wing configurations,
the first rotor mount is provided on the first rotor arm, and the second rotor mount is provided on the second rotor arm.

Item 39. The aerial vehicle kit of item 38, wherein:
the multicopter linkage further comprises a connector arm rotatably coupled to the first and second rotor arms such that the wing mount, the first and second rotor arms, and the connector arm form a four bar linkage.

Item 40. The aerial vehicle kit of item 37, wherein:
the multicopter linkage further comprises a sensor mount rotatably connected to the wing mount, and
the sensor mount rotates relative to the wing mount when the first and second rotor mounts move between the multicopter and fixed-wing configurations.

Item 41. The aerial vehicle kit of item 39, wherein:
the multicopter linkage further comprises a sensor mount rotatably connected to the wing mount and rotatably coupled to the connector arm, and
the sensor mount rotates relative to the wing mount when the first and second rotor mounts rotate relative to the wing mount between the multicopter and fixed-wing configurations.

Item 42. The aerial vehicle kit of item 37, further comprising:
a configuration lock connectable to the multicopter linkage to inhibit the first and second rotor mounts from rotating relative to the wing mount between the multicopter and fixed-wing configurations.

Item 43. The aerial vehicle kit of item 37, further comprising:
a plurality of multicopter rotors connectable to the first and second rotor mounts.

Item 44. The aerial vehicle kit of item 37, further comprising:
a wing connectable to the wing mount.

Item 45. The aerial vehicle kit of item 37, further comprising:
a movement sensor connectable to the multicopter linkage at a position that moves relative to the wing mount when the first and second rotor mounts rotate relative to the wing mount between the multicopter and fixed-wing configurations; and
a configuration actuator connectable to the multicopter linkage and operable to selectively rotate the first and second rotor mounts relative to the wing mount between the multicopter and fixed-wing configurations.

Item 46. The aerial vehicle kit of item 37, wherein the multicopter linkage comprises:
a first axle rotatable about the first lateral axis and connected to the first rotor mount,
a second axle rotatable about the second lateral axis and connected to the second rotor mount, and a transmission connected to the first and second axles, the transmission restricting the first and second rotor mounts to collective synchronous rotation relative to the wing mount between the multicopter configuration and the fixed-wing configuration.

Item 47. The aerial vehicle kit of item 46, wherein:
the transmission comprises a drive shaft having gear connections to the first and second axles.

Item 48. The aerial vehicle kit of item 46, wherein:
the transmission comprises a drive belt having pulley connections to the first and second axles.

Item 49. The aerial vehicle kit of item 46, wherein:
the transmission comprises a cable wound around the first and second axles.

Item 50. An aerial vehicle comprising:
a wing;
first and second multicopter rotors rotatably coupled to the wing, the first multicopter rotor rotatable relative to the wing about a first lateral axis, and the second multicopter rotor rotatable relative to the wing about a second lateral axis,
each multicopter rotor coupled to each other multicopter rotor, wherein the multicopter rotors are restricted to collective synchronous rotation relative to the wing between a multicopter configuration and a fixed-wing configuration; and
a movement sensor coupled to the multicopter rotors, wherein the movement sensor is positioned to rotate relative to the wing when the multicopter rotors rotate relative to the wing between the multicopter and fixed-wing configurations.

Item 51. The aerial vehicle of item 50, further comprising:
a configuration actuator connected to the multicopter linkage and operable to selectively rotate the plurality of multicopter rotors relative to the wing between the multicopter and fixed-wing configurations.

Item 52. The aerial vehicle of item 51, further comprising:
a hardware controller communicatively coupled to the movement sensor to receive movement sensor readings, and communicatively coupled to the configuration actuator to send control signals to the configuration actuator.

Item 53. The aerial vehicle of item 50, further comprising:
a multicopter linkage having first and second rotor mounts, each rotor mount rotatably coupled to the wing, the first multicopter rotor mounted to the first rotor mount, and the second multicopter rotor mounted to the second rotor mount.

Item 54. The aerial vehicle of item 53, wherein the multicopter linkage comprises: a four-bar linkage.

Item 55. The aerial vehicle of item 53, wherein the multicopter linkage comprises:
a first axle rotatable about the first lateral axis and connected to the first rotor mount,
a second axle rotatable about the second lateral axis and connected to the second rotor mount, and
a transmission connected to the first and second axles, the transmission restricting the first and second rotor mounts to collective synchronous rotation relative to the wing mount between the multicopter configuration and the fixed-wing configuration.

Item 56. The aerial vehicle of item 53, further comprising:
a configuration lock selectively connectable to the multicopter linkage to inhibit rotation of the multicopter rotors relative to the wing between the multicopter and fixed-wing configurations.

Item 57. A method of making an aerial vehicle, the method comprising:
providing a multicopter linkage having a wing mount, a first rotor mount rotatably coupled to the wing mount to rotate about a first lateral axis, and a second rotor mount rotatably coupled to the wing mount to rotate about a second lateral axis longitudinally spaced apart from the first lateral axis,
wherein the first and second rotor mounts are restricted to collective synchronous rotation relative to the wing mount between a multicopter configuration and a fixed-wing configuration;
mounting a wing to the wing mount; and
mounting a multicopter rotor to each of the rotor mounts.

Item 58. The method of item 57, further comprising:
mounting a movement sensor to the multicopter linkage at a position that moves relative to the wing when the rotor mounts rotate between the multicopter and fixed-wing configurations.

Item 59. The method of item 58, further comprising:
coupling a configuration actuator to the multicopter linkage, the configuration actuator operable to selectively rotate the rotor mounts relative to the wing between the multicopter and fixed-wing configurations;

Item 60. The method of item 59, further comprising:
coupling a hardware controller to the multicopter linkage, the hardware controller communicatively coupled to the movement sensor to receive movement sensor readings, and communicatively coupled to the configuration actuator to send control signals to the configuration actuator.

Item 61. The method of item 57, further comprising:
connecting a configuration lock to the multicopter linkage to inhibit rotation of the rotor mounts relative to the wing mount between multicopter and fixed-wing configurations.

The invention claimed is:
1. An aerial vehicle comprising:
a wing;
a multicopter linkage having first and second rotor mounts, each rotor mount rotatably coupled to the wing,
first and second multicopter rotors rotatably coupled to the wing by the multicopter linkage, the first multicopter rotor mounted to the first rotor mount and freely rotatable relative to the wing about a first lateral axis, and the second multicopter rotor mounted to the second rotor mount and freely rotatable relative to the wing about a second lateral axis,
wherein the multicopter linkage comprises
a first axle extending along the first lateral axis and connected to the first rotor mount,
a second axle extending along the second lateral axis and connected to the second rotor mount, and
a transmission connected to the first and second axles, the transmission restricting the first and second rotor mounts and multicopter rotors to collective synchronous rotation relative to the wing mount between a multicopter configuration and a fixed-wing configuration.

2. The aerial vehicle of claim 1, further comprising:
a movement sensor coupled to the multicopter rotors, wherein the movement sensor is positioned to rotate relative to the wing when the multicopter rotors rotate relative to the wing between the multicopter and fixed-wing configurations.

3. The aerial vehicle of claim 2, further comprising:
a hardware controller communicatively coupled to the movement sensor to receive movement sensor readings, and communicatively coupled to the first and second multicopter rotors to send control signals to the first and second multicopter rotors based at least in part on the movement sensor readings.

4. The aerial vehicle of claim 1, further comprising:
a configuration lock selectively connectable to the multicopter linkage to inhibit rotation of the multicopter rotors relative to the wing between the multicopter and fixed-wing configurations.

5. An aerial vehicle kit comprising:
a multicopter linkage having a wing mount, a first rotor mount rotatably coupled to the wing mount to rotate about a first lateral axis, a second rotor mount rotatably coupled to the wing mount to rotate about a second lateral axis longitudinally spaced apart from the first lateral axis, a first axle extending along the first lateral axis and connected to the first rotor mount, a second axle extending along the second lateral axis and connected to the second rotor mount, and a transmission connected to the first and second axles, the transmission restricting the first and second rotor mounts to collective synchronous rotation relative to the wing mount between a multicopter configuration and a fixed-wing configuration,
a wing connectable to the wing mount,
wherein the first and second multicopter rotor mounts are freely rotatably coupled to the wing mount about the respective first and second axles.

6. The aerial vehicle kit of claim 5, wherein:
the transmission comprises a first rotor arm and a second rotor arm,
each of the first and second rotor arms is rotatably coupled to the wing mount to rotate between the multicopter and fixed-wing configurations,
the first rotor mount is provided on the first rotor arm, and the second rotor mount is provided on the second rotor arm.

7. The aerial vehicle kit of claim 6, wherein:
the transmission further comprises a connector arm rotatably coupled to the first and second rotor arms such that the wing mount, the first and second rotor arms, and the connector arm form a four bar linkage.

8. The aerial vehicle kit of claim 5, wherein:
the multicopter linkage further comprises a sensor mount rotatably connected to the wing mount, and
the sensor mount rotates relative to the wing mount when the first and second rotor mounts move between the multicopter and fixed-wing configurations.

9. The aerial vehicle kit of claim 7, wherein:
the multicopter linkage further comprises a sensor mount rotatably connected to the wing mount and rotatably coupled to the connector arm, and
the sensor mount rotates relative to the wing mount when the first and second rotor mounts rotate relative to the wing mount between the multicopter and fixed-wing configurations.

10. The aerial vehicle kit of claim 5, further comprising:
a configuration lock connectable to the multicopter linkage to inhibit the first and second rotor mounts from rotating relative to the wing mount between the multicopter and fixed-wing configurations.

11. The aerial vehicle kit of claim 5, further comprising:
a plurality of multicopter rotors connectable to the first and second rotor mounts.

12. The aerial vehicle kit of claim 5, further comprising:
a movement sensor connectable to the multicopter linkage at a position that moves relative to the wing mount when the first and second rotor mounts rotate relative to the wing mount between the multicopter and fixed-wing configurations.

13. The aerial vehicle kit of claim 5, wherein:
the transmission comprises a drive shaft having gear connections to the first and second axles.

14. The aerial vehicle kit of claim 5, wherein:
the transmission comprises a drive belt having pulley connections to the first and second axles.

15. The aerial vehicle kit of claim 5, wherein:
the transmission comprises a cable wound around the first and second axles.

16. A method of making an aerial vehicle, the method comprising:
providing a multicopter linkage having a wing mount, a first rotor mount rotatably coupled to the wing mount to rotate about a first lateral axis, a second rotor mount rotatably coupled to the wing mount to rotate about a second lateral axis longitudinally spaced apart from the first lateral axis, a first axle extending along the first lateral axis and connected to the first rotor mount, a second axle extending along the second lateral axis and connected to the second rotor mount, and a transmission connected to the first and second axles, the transmission restricting the first and second rotor mounts to collective synchronous rotation relative to the wing mount between a multicopter configuration and a fixed-wing configuration,
mounting a wing to the wing mount; and
mounting a multicopter rotor to each of the rotor mounts,
wherein the first and second multicopter rotors are freely rotatably coupled to the wing about the respective first and second axles.

17. The method of claim 16, further comprising:
mounting a movement sensor to the multicopter linkage at a position that moves relative to the wing when the rotor mounts rotate between the multicopter and fixed-wing configurations.

18. The method of claim 17, further comprising:
coupling a hardware controller to the multicopter linkage, the hardware controller communicatively coupled to the movement sensor to receive movement sensor readings, and communicatively coupled to the multicopter rotors to send control signals to the multicopter rotors based at least in part on the movement sensor readings.

19. The aerial vehicle of claim 1, wherein:
the first and second multicopter rotors are rotatable relative to the wing between the multicopter and fixed-wing configurations by modulating thrust of the first and second multicopter rotors to torque the first and second multicopter rotors about the first and second axes respectively.

20. The aerial vehicle kit of claim 11, wherein:
when the plurality of multicopter rotors are connected to the first and second rotor mounts, the multicopter rotors are rotatable relative to the wing mount between the multicopter and fixed-wing configurations by modulating thrust of the plurality of multicopter rotors to torque the plurality of multicopter rotors about the first and second axes respectively.

21. The aerial vehicle of claim 1, wherein:
the transmission includes one of a four-bar linkage, a drive shaft, a drive belt, and a drive cable.

22. The method of claim 16, wherein:
the transmission includes one of a four-bar linkage, a drive shaft, a drive belt, and a drive cable.

* * * * *